United States Patent [19]

Davis et al.

[11] 4,211,895
[45] Jul. 8, 1980

[54] ELECTRONIC TELEPHONE SYSTEM WITH TIME DIVISION MULTIPLEXED SIGNALLING

[75] Inventors: John C. H. Davis, Oak Ridges; Krishnaswamy Natarajan, Bramalea; Jan Cihal, Toronto; Motek Szpindel, Downsview; Jeffrey Sidwell, Thornhill, all of Canada

[73] Assignee: Plessey Canada Ltd., Downsview, Canada

[21] Appl. No.: 857,744

[22] Filed: Dec. 5, 1977

[30] Foreign Application Priority Data

Dec. 10, 1976 [GB] United Kingdom ............... 51673/76

[51] Int. Cl.² .......................... H04Q 1/30; H04Q 3/56
[52] U.S. Cl. ............................ 179/18 J; 179/18 AD; 179/81 C; 179/84 VF; 370/110
[58] Field of Search ............... 179/15 AT, 15 AL, 99, 179/15 BA, 15 BY, 18 AD, 84 VF, 18 J, 81 C

[56] References Cited

U.S. PATENT DOCUMENTS

| | | | |
|---|---|---|---|
| 3,340,366 | 9/1967 | Bour et al. | 179/15 BA |
| 3,701,854 | 10/1972 | Anderson et al. | 179/18 AD |
| 3,828,145 | 8/1974 | Carbrey | 179/15 AT X |
| 3,843,845 | 10/1974 | Ridley | 179/99 |
| 3,973,085 | 8/1976 | Shiff | 179/99 |
| 3,996,424 | 12/1976 | Agricola | 179/18 J |
| 4,028,498 | 6/1977 | Mehaffey et al. | 179/18 GE |
| 4,069,399 | 1/1978 | Barrett et al. | 179/15 AL |

FOREIGN PATENT DOCUMENTS

| | | | |
|---|---|---|---|
| 1437031 | 5/1976 | United Kingdom | 179/18 AD |
| 1437032 | 5/1976 | United Kingdom | 179/34 |

Primary Examiner—Thomas W. Brown
Attorney, Agent, or Firm—Ridout & Maybee

[57] ABSTRACT

An electronic telephone system has a plurality of extensions connected radially to a central equipment by respective cables each providing separate speech and signalling paths. Each of the signalling paths is provided by a balanced conductor pair terminated by a matching impedance at the extension unit. The conductor pairs are connected to a common control unit at the central equipment, which scans the extensions in a time-division multiplex mode, signalling data being transmitted over the conductor pair from the addressed extension to the control unit in a first period of the time slot allotted to the extension, and signalling data being transmitted from the control unit to the addressed extension in a second period of the allotted time slot. The system is also served by a number of trunks, which are scanned by the common control unit, the trunks being interfaced with the central equipment by interface units which include protective circuitry and logic control circuits.

28 Claims, 88 Drawing Figures

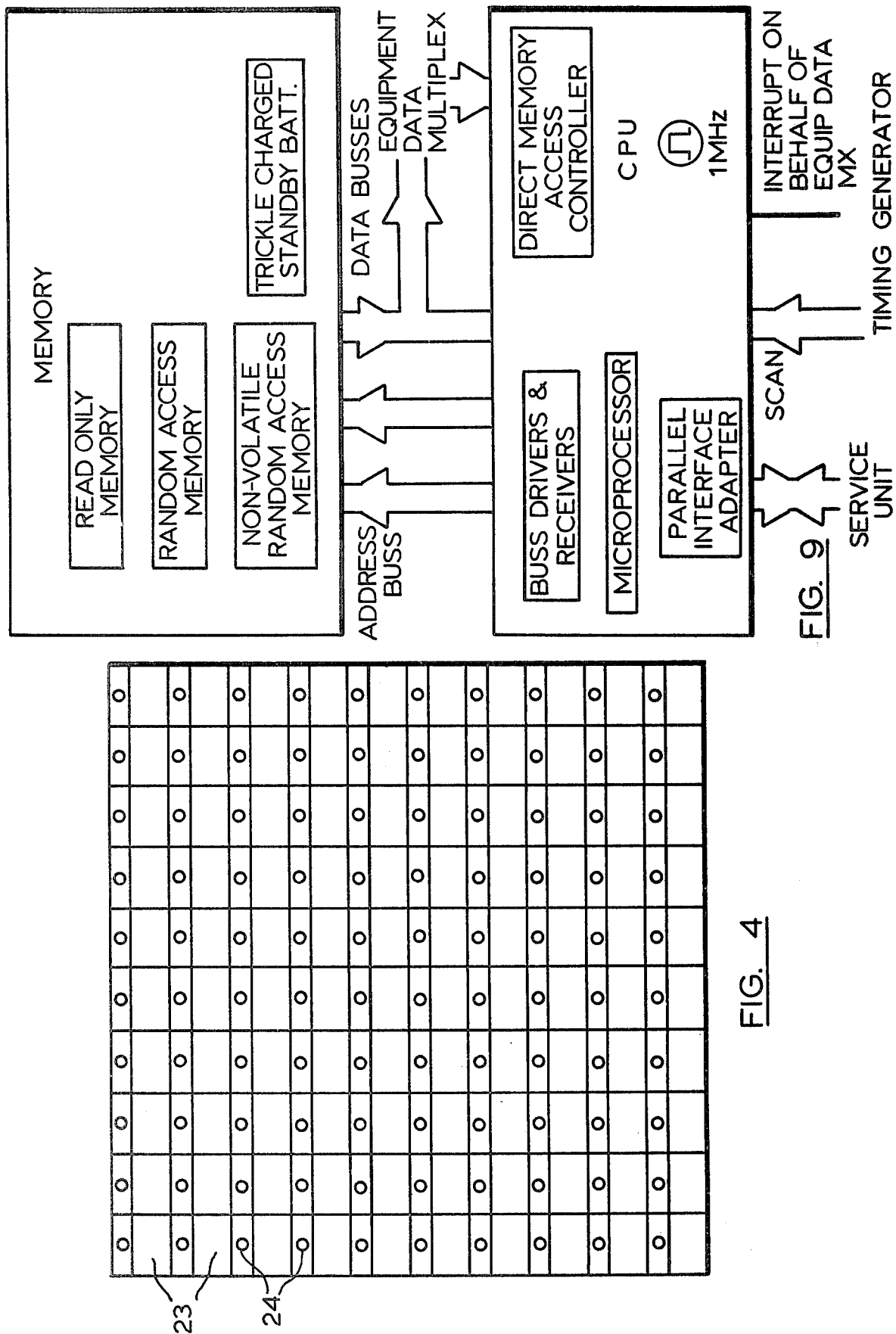

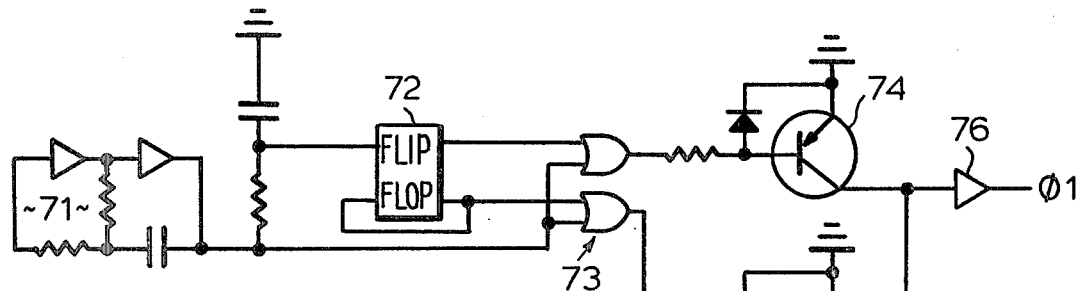
FIG. 18
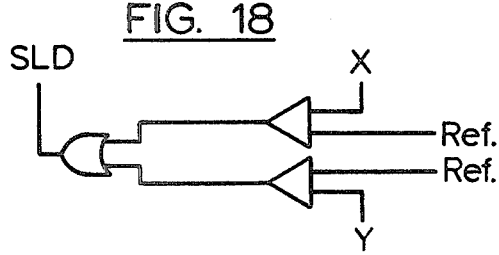
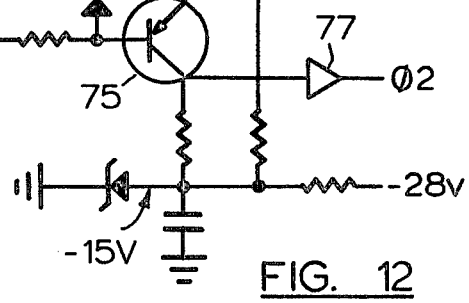
FIG. 12
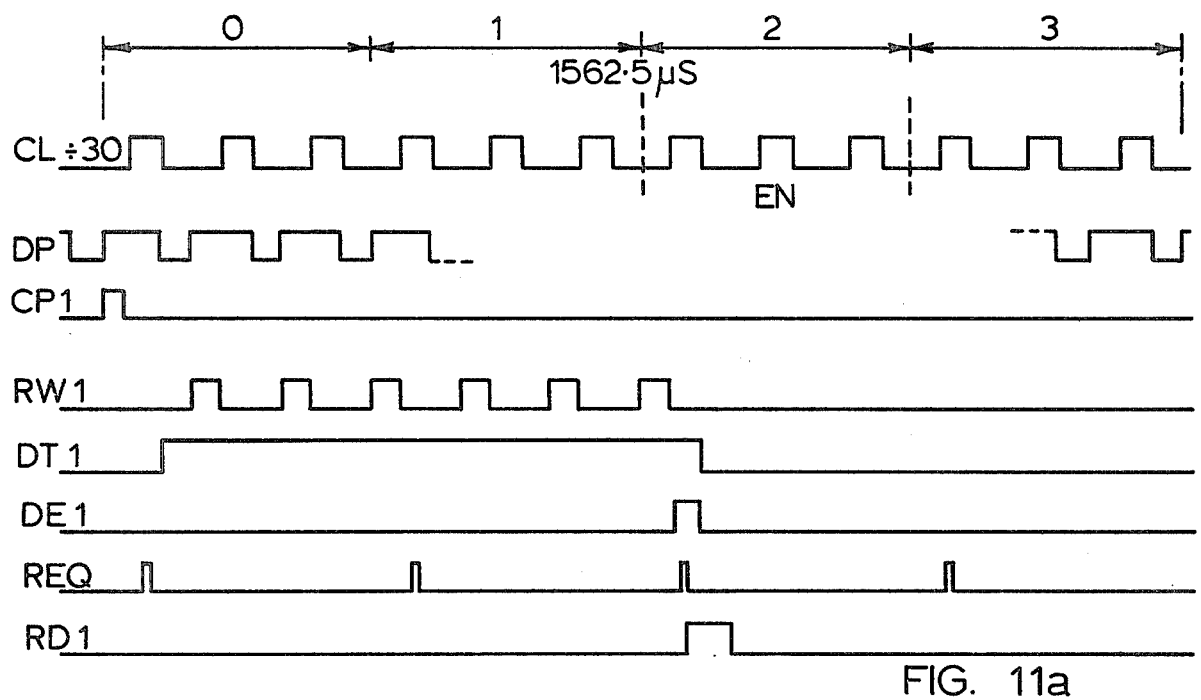
FIG. 11a
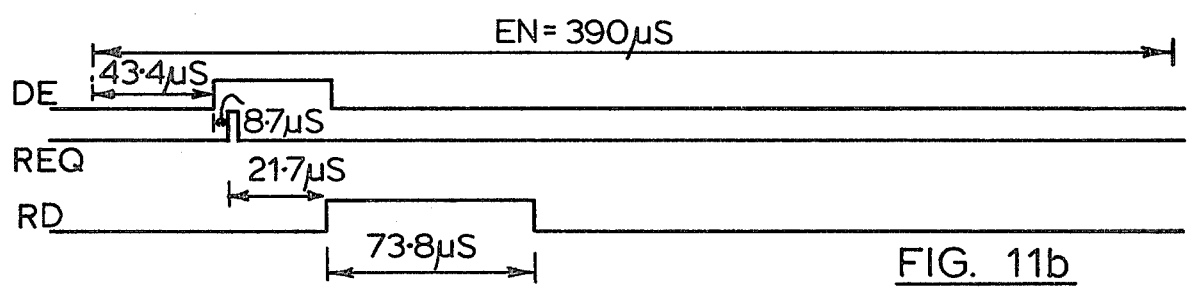
FIG. 11b

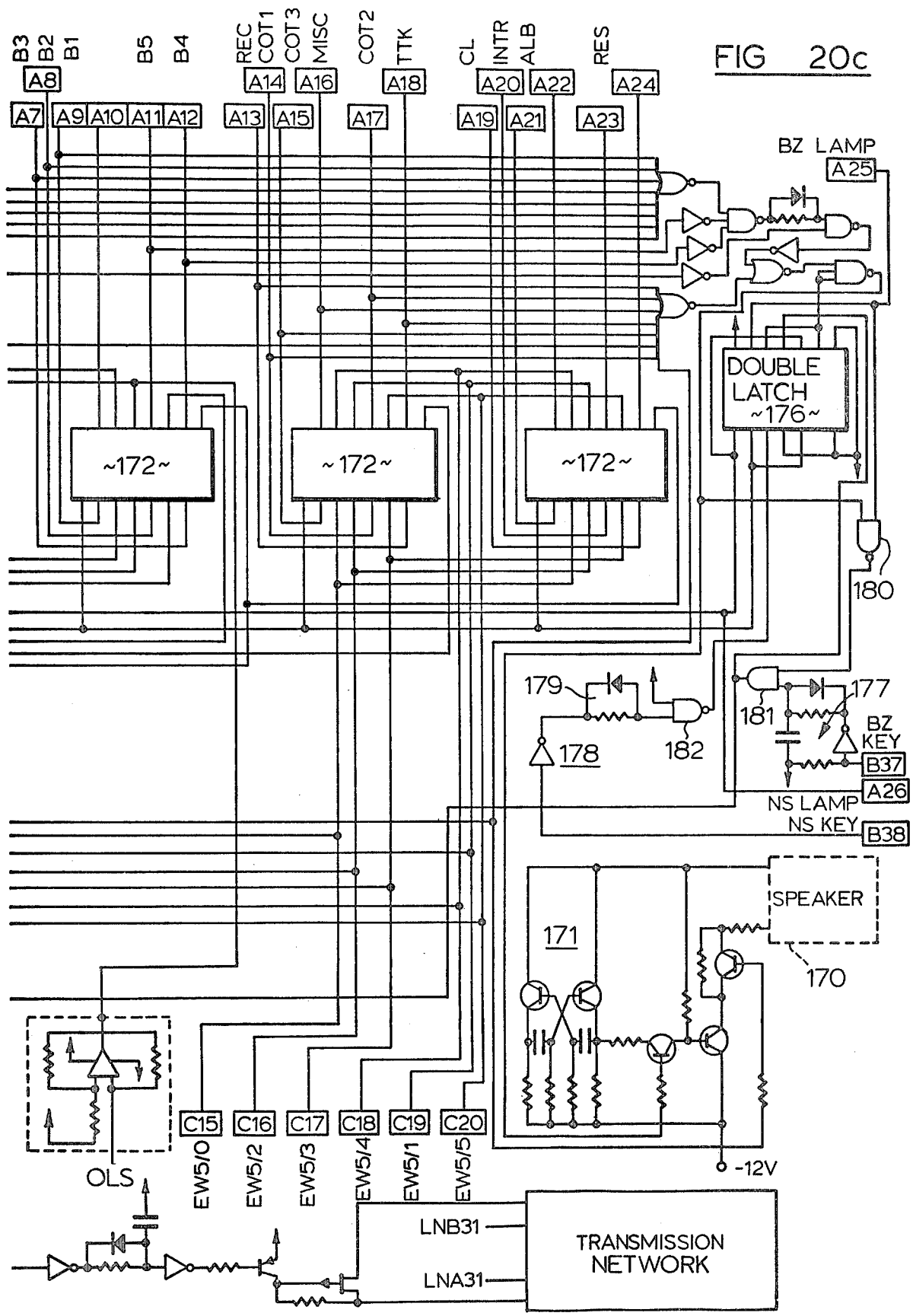

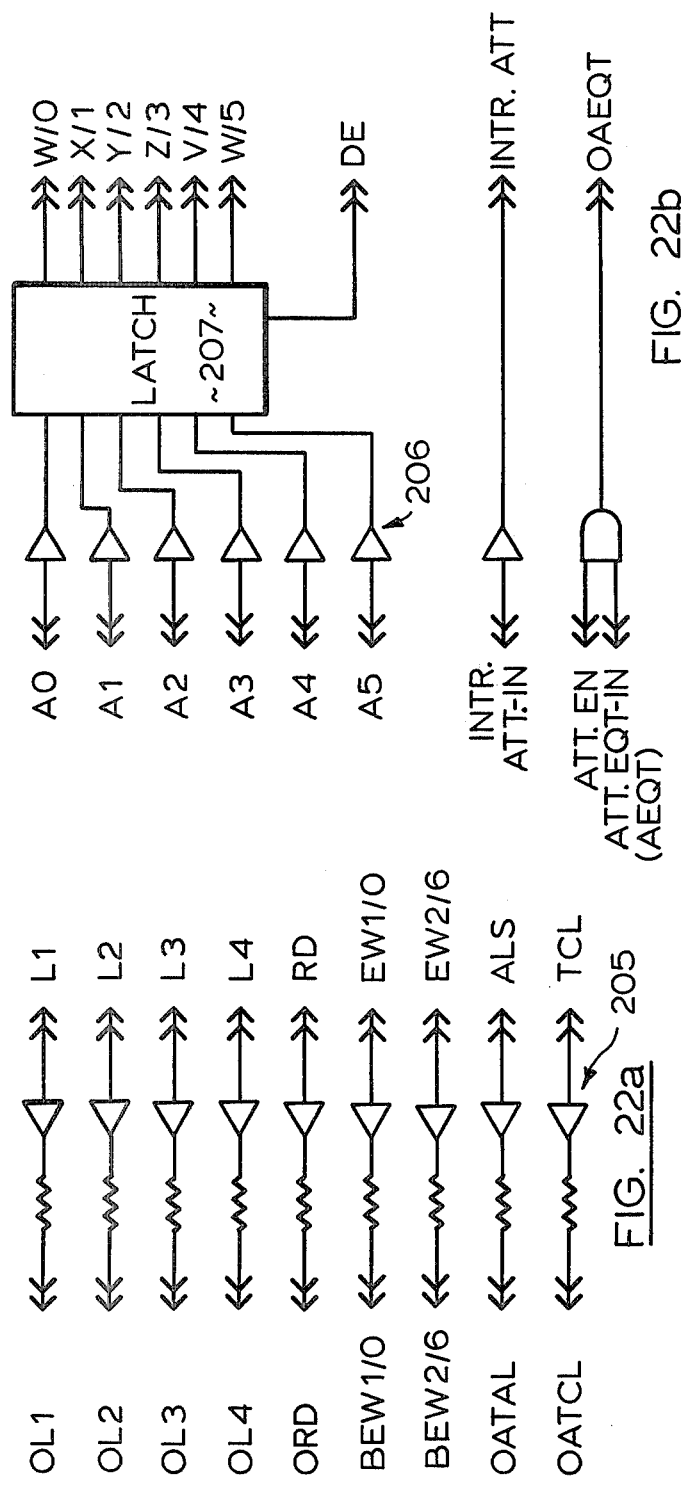
FIG. 22b
FIG. 22a
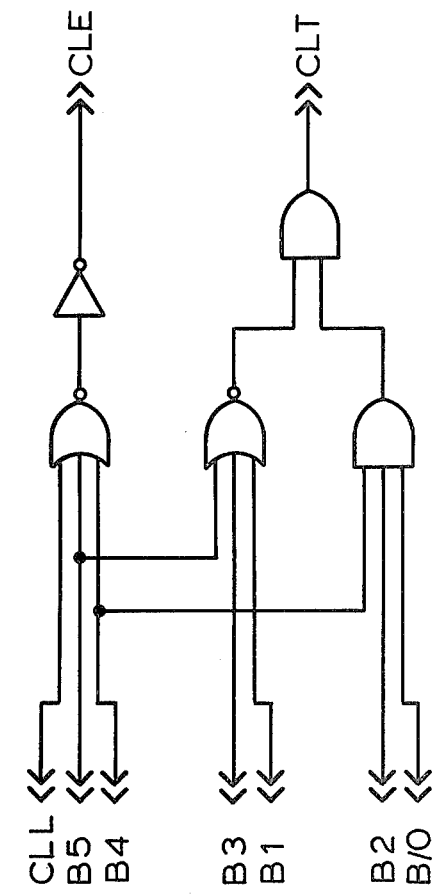
FIG. 35c

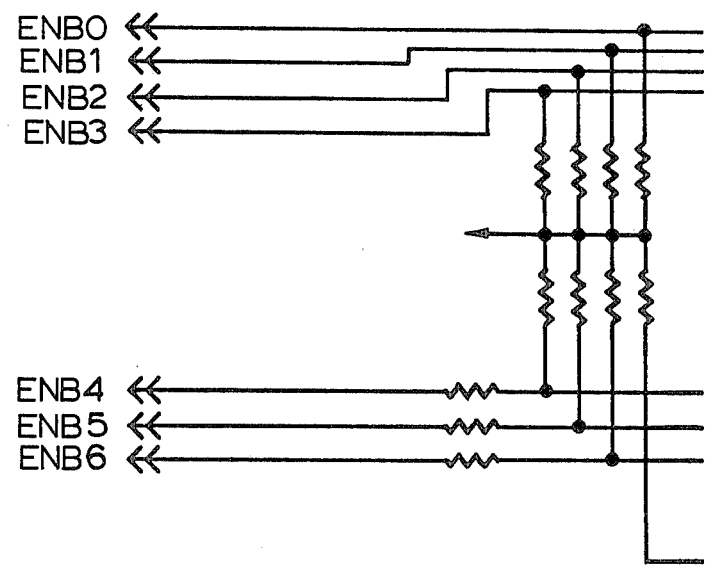
FIG. 28a
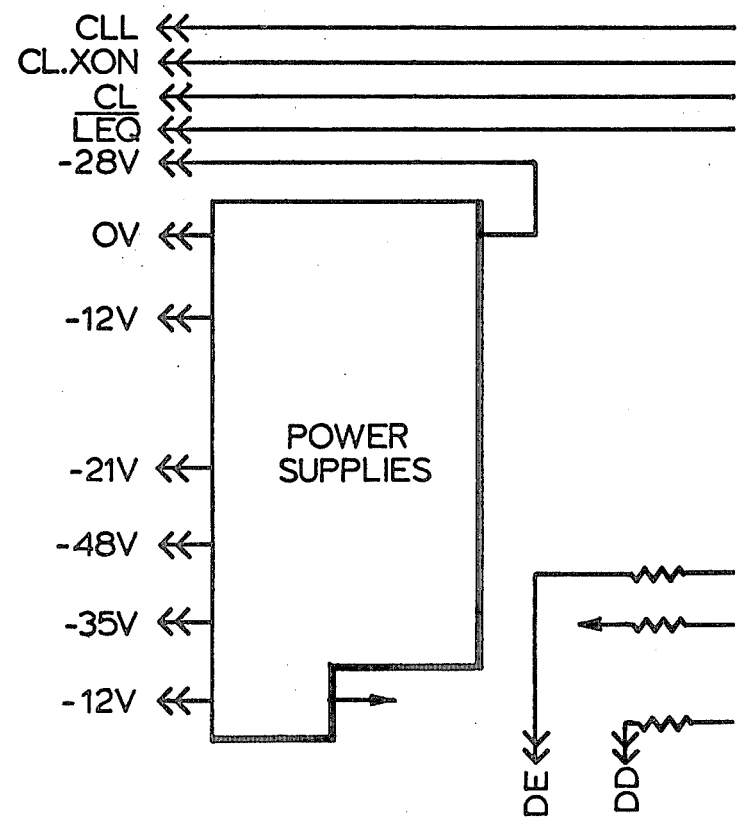

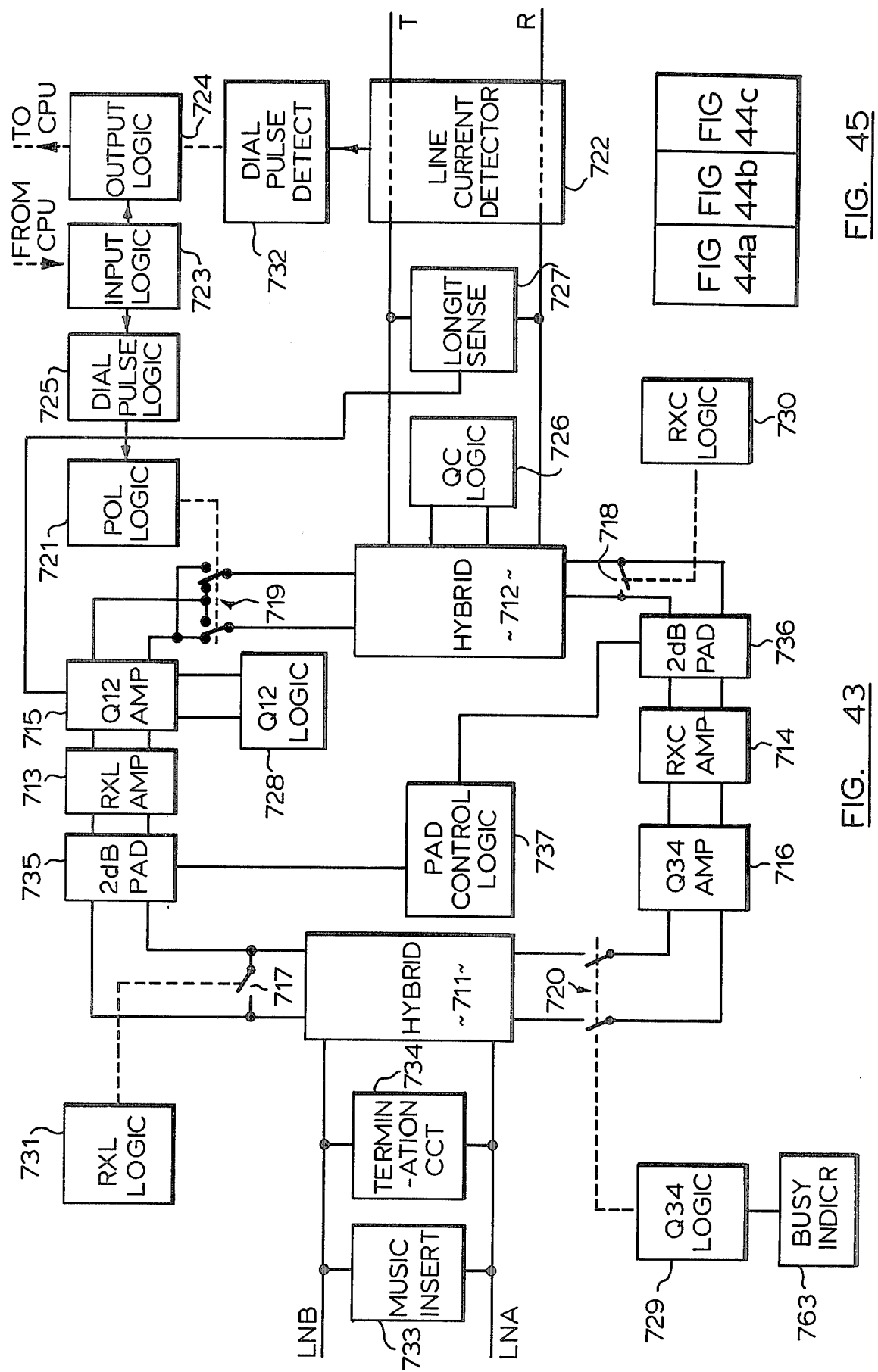

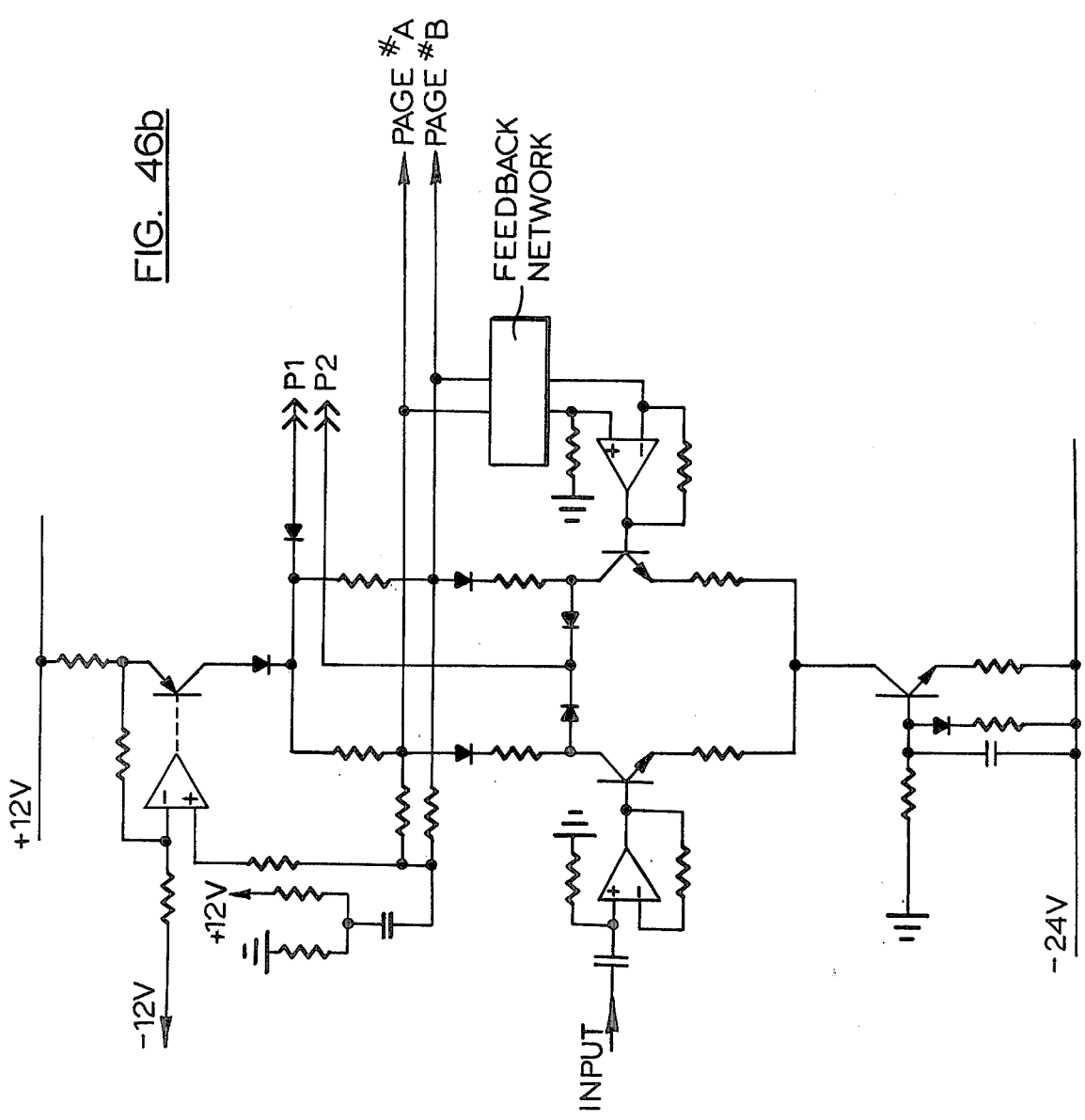

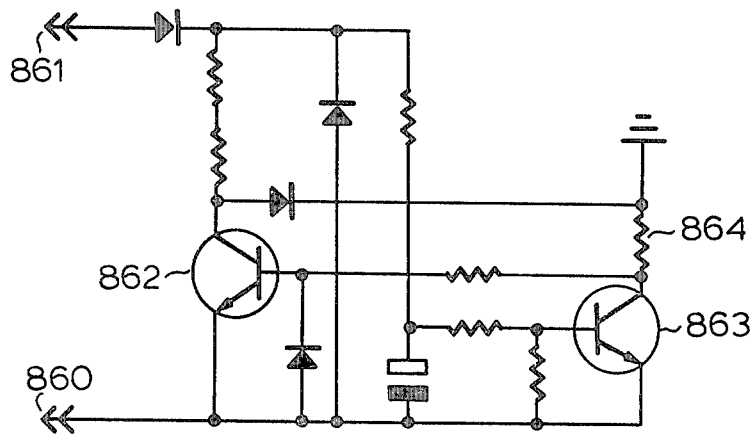
FIG. 48
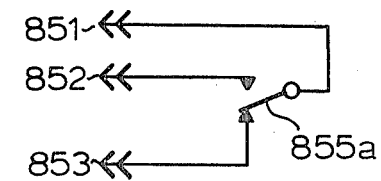
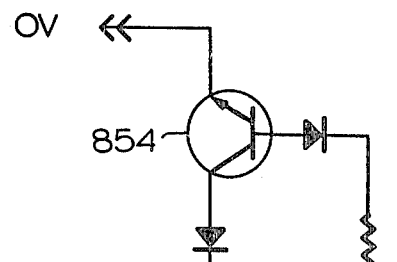
FIG. 47
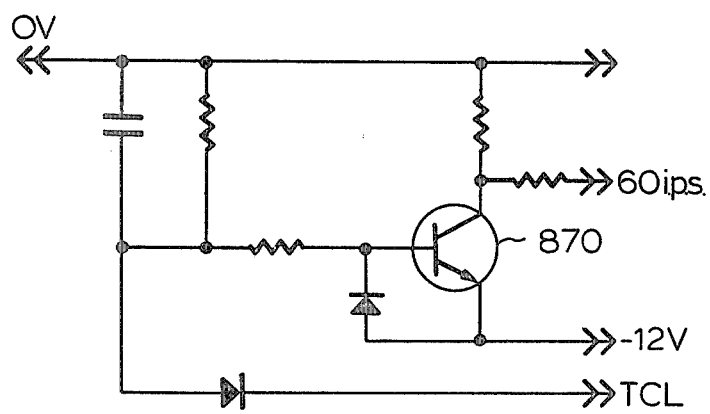
FIG. 49
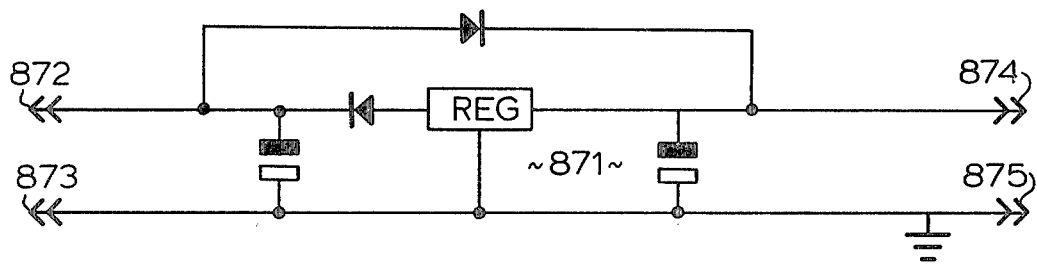
FIG. 50
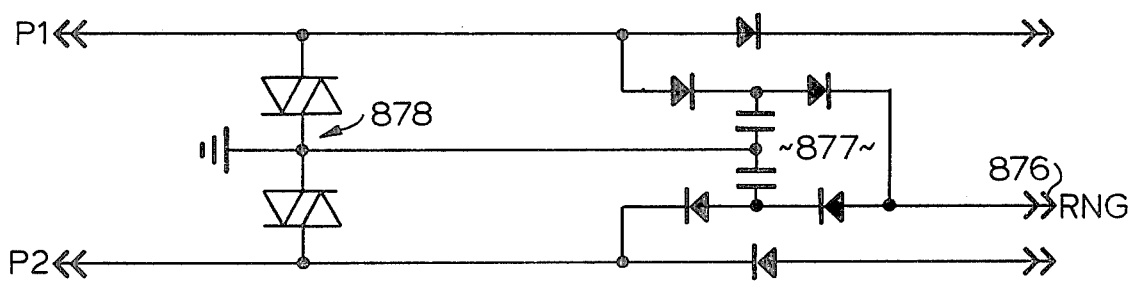
FIG. 51

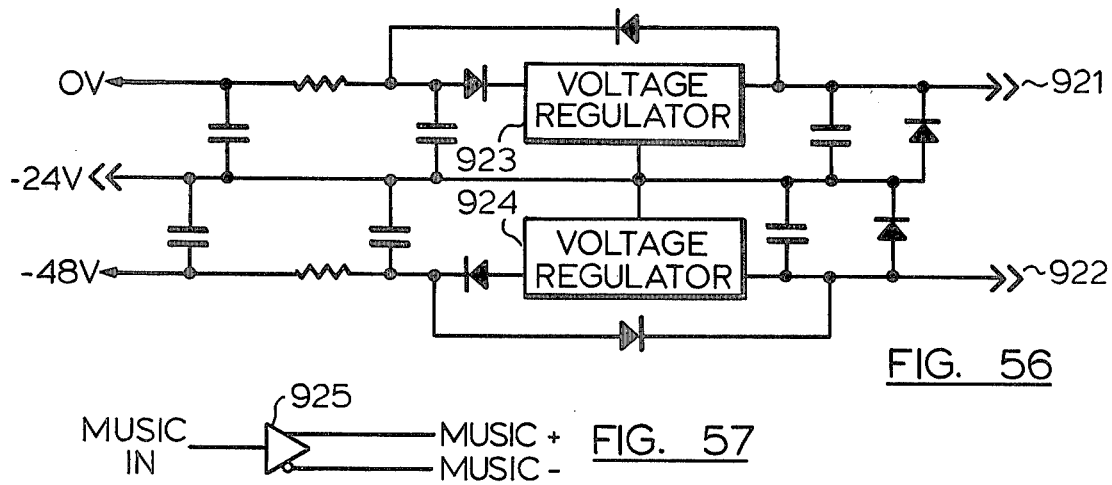
FIG. 56
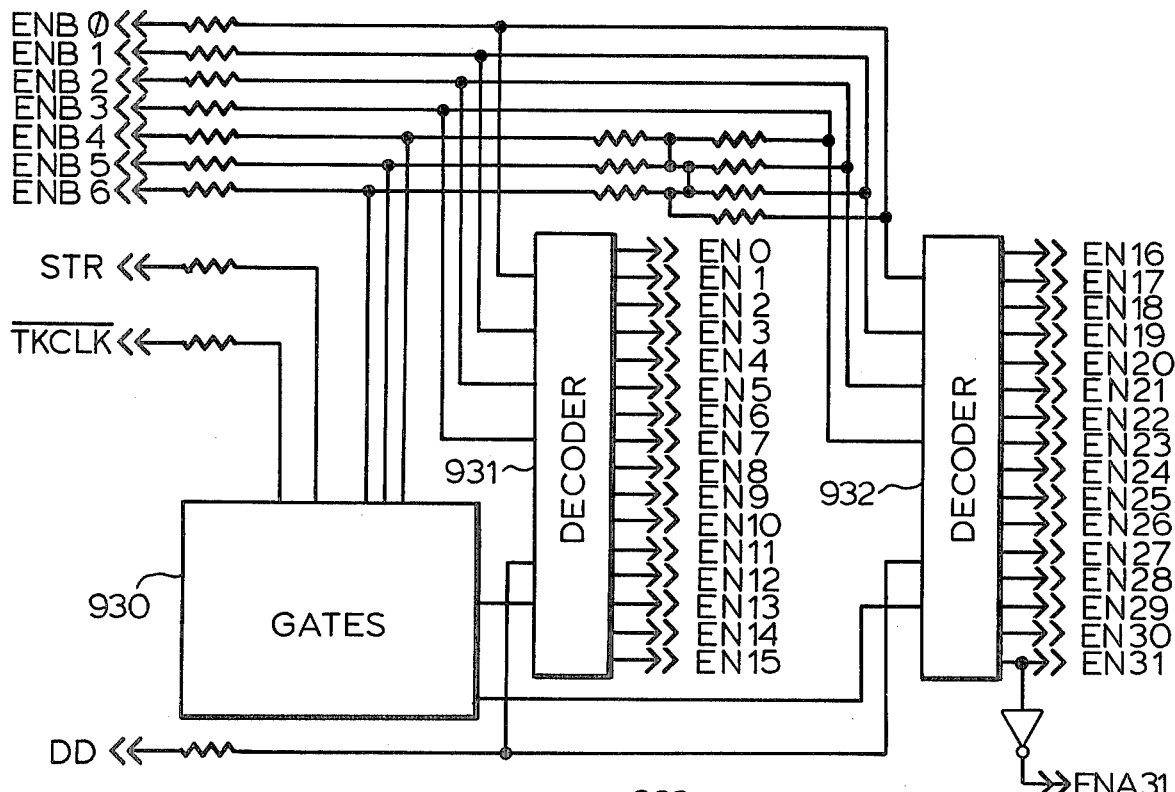
FIG. 57
FIG. 58
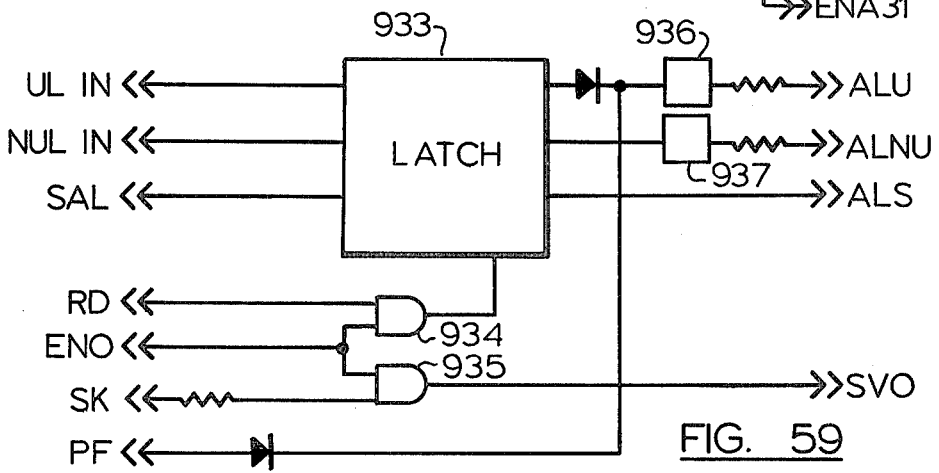
FIG. 59

ELECTRONIC TELEPHONE SYSTEM WITH TIME DIVISION MULTIPLEXED SIGNALLING

BACKGROUND OF THE INVENTION

This invention relates to private electronic telephone systems and is concerned primarily with such systems intended for use in installations of intermediate size, that is to say, between ten and one hundred internal extensions.

Small installations comprising of about ten internal telephone extensions are normally catered for by key type systems, which are economical and usually quite adequate for small installations. Large installations, on the other hand, having several hundred or several thousand internal telephones, require complex switching systems and are usually served by PABX systems which, although involving a high capital cost, can be economically justified since the cost is shared over a large number of extensions. However, a problem arises in the case of an installation of intermediate size, having up to about one hundred extensions, in which a key type system would not provide the required flexibility and in which the capital cost of a PABX system would usually be prohibitively high. There is a very large, and increasing, demand for private telephone exchanges in the intermediate size range, wherein considerations of operational flexibility and economy of installation are of critical importance, and the demand has given rise to the need for a new electronic technology which can be so applied. The present invention provides such a technology.

According to one aspect of the present invention there is provided an electronic telephone system having a plurality of terminal units which are connected radially to a central equipment by respective cables each including at least one conductor pair providing a transmission path for system signalling, said conductor pairs being connected to a common control unit at the central equipment, the common control unit including: a timing generator for generating address signals and timing signals, multiplexing means controlled by the timing generator in accordance with the generation of said address signals for placing the units sequentially in communication with the common control unit for exchanging information therewith, said terminal units being scanned in cyclic sequence, each unit being allotted a unique time slot within the scanning cycle, and means responsive to timing signals from the timing generator for controlling the transmission of data over said system signalling paths, said means dividing each of said allotted time slots into distinct periods in which data is transmitted unidirectionally from the terminal unit to the common control unit and in which data is transmitted from the common control unit to the terminal unit, respectively, the conductor pairs being connected to transmit both system signals and d.c. power for consumption at the terminal units and each said conductor pair being a balanced pair terminated by a matching impedance at the respective terminal unit.

According to another aspect of the invention there is provided an electronic telephone system having a plurality of extension line units which are connected radially to a central equipment by respective cables each including a first conductor pair providing a speech transmission path and a second conductor pair providing a separate transmission path for system signalling, said first and second conductor pairs being connected respectively to a crosspoint matrix and to a common control unit at the central equipment, the common control unit including: a timing generator for generating address signals and timing signals, multiplexing means controlled by the timing generator in accordance with the generation of said address signals for placing the extension line units sequentially in communication with the common control unit for exchanging information therewith, the extension line units being scanned in cyclic sequence, each unit being allotted a unique time slot within the scanning cycle, and means responsive to timing signals from the timing generator for controlling the transmission of data over said system signalling paths, said means dividing each of said allotted time slots into distinct periods in which data is transmitted unidirectionally from the extension line unit to the central control unit and in which data is transmitted unidirectionally from the central control unit to the extension line unit, respectively, the conductor pairs being connected to transmit both system signals and d.c. power for consumption at the terminal units and each of said second conductor pairs being a balanced pair terminated by a matching impedance at the respective extension line unit.

Preferably, where the extension line units are associated with respective telephone instruments, each telephone instrument has a control panel including a keypad and a set of indicator lamps operatively associated with respective particular keys thereof, and each extension line unit includes means responsive to key operation for transmitting data to the common control unit in accordance with such operation, and means responsive to data received from the common control unit for selectively controlling the lamps in accordance with line signalling conditions, said lamps when operating indicating the status of connections to respective connected parties, each lamp being operable in different modes according to the status of the respective connection, each of said particular keys being operable to modify the status of the connection indicated by the associated indicator lamp.

According to yet another aspect of the invention there is provided in an electronic telephone system having a plurality of extension line units which are connected radially to a central equipment by respective cables each providing separate paths for speech transmission and system signalling, each said signal transmission path being constituted by a balanced conductor pair terminated at the respective unit by a matching impedance, circuit means for effecting bidirectional signalling along the conductor pair, said circuit means comprising a differential amplifier connected across the matching impedance for receiving data pulses from the central equipment, data processing means connected to receive the amplifier output, an electronic switching device connected across the conductor pair, and means for operating the electronic switching device in accordance with signals to be transmitted to the central equipment for applying data pulses across the pair.

According to yet another aspect of the invention there is provided an electronic telephone system having a plurality of extension line units which are connected radially to a central equipment by respective cables each providing separate paths for speech transmission and system signalling, each of said system signalling paths including a balanced pair adapted for bidirectional transmission of pulse signals, each extension line unit including: a matching impedance terminating the balanced pair, a differential amplifier having input terminals connected across the matching impedance, the amplifier having an output circuit for deriving data pulses in accordance with pulse signals received from the central equipment, a serial-to-parallel converter connected in said amplifier output circuit to control the receipt of data pulses therefrom, a latching circuit for storing the output of the serial-to-parallel converter, indicators responsive to the latched output of the serial-to-parallel converter for indicating a called condition, switching means for initiating data to be transmitted to the central equipment in accordance with the signalling condition of the extension line unit, pulse generating means responsive to said switching means for generating data pulses to be transmitted to the central equipment, and an electronic switching device connected across the balanced pair, said electronic switching device being responsive to the generated pulses for applying voltage pulses across the conductor pair.

According to yet another aspect of the invention there is provided in an electronic telephone system including a solid-state crosspoint matrix operable by a central control for selectively interconnecting calling and called parties in accordance with system signalling conditions, the system serving at least one trunk having tip and ring leads constituting a trunk pair, the system further including a trunk interface connected to the crosspoint matrix by a conductor pair providing a speech transmission path and to the central control by conductors used for system signalling, the trunk interface comprising: a first resistance hybrid network providing a first pair of network terminals connected to said tip and ring leads, and second and third pairs of network terminals, the network providing a matching impedance terminating the trunk pair, a second resistance hybrid network having a first pair of network terminals connected to the conductors of said conductor pair, and second and third pairs of network terminals, the second resistance hybrid network providing a matching impedance terminating said conductor pair, the second pair of network terminals of each resistance hybrid network being connected to the third pair of network terminals of the other network by respective circuits each providing a unidirectional path for speech transmission, said circuits including control means responsive to trunk signalling connected to the central control, said control means including respective switching means responsive to incoming and outgoing call signals for rendering the circuits operable and inoperable in accordance with calling conditions.

According to yet another aspect of the invention there is provided in an electronic telephone system having a plurality of extension line units and an attendant's unit connected to a common control for exchanging data therewith, said units being scanned sequentially by the common control in a time-division-multiplex mode, each unit being allotted a unique time slot within the scanning cycle, the attendant's unit comprising:

a console having a plurality of keys operable for making line connections and effecting line control functions, the console having an associated circuit including switching means actuated by the keys for initiating the transmission of coded data to the central control in accordance with such key operation, said associated circuit including:

a free running clock oscillator furnishing clock pulses, gating means for gating said clock pulses with timing pulses defining the time slot allotted to the attendant's unit, a counter having input circuit means connected to receive the output of said gating means, and output circuit means connected to a decoder for decoding the output of the counter, the decoded output providing binary address signals for the keys, said switching means being sequentially scanned in accordance with the generation of said binary address signals, latching means for latching the output data of an actuated one of said switching means first detected by such scanning, the output data being stored by the latching means until release of the associated key, and means for releasing said stored data to the central control.

According to yet another aspect of the invention there is provided a private automatic branch exchange system having a plurality of extension line units associated with respective telephone instruments, said extension line units being connected radially to a crosspoint matrix and to a common control unit by respective conductor pairs providing separate paths for speech transmission and for system signalling, the signalling pairs being balanced pairs each terminated by matching impedances, the system further including a plurality of trunk interface units each providing a speech transmission path connected to the crosspoint matrix and a separate transmission path for system signalling connected to the common control unit, the extension line units and trunk interface units being cyclically scanned by the common control unit in a time-division-multiplex mode, the common control unit including a central processor responsive to respective line signalling conditions for generating control signals and supervisory signals in accordance therewith, and the crosspoint matrix being responsive to said control signals for selectively interconnecting said speech paths for connecting local and trunk calling parties to local and trunk called parties, each said telephone instrument having a keypad and a set of indicator lamps, the associated line unit including a transmitter circuit including switches operable by the keypad for initiating transmission of data to the control unit in accordance with key operation and a receiver circuit including decoder means for decoding data received from the control unit and driver means responsive to the decoded data for selectively controlling the lamps to indicate designated line signalling conditions.

A system according to the invention is preferably capable of providing a full range of PABX facilities, some of which may be available as optional additions to the basic system. The basic system may include facilities for direct outward dialing, directly connected internal calls; group calls; night service arrangements, inward and outward call restriction by class of service fields; call transfer by individual extensions or by attendant; consultation hold and three-way conference calls; power fail transfer; trunk answer from any station; push-button "dialing"; call waiting signal; connections to tie trunks; tandem switching of the tie trunk calls; C.C.S.A. access; call pick-up; two-way call splitting; secrecy; camp-on; and indication of camp-on. Optional additions may include facilities for identified outward dialing; speed calling; access to paging systems and code-call system; Toll denial; recorded telephone dictation; "barge-in", etc.

BRIEF DESCRIPTION OF THE DRAWINGS

In order that the invention may be readily understood, one embodiment thereof will now be described by way of example, with reference to the accompanying drawings, in which:

FIG. 4 illustrates a direct station selection console, which is associated with the attendant's console;

FIG. 9, on the same sheet as FIG. 4, is a block diagram showing schematically the general organization of the central processor and memory;

FIGS. 11a and 11b are timing diagrams relating to certain outputs of the timing generator;

FIG. 12 illustrates the circuit of a two-phase clock generator used in the system;

FIG. 18, on the same sheet as FIGS. 11a, 11b, and 12, illustrates a voltage comparator used in the line data multiplexer;

FIGS. 20a, 20b and 20c together illustrate part of the circuitry of the attendant's console;

FIGS. 22a and 22b illustrate the interface circuitry of the attendant's console;

FIGS. 28a, 28b and 28c together form a schematic circuit diagram of a system component referred to herein as the "crosspoint preselector";

FIG. 35c, on same sheet as FIGS. 22a and 22b, illustrates a detail of the tone insertion unit;

FIG. 43 is a simplified block diagram of a tie-trunk interface and control circuits therefor;

FIG. 45, on same sheet as FIG. 43, is a diagram showing the organization of FIGS. 44a, 44b and 44c;

FIGS. 46a and 46b together illustrate the control circuitry of a page trunk interface;

FIG. 47 is a diagram of a remote alarm circuit;

FIGS. 48–55 illustrate a number of miscellaneous circuits which are provided on a board labelled "Auxiliary Supply";

FIGS. 56–59 illustrate a number of miscellaneous circuits which are provided on a board labelled "Alarm and Interface"

GENERAL

Figure 3:
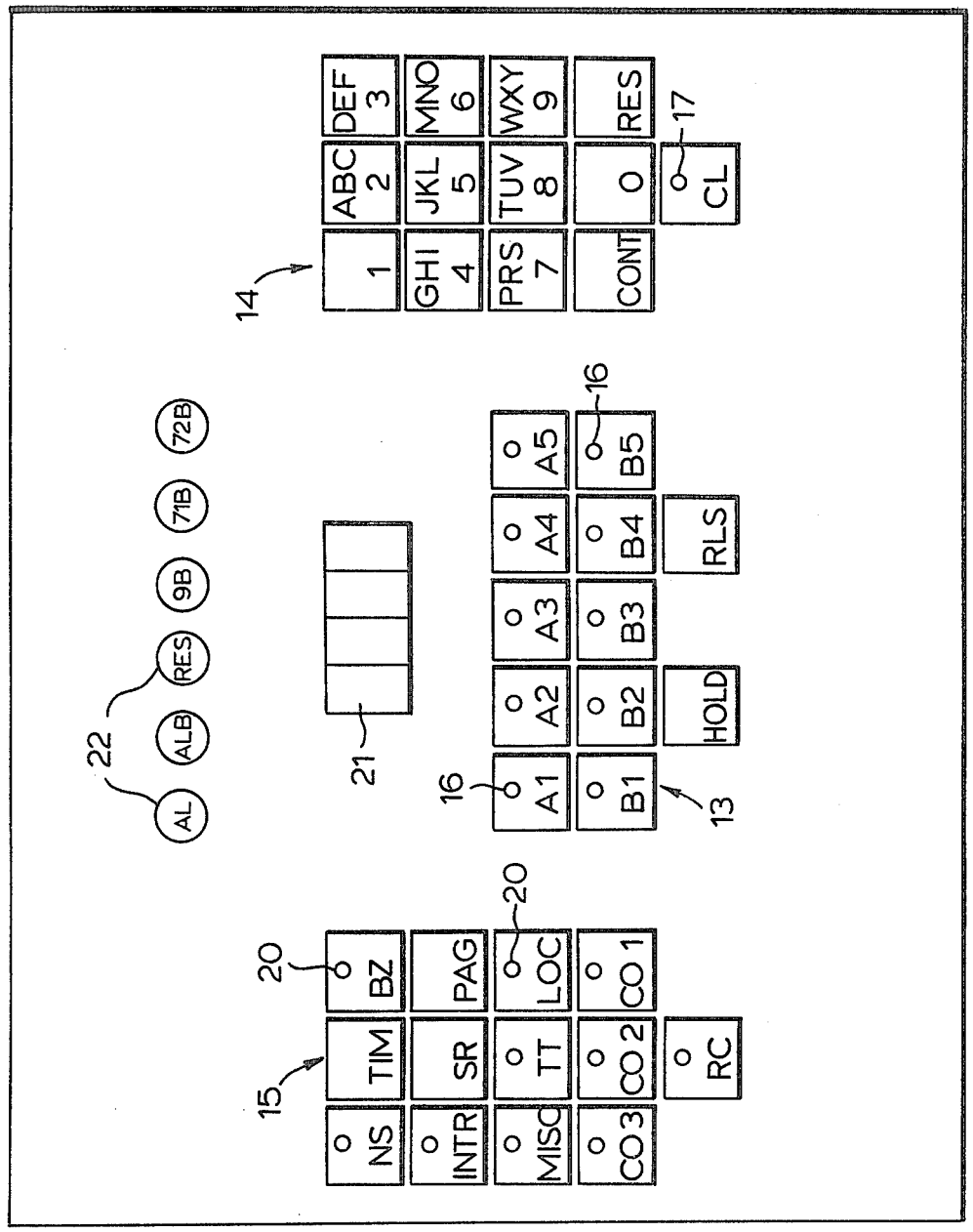
FIG. 3 illustrates the control panel of the attendant's console.

The system is characterized by the use of large scale integrated circuits. At the heart of the system is a very simple rectangular crosspoint matrix, in which each crosspoint is composed of a pair of SCR's which are triggered ON and OFF by signals generated in accordance with system data processing operations. The crosspoints are directly connected to the speech lines of the extension instrument, and to various trunk lines via suitable interface circuitry. As solid state crosspoints cannot withstand the potentials which quite frequently occur on telephone lines, it is usual to employ transformers as part of the crosspoint protection. In the present system, however, to reduce bulk and cost of equipment and to improve transmission performance, the crosspoints are protected by electronic interface circuitry containing transistors capable of withstanding high potentials. On the low voltage side of the interface a direct current path is provided for the latching currents of the crosspoints.

An important feature of the system is that each extension instrument is connected radially to a central equipment by a two-pair cable, one pair being used for speech transmission and the other pair being used for system signalling. The internal signalling within the system, and control of the crosspoint matrix, are implemented in a time division multiplex fashion in four groups of thirty two line circuits. Thus the system has 128 ports, of which a total of 127 can be used for communication purposes, providing connections to subsets, groupsets, trunks and consoles. All these ports are scanned in cyclic sequence, each port being scanned once every 50 ms, to inform a central processor of the signalling states of the ports and to enable the central processor to send signalling commands to each port. The timing is controlled by a timing generator which sends out a seven bit code which changes every 390 $\mu$s, approximately (i.e. 50 ms/128). This code identifies the port which is being dealt with at any particular time for data collection and data distribution. For a short time during each 390 $\mu$s period the work of the central processor unit is suspended for a few microseconds to allow this data to be transferred in parallel form to and from a memory. The central processor makes all the major decisions and issues all the major commands in the system, dealing with the ports one at a time in the order determined by the scan from the timing generator. The time required to make all the decisions relating to a given port varies between about 100 $\mu$s for the simplest and commonest operations and nearly 5 ms for the complex and least common operations. There is no assurance that the central processor will complete its work relating to a given port within the period during which the port is being scanned. However, since the information it needs is available in the memory, and since its decisions and commands are entered into the memory for use the next time the scan returns to a port, the central processing unit can work up to 50 ms behind the scan without missing any data. Since almost all incoming data remains unchanged for a period longer than 50 ms, it is extremely rarely that the central processor will miss any data even if it lags behind the scan for more than 50 ms.

TERMINALS

Figure 1:
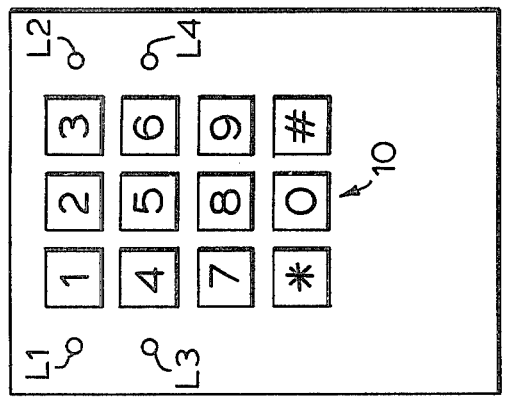
FIG. 1 illustrates the control panel of an internal telephone of the system associated with an extension line unit and herein referred to as a "subset"

The telephone instrument associated with each extension line unit is in appearance of the "Touchtone" type,—("Touchtone" is a Trade Mark)—but as hereinafter described the "Touchtone" signals are generated in the central equipment rather than in the instruments, and are used for control purposes on trunks and to simulate D.T.M.F. operation at the instruments. FIG. 1 illustrates the control panel of an internal extension instrument, or subset. The control panel provides a conventional twelve-button keypad 10, but provides also four indicator lamps L1, L2, L3 and L4, which are used to indicate the status of connections to respective connected parties.

Figure 2:
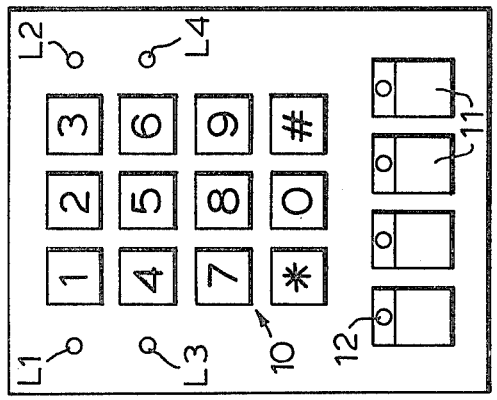
FIG. 2 illustrates the control panel of an internal telephone of the system associated with an extension line unit which is herein referred to as a "groupset"

Certain extension instruments, subsets, groupsets and/or callmasters, are connected in groups, there being up to three such groups in the present system, the instruments being alerted when a call arrives on the associated trunk or trunks by a common audible and by a flashing lamp on each instrument. Facilities are also provided for receiving dedicated incoming calls. FIG. 2 illustrates the control panel of an instrument which is referred to herein as a groupset. The control panel is provided with a conventional twelve-button keypad 10 and four indicator lamps L1, L2, L3, and L4, corresponding to those of the subset panel, and additionally has four pushbuttons 11 for the selection of lines, each pushbutton being combined with a respective indicator lamp 12 for indicating the condition of the associated line. The additional pushbuttons give enhanced control as compared with subsets, allowing for direct pick up of certain types of calls.

The control panel at the attendant's console is illustrated in FIG. 3. This panel has thirty eight keys arranged in groups 13, 14, 15, the central group of keys 13 including five pairs of switched loop control keys, A1, B1; A2, B2; A3, B3; A4, B4; and A5, B5, each key being combined with a respective indicator lamp 16. The central group 13 also includes two further keys HOLD and RLS for effecting line-hold and line-release functions. The group of keys 14 takes the form of a keypad with ten keys for selecting lines to make outgoing calls and to extend incoming calls, a key for trunk control CONT, and a key for reserving trunks RES. A thirteenth key CL, having an associated indicator lamp 17, is used for line clearance. The third group 15 includes a number of miscellaneous control keys, NS, TIM, BZ, INTR, SR, PAG, MISC, TT, LOC, CO1, CO2, CO3 and RC, ten of these keys being combined with indicator lamps 20. The purposes of these keys will be described in due course, but it may be mentioned briefly at this point that the keys are used respectively to provide for night service arrangements (NS), time display (TIM), audible control (BZ), attendant's intrusion on connected calls (INTR), series call (SR), paging (PAG), selection of miscellaneous trunks (MISC), selection of tie trunks (TT), selection of calls from internal extensions to attendant (LOC), selection of central office trunks (CO1, CO2, CO3), and recall of waiting calls (RC). Above the central group of keys 13 is an indicator panel 21 which is used to identify internal stations and trunks and also to display the time when required. Above the display panel 21 are six equipment status indicating lamps 22 which are used to indicate the status of various sectors of the system as hereinafter described.

Associated with the attendant's console is a direct station selection console (DSS), which is illustrated in FIG. 4. The DSS console also acts as a busy lamp field. The console provides a square array of one hundred keys 23, which are numbered 201 to 299 corresponding to extension numbers, with one dummy. Associated with each key is an indicator lamp 24. Data is continually sent to the DSS equipment from the central processor so that the equipment is informed as to which extension is being scanned at any time and whether that extension is busy. The information received is used to update all the lamps 24 every 50 ms.

Figure 5:
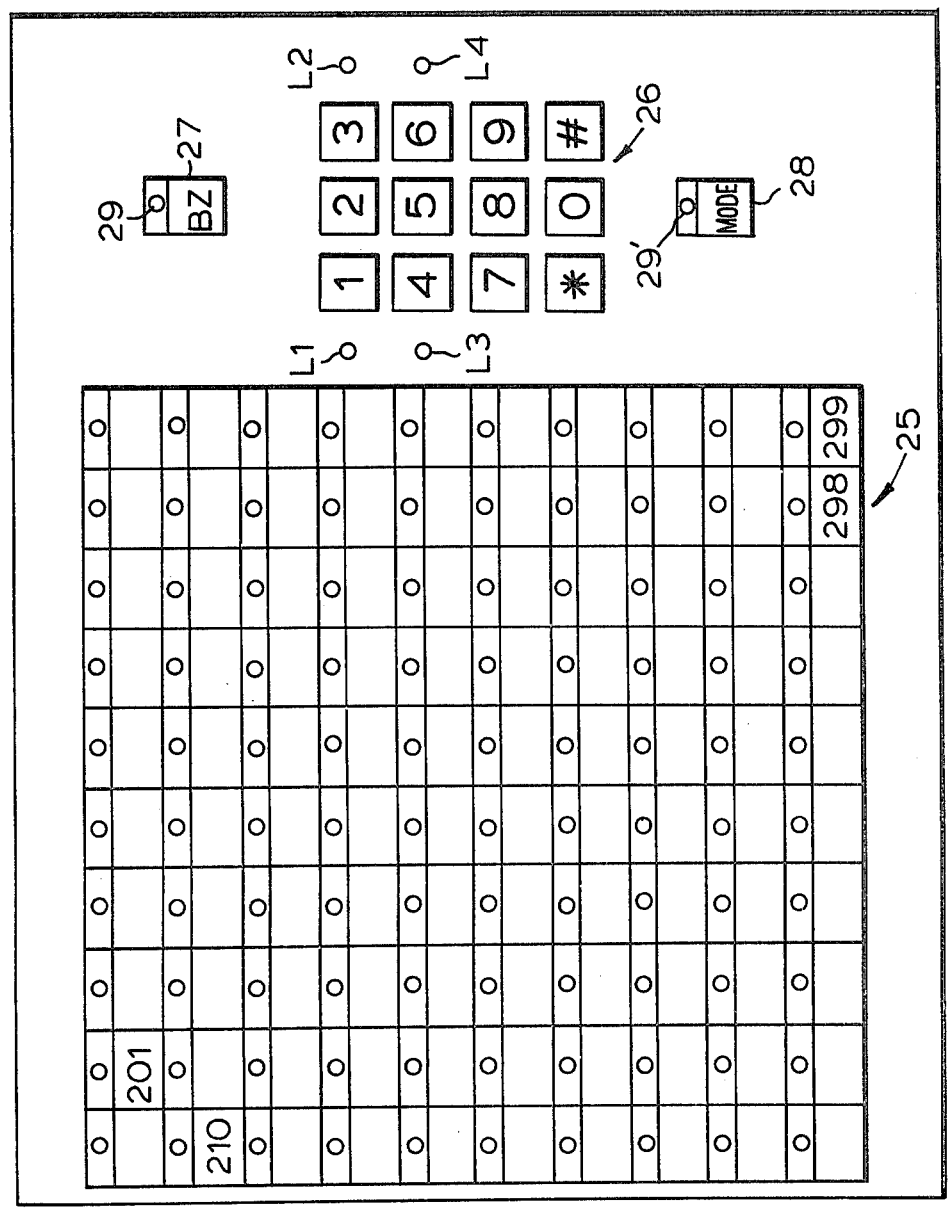
FIG. 5 illustrates a special purpose control panel referred to herein as the "callmaster console"

An additional terminal of the system is the callmaster, the console of which is shown in FIG. 5. The console provides a keypad and lamp display indicated generally at 25, this display being identical with that of the DSS console, and also provides a key-pad 26 with indicator lamps L1, L2, L3 and L4 which correspond to the keypad and indicator lamps of the subset control panel shown in FIG. 1. The callmaster provides two additional facilities not available in subsets. First, the lamp display provides a visual indication of which extensions are engaged or being rung at a given time, each lamp being assigned to a respective one of the extensions, and the user can pick up a call from any such extension simply by depressing the associated key. Second, the callmaster can be placed in a direct station selection mode, enabling the user to call any extension simply by depressing the appropriate key which initiates dialling of the extension number. In the case of a subset, by contrast, it is necessary always to dial the digits of the extension number individually. Additionally the callmaster provides two additional keys 27, 28, having associated indicator lamps 29 and 29', respectively. The key 27 is used for audible control at the console and the other key 28 is a "mode" key used to place the callmaster in the direct station selection mode when required.

EQUIPMENT CABINET

Figure 6:
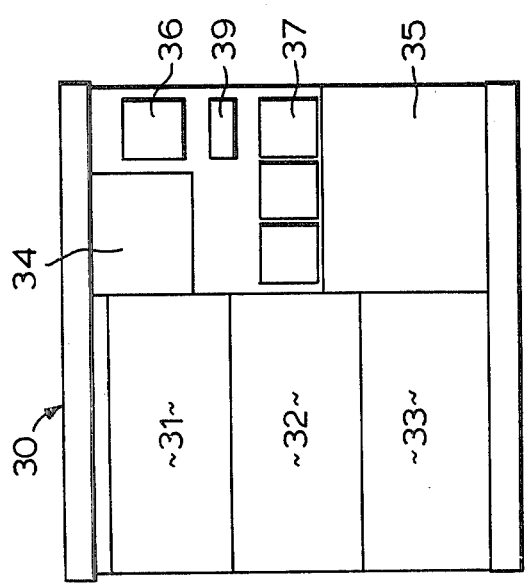
FIG. 6 is a front elevational view of the central equipment cabinet.
Figure 7:
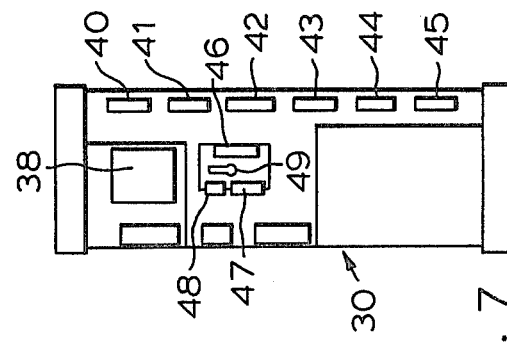
FIG. 7 is a side elevational view of the central equipment cabinet.

The central equipment is housed in a cabinet 30, which is illustrated in FIGS. 6 and 7 of the drawings. The control circuitry of the central equipment is mounted on circuit boards located in shelves 31, 32, 33, 34. The cabinet includes a compartment 35 for the main power supply of the equipment, a quick-connect block 36 for the trunk connections, and may optionally include a quick-connect block 37 for the extension connections and a unit 38 which is a ringing generator used only to provide ringing for off-premise extension instruments. An auxiliary connector block is showh at 39. Connectors for subset and groupset cables are provided at 40 to 45 (FIG. 7), and connectors 46, 47, 48 are provided for cables to the attendant console, the callmaster and a service unit respectively. A service switch is shown at 49.

SYSTEM DESCRIPTION

General Organization

Figure 8:
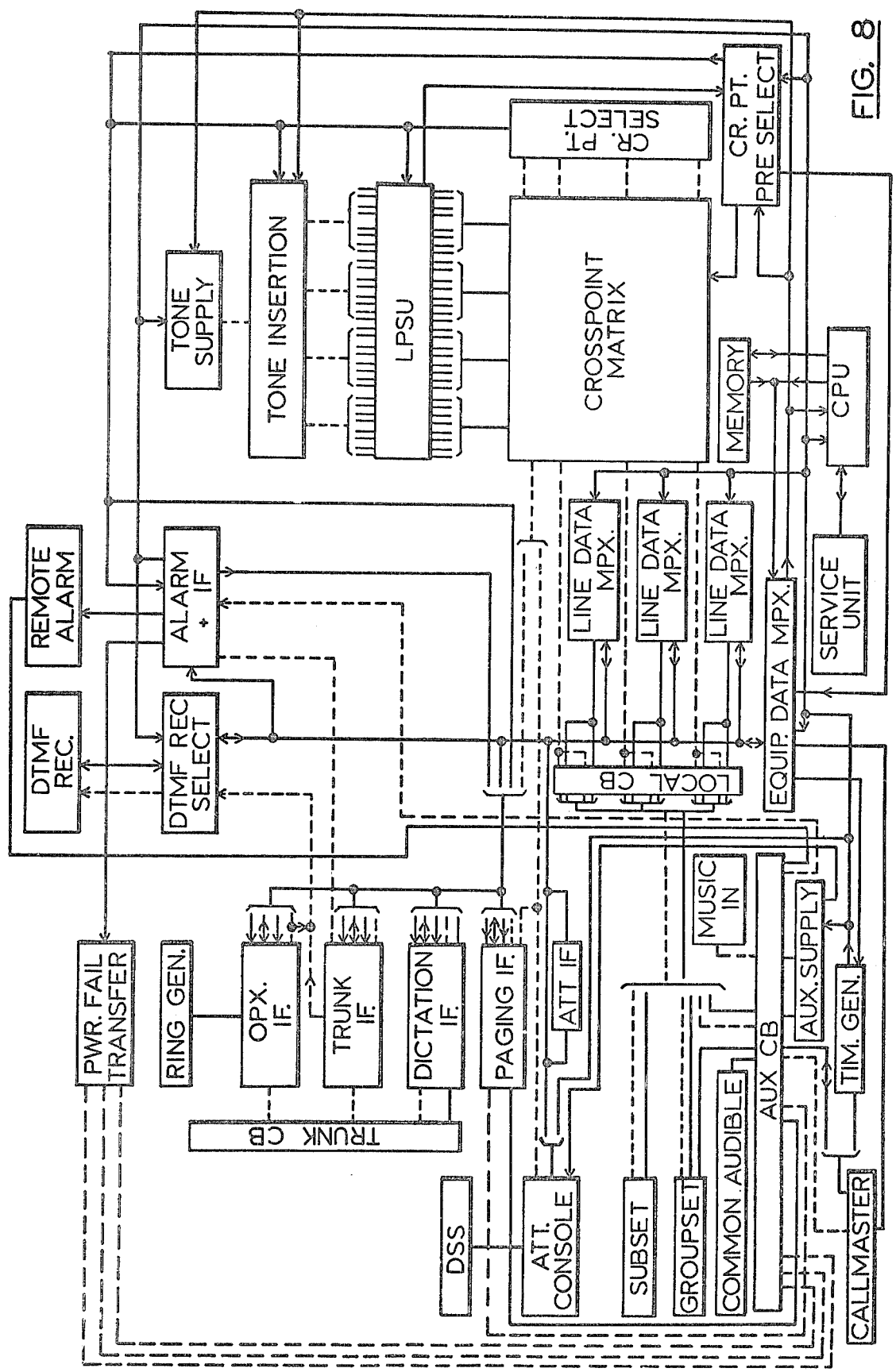
FIG. 8 is a block diagram showing the general organization of the system.

FIG. 8 is a block diagram showing schematically the basic arrangement of a system embodying the invention. In the diagram, for ease of illustration, speech paths are shown by broken lines while data paths are shown by full lines.

As previously mentioned, the system provides a total of 128 ports to which a total of 127 extensions, trunks, consoles, etc. are connected. The central equipment provides a truck connector block TRUNK CB with connectors to which all trunk cables are connected, suitable interface circuitry for the trunks being provided for protection of the solid state crosspoints of the crosspoint matrix, and a local station connector block LOCAL CB with connectors to which the two-pair cables from all internal instruments are connected. As previously pointed out, the internal instruments are connected radially to the central equipment. An auxiliary connector block AUX. CB provides connections to a paging interface, common audibles, a remote alarm, power supplies for the common audibles and remote alarm, a callmaster, a power fail transfer circuit, "Music In" and a groupset supply.

The ports are scanned in cyclic sequence at 50 ms intervals, each port being dealt with for a period of approximately 390 μs during which the central processor CPU is made aware of the condition of the port and issues commands as necessary to effect appropriate changes in the condition of the crosspoint matrix and to condition the various visual and aural indicators at the system terminals. Scanning is effected by the timing generator TIM.GEN., which furnishes address signals providing the required scanning code and additional control signals by which the timing of data processing operations is controlled.

The components of the system illustrated in FIG. 8 will be described in more detail subsequently, but their functions in relation to the system will now be briefly described.

The timing generator TIM.GEN., as previously mentioned, controls the timing of operations in the system. All major decisions are made by the central processor unit CPU, which is associated with a memory complex MEMORY. A multiplexer EQUIP. DATA MPX. acts as a buffer, collector and distributor of almost all data passing between the CPU/MEMORY system and the rest of the system. Associated with the central processor CPU is a coding terminal or SERVICE UNIT, which is used to insert or modify program information in the memory complex of the CPU/MEMORY system, and also in tracing system faults. The service unit is not an inherent part of the present system and will not be described in detail. The system includes three line data multiplexers LINE DATA MPX., which deal specifically with lines serving subsets, groupsets and callmasters. Each line data multiplexer is associated with thirty two lines and is scanned in accordance with address information from the timing generator, the thirty two line pairs being addressed in turn with a cycle time of 50 ms, each line being selected for a period of 1560 μs in each cycle. Only during the third guarter (390 μs) of this period can the line data multiplexer exchange information relating to the selected line with the central equipment. Within the 390 μs period each line data multiplexer exchanges data in parallel form to and from the central processor CPU, and receives and transmits line data in serial form. The full 1560 μs period is utilized to receive and transmit line data so as to minimize the line data rate—in this way line loss is minimized and subsets can operate on up to one mile of line.

Each SUBSET is characterized by the fact that the speech and data circuits are quite separate. The speech circuit is almost entirely conventional, except that most of the switch contacts are transferred to the data circuit, and D.T.M.F. signals are generated at the central equipment. Since the central generation of the D.T.M.F. signals results in a slight delay in removing a signal after a key has been released, a circuit is included for delaying restoration of normal receiver sensitivity for a short period after release of a key.

Most of the circuits in each GROUPSET are identical with those of a SUBSET. A third pair is needed, however, primarily to supply power to the additional four lamps 12 (FIG. 2). The sixth bit of incoming data is used to light the additional lamps via latches and buffers. Every 50 ms the bit refers to a different lamp so that, with four lamps, the lamp condition is updated every 200 ms.

The CALLMASTER provides a speech circuit which is virtually identical with that of a subset. The timing generator output, after buffering, is sent to the callmaster so that it knows which port is being scanned. At the same time a bit is sent, for each port to which an extension is connected, which shows whether the extension is being rung. This allows all lamp information on the callmaster to be updated every 50 ms. When a pickup key bearing the appropriate three-digit number is operated, the callmaster simulates the keying of the three digits as though the twelve button keypad has been used. Having picked up a call, the next operation is normally to extend the call to a third party. The mode key can be operated to put the callmaster in a direct station selection mode. The next time a pick-up key is operated, the pick-up function is omitted and a normal call using direct station selection is made. The mode always reverts to pick-up after operation of a pick-up key, or after a further operation of the mode key, or when on hook. By means of a switch inside the callmaster console, the operation of the callmaster can be changed so that its normal state corresponds to the direct station selection mode and the pick-up mode requires operation of the mode switch; the callmaster can thus be used in place of the attendant's console in a situation where the volume of traffic does not justify an attendant's console.

The CROSSPOINT MATRIX lies at the heart of the system and, as previously indicated, is a very simple rectangular crosspoint matrix. Each crosspoint is composed of a pair of SCR's which are triggered on and off with the aid of a link power supply LPSU and a crosspoint preselector CR.PT. PRESELECT. The crosspoints are directly connected to the subset, groupset, and callmaster speech lines. When on, current flows from the positive terminal of the link power supply, through one SCR to line via the subset, etc. and returns via the other SCR of the pair to the negative terminal of the link power supply. The link power supply has a low direct current impedance so that it is possible to connect several subsets in parallel via three crosspoint pairs. A crosspoint is turned off by means of a crosspoint selector unit CR.PT. SELECT which drives the positive leg of the line more positive and the negative leg more negative than the terminals of the link power supply, thus removing the standing current in the SCR's and so turning off the crosspoint. When a crosspoint is to be turned on, trigger pulses are applied to the selected link power supply and designated crosspoint boards in order to turn on the crosspoint. When the trigger pulses are removed, the crosspoint SCR's continue to hold due to the line current.

A crosspoint in a given row of the crosspoint matrix is turned on or off only when the system scan reaches the port to which the crosspoint row is connected. The crosspoint preselector unit CR.PT. PRESELECT receives the scan information from the timing generator TIM.GEN. and also crosspoint switch on/off and link address information from the central processor. It sorts this information and forwards it to the appropriate crosspoint, crosspoint selector and link power supply boards. The information is combined to turn on or off the respective crosspoint.

The crosspoint selector unit, when commanded by the crosspoint preselector unit, drives the positive leg of the line pair more positive and the negative leg more negative than the link pair voltages, thus turning the crosspoints off as described.

The link power supply LPSU provides essentially an electronically simulated balanced choke feed having a very low direct current impedance and a very high audio frequency impedance. It provides sufficient current to feed three line pairs in parallel but is protected from short circuits by a fold back circuit. When a crosspoint is to be turned on, the link power supply unit under the control of the crosspoint preselector unit drives the positive leg of the line pair more positive and the negative leg more negative, thus allowing the crosspoint to be turned on as described above. The link power supply output remains constant while crosspoints are being switched off. When supervisory tones and D.T.M.F. signals are received from the tone insertion unit TONE INSERTION, the link power supply injects the signals onto the speech pair via an amplifier with a balanced high impedance output.

The direct station selection unit DSS serves to speed station calling and also acts as a busy lamp field. The lamp display of the direct station selection unit operates on principles very similar to those of the callmaster. The unit knows which port is being scanned at any time and also receives one bit which informs it whether that port is busy. It uses this information to update all lamps every 50 ms. When a key corresponding to the appropriate three-digit number is operated, the DSS console generates the digits automatically as though the individual digits had been keyed.

The trunk interfaces TRUNK IF., only one of which is indicated in FIG. 8, are furnished to protect the solid state crosspoints of the crosspoint matrix from unacceptable voltage conditions which may occur on trunks. Each interface is scanned, the scan signal for each interface being generated by a circuit ALARM IF under control of the timing generator TIM.GEN. Music is fed to all trunk interfaces and is injected into the line at the command of the central processor, which can also order a line termination to be connected when the interface is not connected to a circuit which provides an appropriate termination, thereby ensuring good stability.

Some installations may require off-premise extension instruments, either because of a line length in excess of one mile or because of a line which is susceptible to transients greater than can be accepted on subset lines. A conventional telephone is then connected to the system via an interface OPX. IF. This interface is very similar to a trunk interface but with different line signalling, and indeed, since the line carries both speech and signalling on a common pair, as do the trunk lines, the off-premise extension interface may properly be regarded as a trunk interface in the context of the present system. It is necessary to provide ringing to an off-premise extension instrument, and a ringing generator RING GEN supplies a constant ringing signal which is cadenced by switching on and off SCR's located in the interface, under the control of the central processor. The off-premise extension interface has an audio pick-up amplifier, similar to that of a tie trunk interface, which is used in conjunction with D.T.M.F. off-premise extension instrument.

A tone supply unit TONE SUPPLY generates eight pure tones which can be formed into D.T.M.F. signals by combination in pairs, and also generates the supervisory tones complete with cadencing where necessary. The tone supply unit also contains logic to decode information from the equipment data multiplexer which determines the validity of the tones to be selected. After decoding, this information is passed to the tone insertion unit, which is essentially a specialized crosspoint matrix which selects the correct tone or pair of tones for delivery to the required link. The low power levels allow the use of a complementary metal oxide semiconductor crosspoint which is easier to control and less expensive than the SCR's which are used in the main crosspoint matrix. It should be noted that all tones, including D.T.M.F. signals, are available as continuous supplies and, when keying takes place, it is these special crosspoints which respond to give the impression of direct key control corresponding to a conventional telephone system.

Associated with the attendant's console ATT. CONSOLE is an interface ATT IF which contains buffers for data to and from the console. Buffering is necessary to prevent accidental line shorts from affecting the working of the rest of the equipment cabinet. Most of the circuits used in the attendant's console are for gathering information from the keys to send to the central processor or for distributing information from the central processor to lamps and digital displays. Because a large amount of information must be passed and because the scan spends no more time dealing with the attendant than it takes to deal with other system ports, two scans are required to update the console completely. Instead of the serial data transmission on a single pair, as in the case of subsets and groupsets, the attendant console uses parallel data transmission over a 25-pair cable.

The system also provides a paging interface PAGING IF, which affords protection using technology similar to that of the trunk interface but rather simpler, and a dictation interface DICTATION IF, which provides a simplified speech path protection circuit.

When D.T.M.F. signals are to be received from direct inward dialing tie trunks or off-premise extensions, the selector circuit connects the appropriate interface to a D.T.M.F. receiver unit DTMF REC, when instructed by the central processor. A small crosspoint matrix or selector circuit DTMF REC SELECT is included to implement this. The selector circuit also contains the common circuits needed to multiplex the digital outputs of the receivers and send them to the central processor at the correct time via the equipment data multiplexer. The D.T.M.F. receiver unit contains up to three receivers of a standard type preceded by dial tone rejection filters.

Also provided in the system are an auxiliary supply unit AUX. SUPPLY and a remote alarm unit REMOTE ALARM, which are in fact provided on the same board, and one or more power fail transfer units PWR. FAIL TRANSFER, the details of which will be subsequently described.

The central processor CPU has access to the following main categories of stored information:
(1) For each port, information relating to
  (a) signalling state received at last scan;
  (b) line signalling state to be transmitted at next scan;
  (c) commands for operating crosspoints and controlling tones at next scan;
  (d) identity of link or links currently associated with the port;
  (e) Class of Service;
  (f) directory number of the port;
  (g) "Follow Me" address, where applicable;
(2) For each call, information relating to
  (a) identity of each port associated with the call;
  (b) The state of each of the relevant parties, e.g. keying, being rung, etc.;
  (c) timing on hook;
  (d) identity of any port which is keying or which controls a three-party call;
  (e) digits dialed by a keying party;
  (f) timing for recalls and for slow dialing;
(3) Alterable system information, including
  (a) Class of Service information;
  (b) automatic number analysis;
  (c) abbreviated dialing information;
  (d) information relating to intermediate decisions in central processing unit operations; and
(4) Programming information.

All the above information is stored in the MEMORY, which receives incoming data from, the delivers outgoing commands to, the equipment data multiplexer EQUIP. DATA MPX. under the direction of the timing generator and central processor for a short period during each 390 $\mu$s period within a scan. At other times the CPU alone has access to the MEMORY.

The CPU and MEMORY are organized in the manner illustrated diagrammatically in FIG. 9. The largest part of the memory is in the form of a Read-Only Memory, which contains the system program. The bit patterns in the Read-Only Memory are built in and cannot be altered by the central processor, by power failure, or by any other influence within the rating of the system. The memory also includes a first Random Access Memory the contents of which can be changed by the central processor, and rapidly becomes meaningless in the event of power failure. The central processor has a built in routine which ensures that the contents of the Random Access Memory are cleaned up, so that all calls are cleared, when power is switched on initially or when power fails. This clean up process takes about 200 ms.

Class of Service, Automatic Number Analysis, and similar information must occasionally be alterable and is not suitable for implementation using Read-Only Memories. For storing this information the present system uses a non-volatile second Random Access Memory with very low standby power consumption, this memory being associated with a trickle-charged standby battery on the memory board and being capable of storing such information for months, thus making it effectively non-volatile. In practice it has been found convenient for the central processor to access a duplicate of such information in the main Random Access Memory which has no battery back up and is therefore fully volatile. One byte (8 bits) of information is transferred from the non-volatile to the volatile memory every 50 ms. In the event of power failure, information in the volatile memory is temporarily unbarred, but the correct information is rapidly entered. The service unit associated with the central processor is used for modifying such information when required. When this information is being modified, transfer to the volatile memory is inhibited. When modification is complete, the central processor performs a sorting operation on Automatic Number Analysis information before transfer is effected.

The Timing Generator

Figure 10:
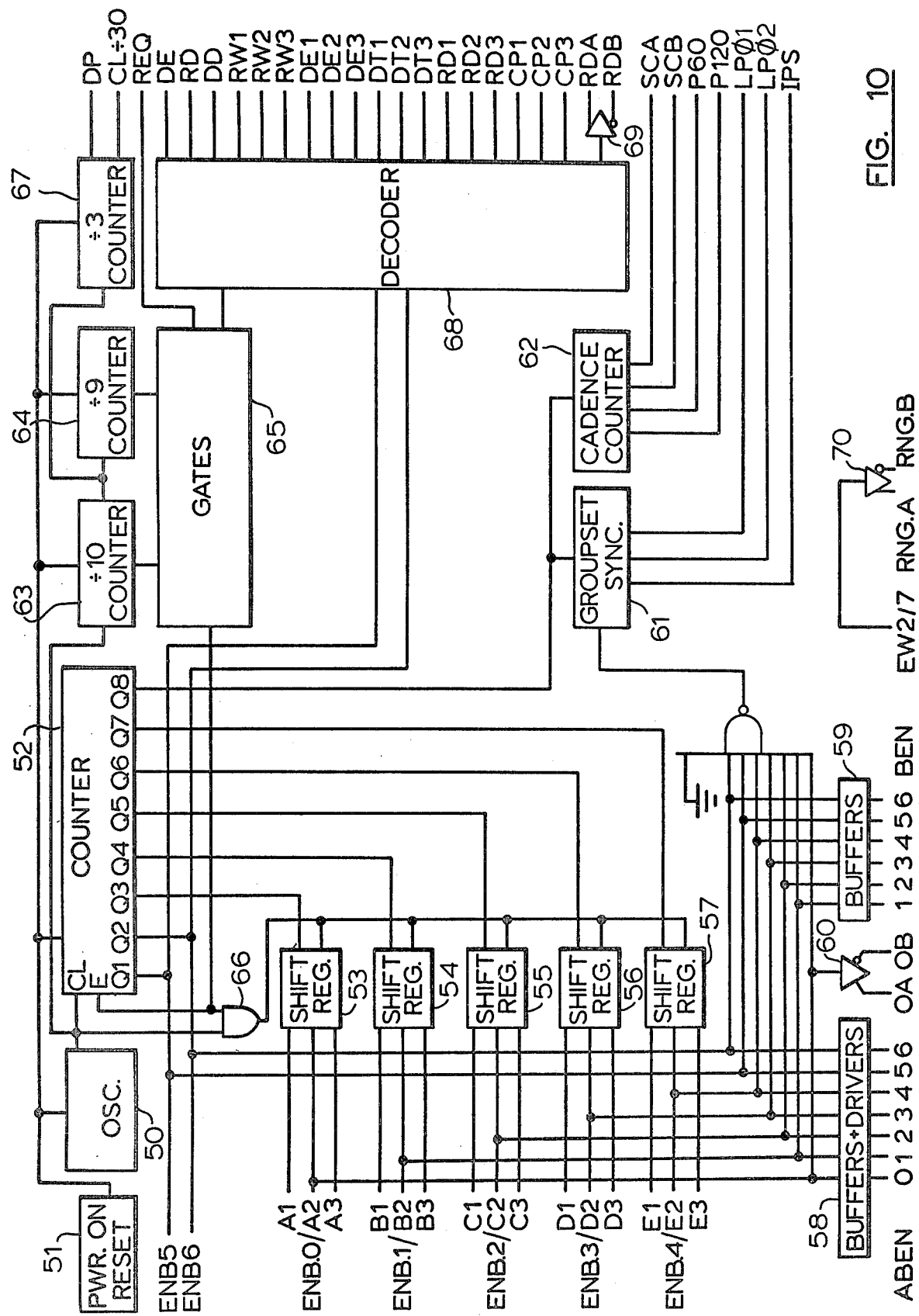
FIG. 10 is a schematic block diagram of a timing generator at the central control unit of the system.

The timing of the system is governed by the timing generator, FIG. 10. This consists essentially of a free running clock pulse generator 50, which drives a system of counters, the contents of the counters being decoded by logic circuitry to derive line data, various command signals, and certain additional control signals as hereinafter described. A reset circuit 51 responsive to power switch-on is used to clear the contents of the counters when power is first switched on. The clock pulse generator 50 drives a first counter 52, which is a binary 8-stage counter, the first seven stages of which are used to provide a 7-bit address code ENB0, . . . ENB6. This code changes every 390 $\mu$s over a 50 ms cycle to identify the 128 ports of the system in cyclic sequence. The five most significant bits of the code are applied to shift registers 53, 54, 55, 56 and 57 which furnish three sets of line address information A1, A2, A3; B1, B2, B3; C1, C2, C3; D1, D2, D3; and E1, E2, E3, thus identifying 3×32=96 internal extensions. The 7-bit address is applied to buffers and drivers 58, from which is derived a 7-bit address ABEN0-6 for the attendant console, and is also used to derive a 7-bit address BEN0 . . . BEN6 for the callmaster, after buffering by means of buffers 59, the bit BEN0 being split into two parts BEN0A and BEN0B by means of a phase-splitting amplifier 60 for balanced line transmission.

The most significant bit Q8 from the counter 52 is used to drive a circuit GROUPSET SYNC. 61, from which are derived control signals LPO1, LPO2 and IPS; these signals are fed to the equipment data multiplexer and used for multiplexing groupset data. The signal IPS also serves as a strobe signal for the groupsets. The bit Q8 is applied to a CADENCE COUNTER 62, from which are derived cadence signals SCA, SCB, P60 and P120; the signals SCA and SCB provide cadences for sounders, while the signals P60 and P120 provide one-second and half-second cadences respectively.

The pulse generator 50 additionally drives a ÷90 counter system comprising a units counter 63 and a decade counter 64, the outputs of which are applied to gating circuits 65. From the gating circuits 65 is derived a pulse at every ninetieth count which enables an input gate 66 to the shift registers 53–57, and also enables the counter 52. The counter system 63, 64 provides a signal REQ, the function of which is to signal the central processor that data is ready to be read.

The output of counter 63 is applied to a ÷3 counter 67, which furnishes a timing signal CL ÷30, and one stage of the counter 67 is used to furnish a data pulse DP, which is subsequently gated with data from the central processor and used to modulate information which is sent to the terminals of the system.

The contents of the ÷90 counter system 63, 64 after gating, are decoded with the bits ENB5 and ENB6 by means of a decoder 68, to produce the following control signals:

DE is a "data enable" pulse which enables a latch on the line data multiplexer currently being dealt with, for the release of information to the central processor;

RD is a "read data" pulse which clocks information from the central processor to store;

DD is a control pulse used by the equipment data multiplexer for strobing equipment type information;

RW1, RW2 and RW3 are "read window" pulses which enable the respective line data multiplexers;

DE1, DE2 and DE3 are "data enable" pulses used by the line data multiplexers;

DT1, DT2 and DT3 are "data timing" pulses which are used by the respective line data multiplexers for disabling during the receiving period;

CP1, CP2 and CP3 are "clamp pulses" used by the line data multiplexers;

RDA and RDB are "read data" pulses for the callmaster, these being antiphase pulses derived from a phase-splitting amplifier 69 for transmission over a balanced line.

On the same board is another phase-splitting amplifier 70, which receives a ringing signal EW2/7 from the equipment data multiplexer to produce split phase ringing signals RNG.A and RNG.B for the callmaster.

Thus the timing generator defines, over a 50 ms cycle, one hundred and twenty eight 390 µs time periods, each corresponding to a respective port and controlling the scanning of that port. Within each time period the various control signals are produced for controlling the timing of data processing and other operations. As previously mentioned, each line data multiplexer deals with thirty two lines and is scanned by the timing generator in accordance with address information. FIG. 11a is a timing diagram which illustrates the timing of signals relevant to one line data multiplexer over the 1560 µs cycle, while FIG. 11b is a timing diagram which illustrates the timing of signals within the relevant 390 µs period.

The Two-Phase Clock

FIG. 12 illustrates a circuit for producing anti-phase; control signals $\phi 1$, $\phi 2$. As hereinafter described, these signals are used to effect power sharing at terminals which may draw substantial current. The circuit comprises essentially a free running oscillator 71 which drives a flip-flop 72. The outputs of the flip-flop are passed through gates 73 to transistor amplifiers 74, 75, the outputs of which are further amplified by amplifiers 76, 77, from which the signals $\phi 1$, $\phi 2$ are derived.

The Subset

Figure 13A:
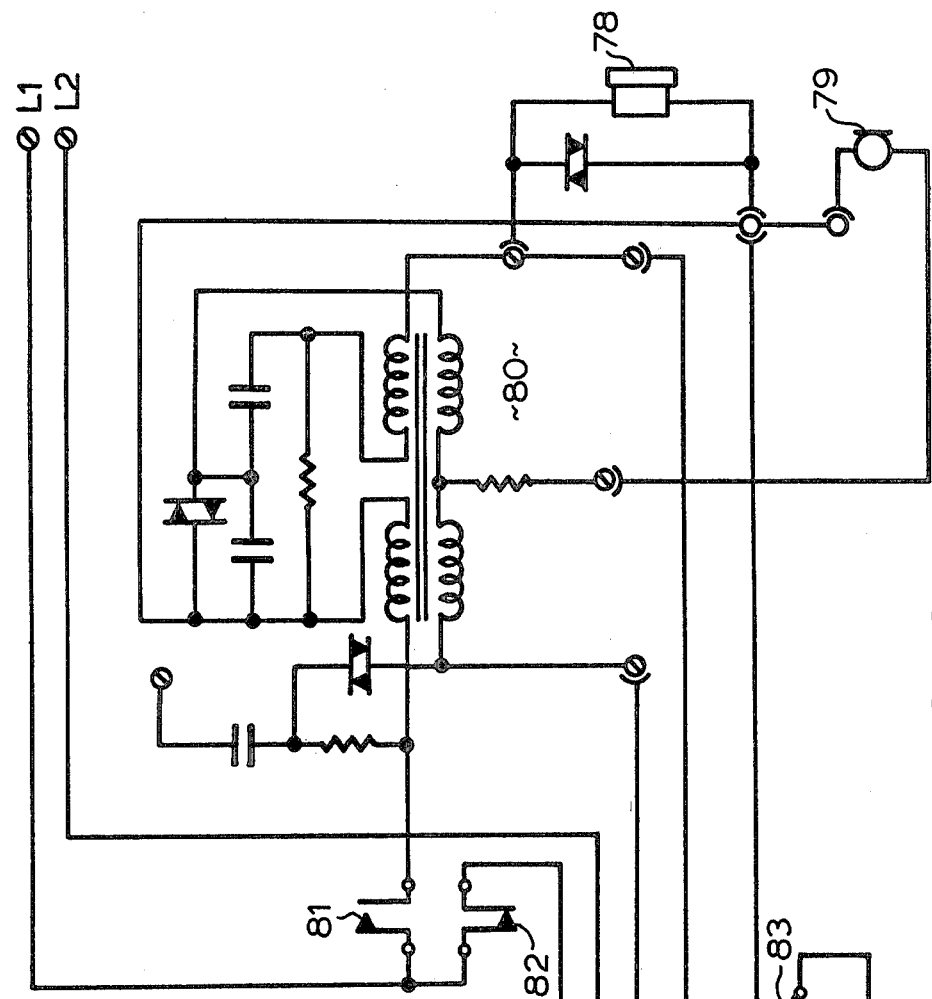
FIGS. 13a, 13b, 13c and 13d together illustrate a subset circuit.
Figure 13B:
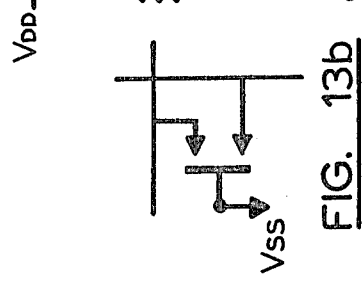
Figure 13D:
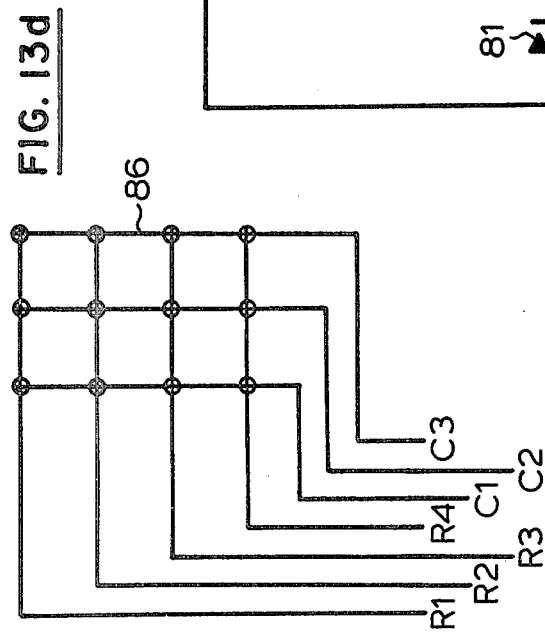
Figure 13C:
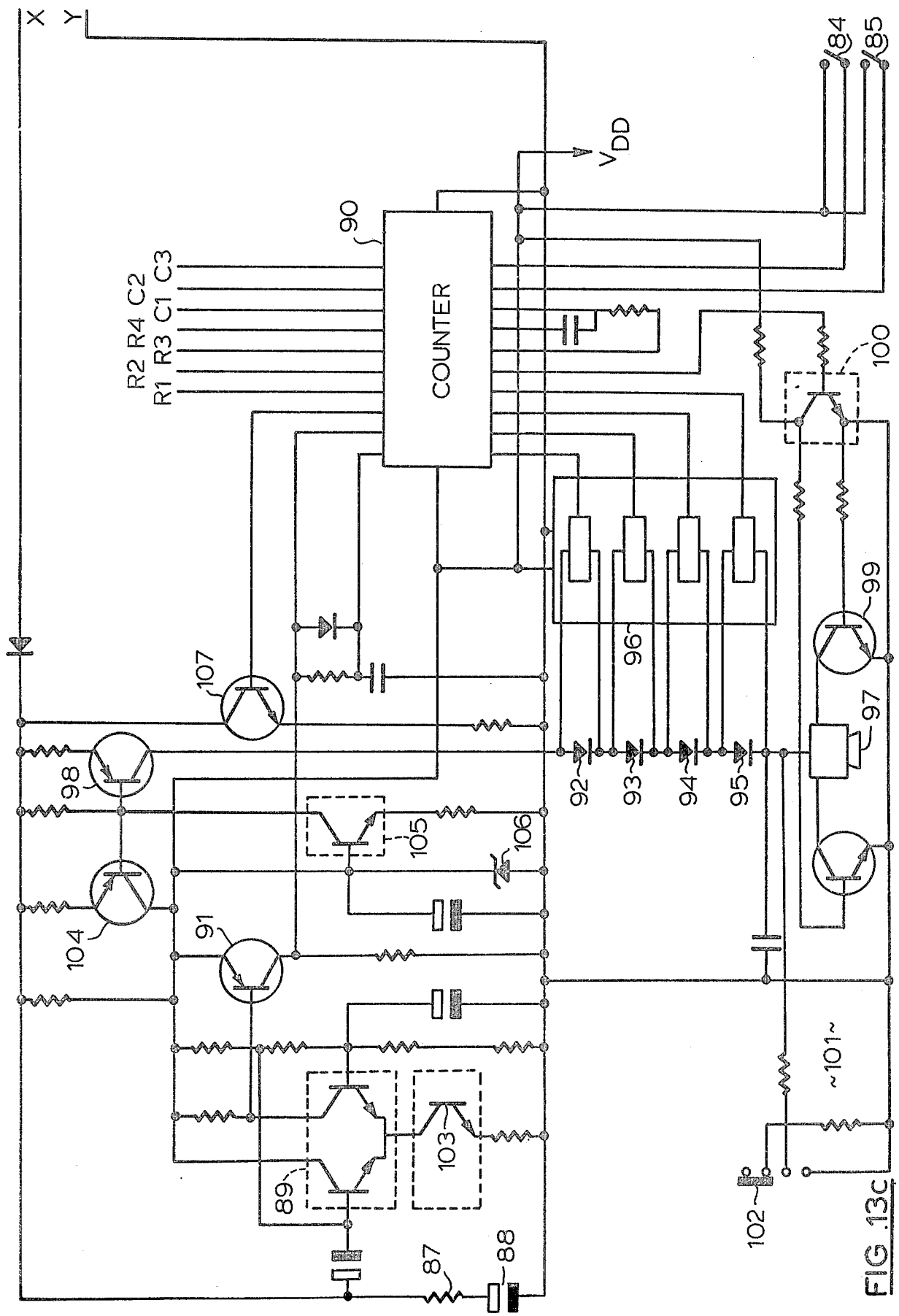

The speech circuit of each subset is almost entirely conventional and will not be described herein in detail. It is illustrated in FIG. 13a as comprising a receiver 78, a transmitter 79, and a speech network 80, the speech pair being connected to line terminals L1, L2. A cradle switch provides four sets of switch contacts, contacts 81, and 82 being associated with the speech circuit and contacts 84, 85 being associated with the subset logic circuitry as shown in FIG. 13c. However, a characteristic feature of the subset is that the twelve-button keypad 86, see FIG. 13d, a contact element of which is illustrated schematically in FIG. 13b, is used to simulate key system operations, and to avoid serious difficulties which this procedure would otherwise entail, the D.T.M.F. signals instead of being generated at the instrument are generated at the central equipment and are inserted into the speech path of the instrument only when certain keying requiring D.T.M.F. takes place. Signalling conditions are transmitted via a data pair XY (FIG. 13c) and in consequence most of the switch contacts are transferred from the speech path to the logic circuits. It is necessary to attenuate the simulated D.T.M.F. tones which are inserted into the speech path, and for this purpose a special attenuator circuit including a field effect transistor 83a is associated with the receiver 78, the contact 83 being an off normal contact actuated by the keys of the keypad 86 for setting the special attenuator circuit when closed. Since the tones are generated centrally, it is necessary to delay resetting of the attenuator circuit for a short time after the contact 83 is opened; and accordingly an RC time delay element is provided to effect the necessary delay.

Referring to FIG. 13c, data is transmitted via the data pair XY, which is a balanced line terminated by a line matching impedance 87, 88. A receiver amplifier 89 connected across the line matching impedance is used to amplify incoming data and forward it to a special counting circuit 90, which will be described hereinafter. A squaring circuit 91 is provided to improve the shape of the data pulses after amplification prior to their being sent to the special counting circuit 90. The counting circuit is used to control four light-emitting diodes (LED's) 92, 93, 94, 95, through a switching device 96, in accordance with incoming data, and is used also to control a sounder 97. The LED's are supplied from a constant current source 98, which draws current from the data pair XY. The switching device 96 is in fact a solid-state selective switching device (CD4066) having four switching elements connected in parallel with respective ones of the LED's by which the LED's are controlled. The sounder 97 is driven by a push-pull amplifier 99 operating in the cut-off mode, the amplifier being controlled from the special counting circuit 90 through a phase-splitting inverter 100.

A volume control circuit 101 including a slide switch 102 is provided for controlling the volume of the sounder.

It is most important that the receiver amplifier 89 should have a high input impedance to incoming data, and for this purpose the emitters of the transistors are connected to a transistor 103 which serves as a constant current source. As it is important that the current drawn from the line should not depend upon line length, a 5 mA constant current source 104 is provided to supply the receiver amplifier 89, the switching device 96, and logic circuits. A transistor 105 serves as a reference for the two current sources 98 and 104, its base being controlled by a Zener diode 106.

Outgoing data is initiated by the operation of the twelve-button keypad 86, the seven buses (R1, R2, R3, R4, C1, C2, C3) of which are connected to the special counting circuit, the latter generating the data in accordance with the selection of the buses. When the handset is lifted from its cradle, switch contact 81 closes and switch contact 82 opens; data generated by the counting circuit 90 in accordance with operation of the keypad is transmitted to the base of a transistor switch 107, the output of which takes the form of pulses imposed on the data pair XY.

Figure 14:
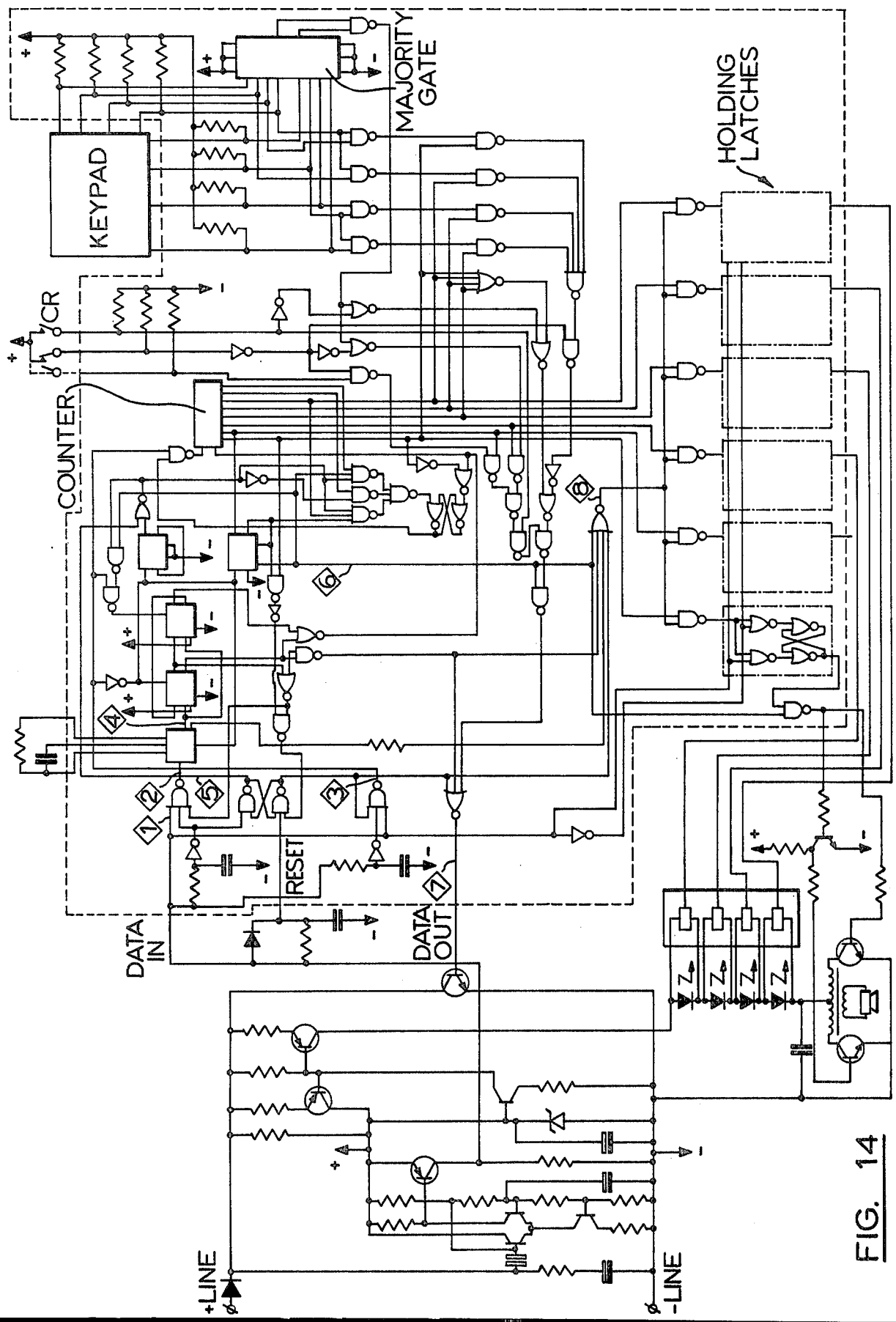
FIG. 14 is a schematic diagram illustrating the logic functions of a component of the subset.
Figure 15:
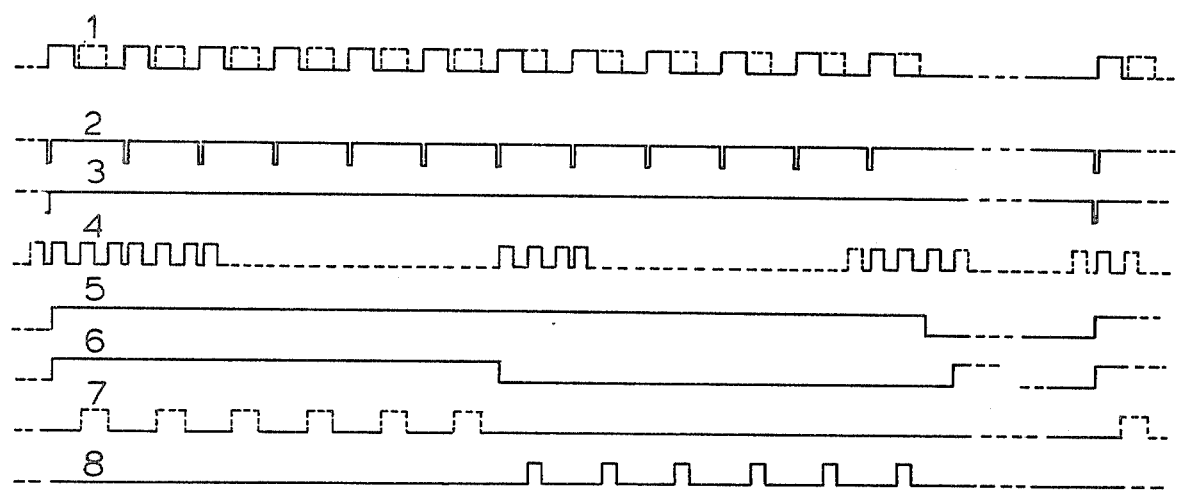
FIG. 15 is a timing diagram to be read in conjunction with FIG. 14.

In the preferred arrangement the special counting circuit is in fact a large scale integrated circuit. FIG. 14 is a schematic diagram of the logic functions of the circuit, which may be read in conjunction with the timing diagram of FIG. 15. The timing diagram of FIG. 15 illustrates the respective pulse trains appearing at points 1, 2, 3, 4, 5, 6, 7 and 8 denoted in FIG. 14 in time relation to one another. FIG. 14 depicts within the broken line the equivalent circuit of the special counting circuit, the timing of which is controlled by a local oscillator. A counter controls the receipt of data pulses from the receiver amplifier 89 of the subset, the received data pulses being decoded by a decoder circuit, the decoded output of which is applied to holding latches. The switching elements of the selective switching device 96 (FIG. 13c) are controlled by the holding latches, while the push-pull amplifier is also controlled from the decoder circuit in accordance with the received data. The special counting circuit also includes an encoding circuit which, in accordance with the keying operations at the instrument keypad, controls the electronic switching device 107 to initiate the transmission of data to the central control unit.

The Groupset

Figure 16:
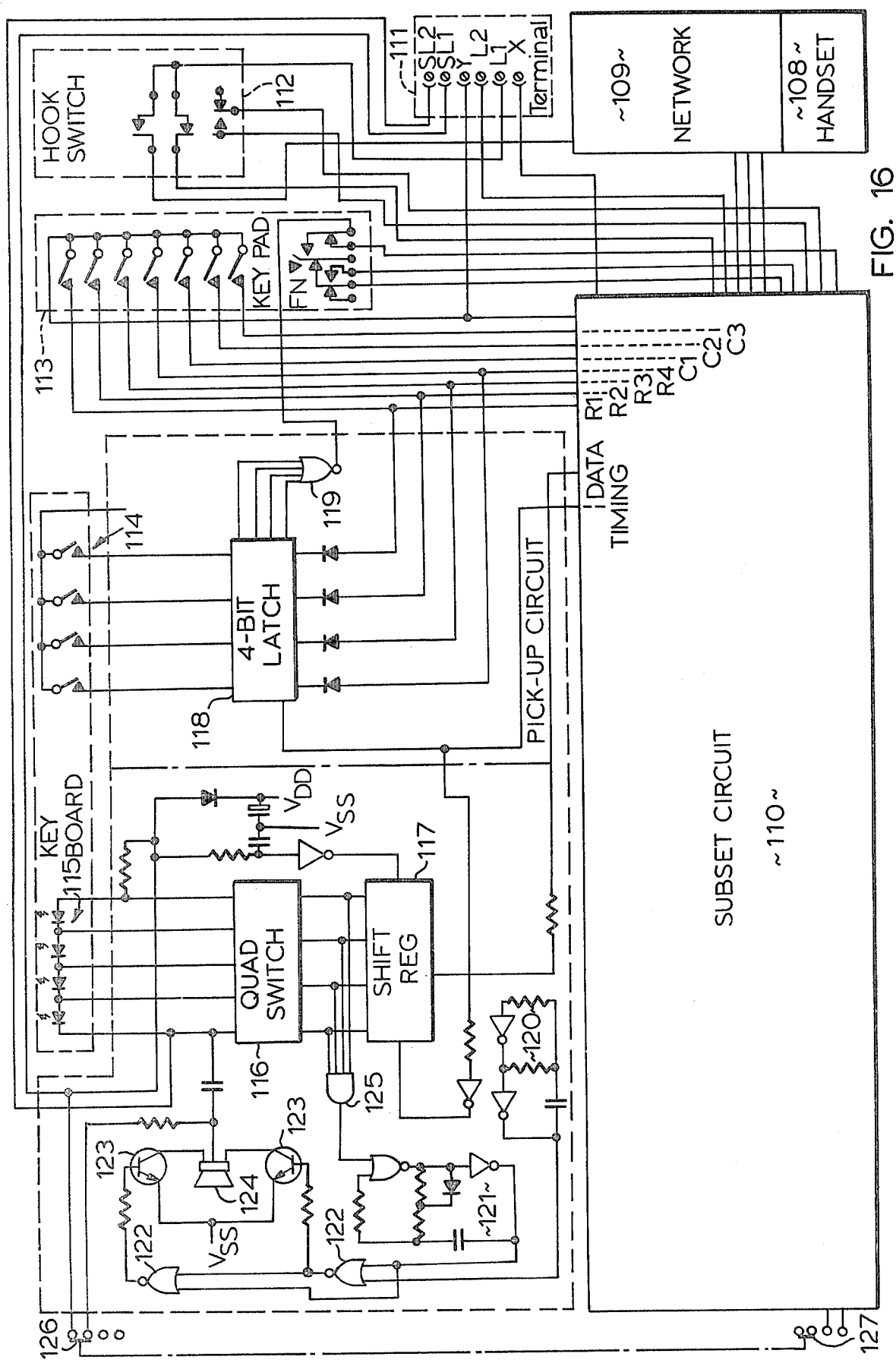
FIG. 16 is a schematic circuit diagram of a groupset.

The circuit of one of the groupsets is illustrated in FIG. 16. As much of the circuitry is identical with that of a subset, it will not be described in detail. FIG. 16 indicates in block form the handset 108, the speech network 109, and the data processing circuit 110, which in combination correspond to the speech and data circuits of the subset as shown in FIG. 13a and FIG. 13c. A terminal block 111 provides a pair of line terminals L1, L2 for the speech pair, a pair of terminals X, Y for the data pair, and a pair of terminals SL1, SL2 for connection to a circuit which provides power and strobe signals to the additional lamps of the groupset. The hook switch 112 corresponds to the cradle switch of FIG. 13a.

The twelve-button keypad is shown for convenience as a bank of seven switches 113 in FIG. 16, the connections to it being referenced R1, R2, R3, R4, C1, C2 and C3 to denote the four rows and three columns. The essential difference between the groupset circuit and the subset circuit is that the former includes a keyboard and a pick-up circuit, as will now be described.

The keyboard provides four pushbutton switches 114, which correspond to the switches 11 of FIG. 2, each of these switches being associated with a respective LED, the LED's 115 corresponding to the indicator lamps 12 of FIG. 2. A quad switch 116 acts as a driver which controls power to the lamps, in accordance with a shift register and latch 117, the additional power is supplied via the strobe pair connected to terminals SL1, SL2. A four-bit latch 118 is shown, which receives clock pulses from the special counting circuit of the subset circuit 110, to ensure that data is read only during the strobe period; this latch serves to eliminate the effect of "bouncing" when the switches 114 are operated. The latch 118 is enabled by the keyboard switches 114, and receives the data to be read in accordance with the operation of the twelve button keypad 113. Data read out from the latch 118 is gated by a NOR gate 119 and fed by the off-normal switch contact FN to the special counting circuit of the subset circuit 110.

The groupset circuit includes a tone oscillator 120, the output of which is gated with the output of a cadence oscillator 121, by gates 122. The gated outputs are applied to a push-pull amplifier 123 operating in the cut-off mode, the amplifier output being at the tone frequency and being modulated at the cadence frequency; this output is used to drive the second sounder 124 of the groupset, which responds to selected types of calls programmed in the non-volatile RAM (FIG. 9). The cadence frequency, it will be noted, is activated by one or more of the four outputs of the shift register and latch 117, which are gated by an AND gate 125.

A further feature of the groupset circuit is that the slide switch 127 for controlling the sounder of the subset circuit 110 is ganged with a switch 126, the latter having a third position which affords the capability of cutting out the additional sounder 124.

The Line Data Multiplexer

The three line data multiplexers deal specifically with data lines serving subsets, groupsets and callmasters. Each line data multiplexer deals with thirty two lines, which are scanned in cyclic sequence under the direction of the timing generator, each line being selected for a period of 1560 μs in each 50 ms cycle. During the remainder of the time unmodulated power is fed via line terminating resistors to the lamps and sounder of the associated subset or groupset. During the first half of the 1560 μs period, synchronization pulses are transmitted to the subset or groupset instrument, which responds with six bits of information. Into these six bits are coded the On Hook, Off Hook conditions and the various keying conditions. The received pulses are detected by a differential amplifier and are converted to parallel form and transmitted to the central processor via the equipment data multiplexer. In the second half of the 1560 μs period, six bits from the central processor are transmitted to the associated instrument to operate the lamps and sounder. The sixth bit is used to light the four additional lamps in the groupset, but is not used in the case of a subset instrument.

Figure 17:
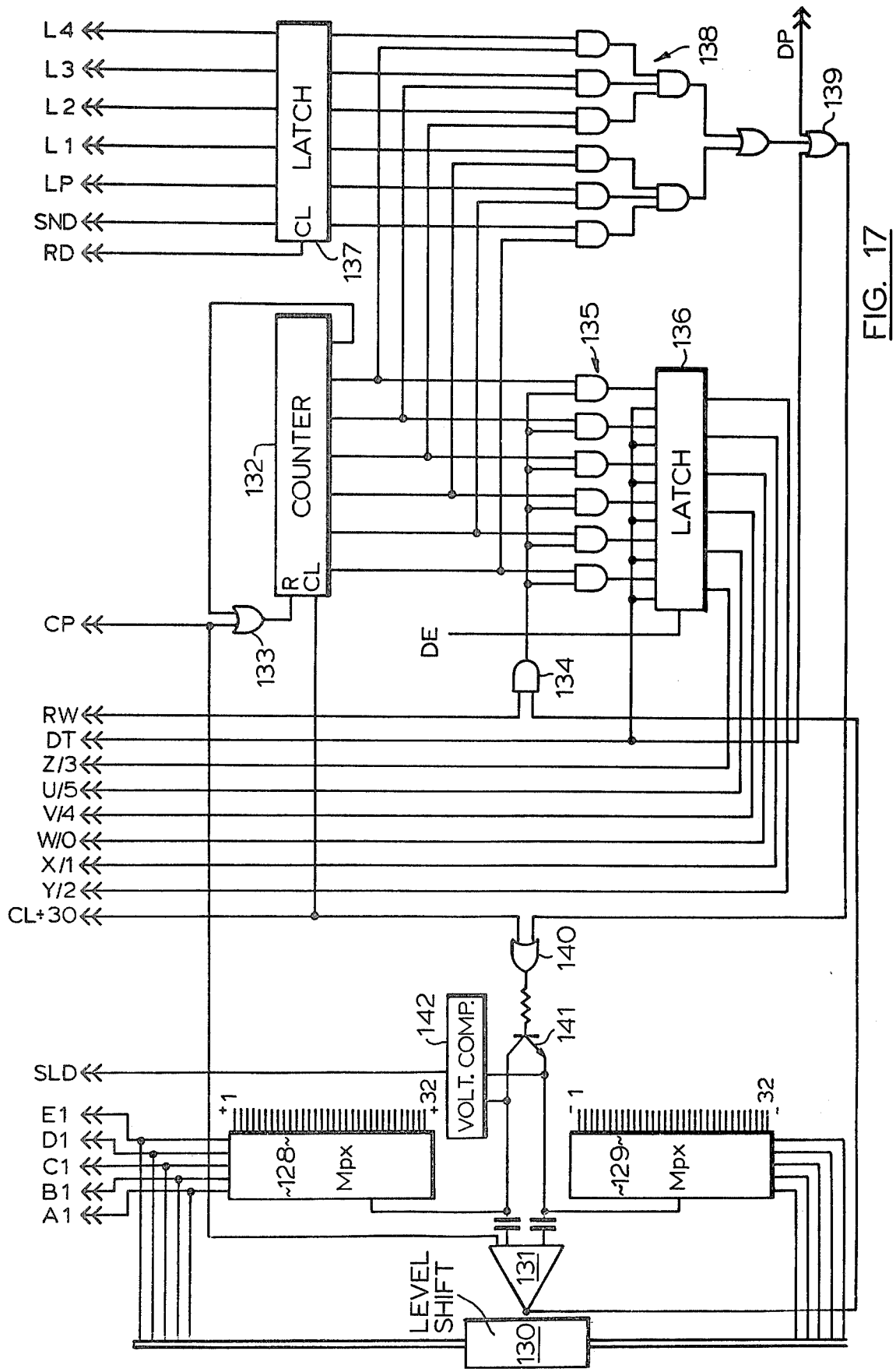
FIG. 17 is a schematic circuit diagram of a system component referred to herein as a "line data multiplexer"

A schematic diagram of the circuit of one of the line data multiplexers is shown in FIG. 17. This circuit includes a pair of multiplexers 128, 129, to which are connected the balanced data lines of the respective thirty two instruments, the thirty two lines being denoted by the symbols +1 ... +32 and −1 ... −32. The lines are selected in cyclic sequence in accordance with the address information A1, B1, C1, D1, E1 supplied by the timing generator. It will be recalled that the timing generator also supplies address information A2, B2, C2, D2, E2, and E3, B3, C3, D3, E3, each set of address information being sent to a respective one of the three line data multiplexers and defining the thirty two addresses which are relevant to it. The address inputs to the multiplexers 128 and 129 are separated by a level shift device 130. Information from the thirty two pairs of data lines, after multiplexing, is applied to the differential amplifier 131, the d.c. bias of which is reset at the beginning of each 1560 μs period, to accommodate d.c. voltage differences on the pairs of lines, by a clamping pulse CP derived from the timing generator. This pulse is also used to reset a six stage counter 132, which counts the timing pulses CL÷30 from the timing generator, each pulse CP being gated by a gate 133 with each sixth count from the counter 132. The output of the differential amplifier 131 is gated via a gate 134 with a "read window" pulse RW derived from the timing generator, the output of the gate 134 being gated with the output of the counter 132 by means of a set of six gates 135 and applied to a latch 136. During the transmitting period, the output of the latch is enabled by a "data enable" pulse DE, supplied by the timing generator, and the information stored in the latch is transmitted to the central processor in parallel form, the data being represented by the six bits Y/2 X/1 W/0 V/4 U/5 Z/3. The latch 136 is reset after the transmitting period by a pulse DT also supplied by the timing generator. A latch 137 receives data in parallel form to be transmitted to the instruments. This information is derived from the central processor and is coded by the equipment data multiplexer. The information includes bits L1, L2, L3, L4 for controlling the lamps of the subsets, a bit SND which is used to control sounders of the instruments and a sixth bit LP which is used only to light the four additional lamps in the case of a groupset. The latch 137 is enabled by the "read data" pulse RD from the timing generator, which clocks the information to a set of gates 138, which also receive the output of the counter 132, the gates 138 serving to multiplex the information received. This multiplexed information is gated with a pulse DP from the timing generator, by means of a gate 139, the output of which is applied to a gate 140 where it is gated with the timing pulses CL⇌30. Thus the information from the central processor relating to the selected line, after decoding, is clocked by the timing pulses CL⇌30 to a transistor switching device 141, which transmits the data in serial form to the multiplexers 128, 129 and then to the selected data pair. It will be noted that the timing pulse DT is also applied to the gate 139 for the purpose of disabling this gate during the period in which information is being transmitted from the line to the central processor. The balanced input to the amplifier 131 is connected to a voltage comparator circuit 142 (shown schematically in FIG. 18), which responds to an unbalanced line condition by producing a signal SLD thereby to provide an indication of a fault in the event that a data line is short circuited. This signal is used to control an alarm circuit as hereinafter described.

The Equipment Data Multiplexer

Figure 19A:
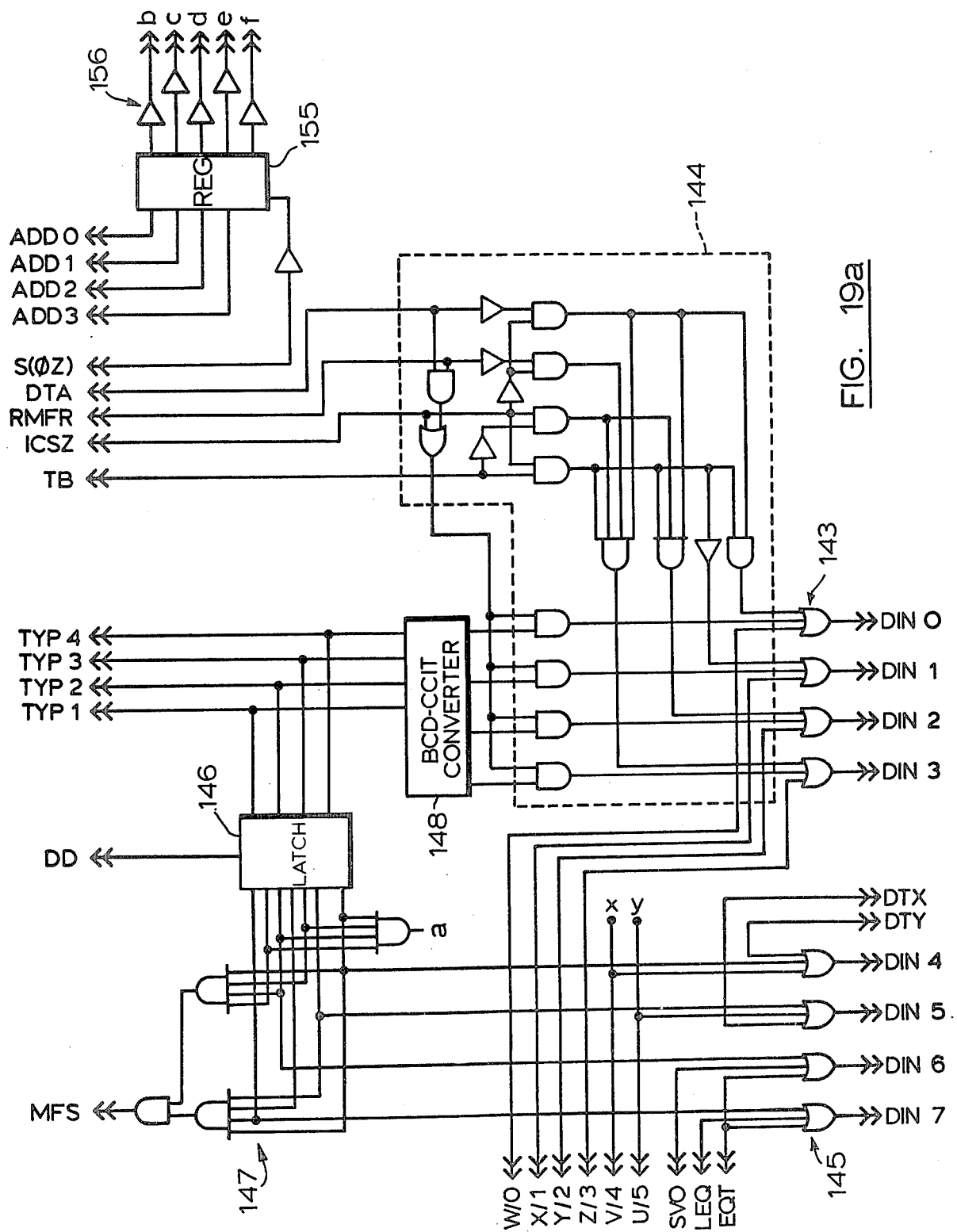
FIGS. 19a and 19b together form a schematic circuit diagram of a system component referred to herein as the "equipment data multiplexer"
Figure 19B:
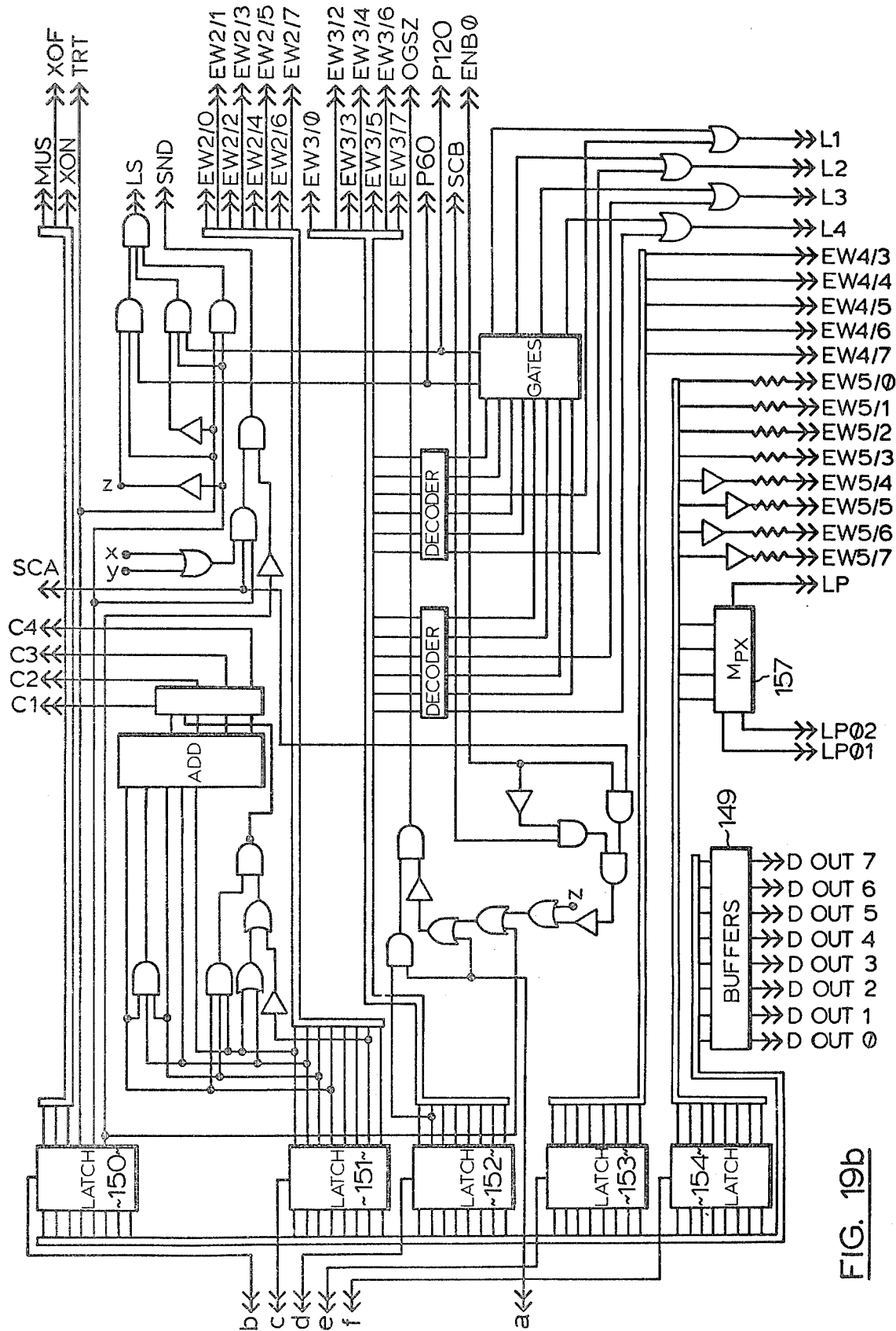

The circuit of the equipment data multiplexer is illustrated diagrammatically in FIGS. 19a and 19b, which together constitute a schematic block diagram of the circuit. The letters a, b, c, d, e, f, x, y, z are used to denote the points of interconnection between the divided portions of the circuit. The equipment data multiplexer performs two functions, namely, to transmit information from the various interfaces and terminals of the system to the central processor, appropriately coded where necessary, on a time sharing basis, and to transmit information and commands from the central processor to the various interfaces and terminals of the system. Information is transmitted to the central processor as an 8-bit code, the four most significant bits of which (i.e. DIN4, DIN5, DIN6, DIN7) define the equipment type to which the particular code relates, and the four least significant bits of which (i.e. DIN0, DIN1, DIN2, DIN3) furnish information relating to the equipment identified. The four least significant bits are derived from a set of gates 143, which also receive information W/0, W/1, Y/2, Z/3, V/4, U/5 from the subset and groupset instruments via the line data multiplexers, and coded information from a special coding circuit 144. The four most significant bits of data are derived from a set of gates 145, which code "equipment type" information from a latch 146 with the two bits V/4 and U/5, information from the alarm and interface control (see FIG. 8) SVO, DTX, DTY, and information from the crosspoint preselector, LEQ, EQT.

"Equipment Type" information is represented by four bits of input TYP1, TYP2, TYP3, TYP4, which are stored in the latch 146 from which they are clocked out at the appropriate time by the clamping pulse DD from the timing generator. This output, besides being applied to the gates 145, is coded by a system of gates 147 to derive a signal MFS for control of the DTMF receiver selector. Since the central processor handles information in I.T.T. code C, the information represented by bits TYP1, TYP2, TYP3, TYP4, which is in BCD form, must be converted to I.T.T. code by a converter 148. Information represented by the inputs DTA, RMFR, ICSZ, and TB, derived from certain miscellaneous interfaces, may be coded in a circuit 144 to provide additional status information and gated by gates 143 with the converted BCD information.

Information transmitted from the central processor is also in the form of an 8-bit code represented by the bits DOUT0, DOUT1 ... DOUT7, this information being supplied to the equipment data multiplexer via buffers 149 and stored in latches 150, 151, 152, 153, 154. These latches are set in accordance with address information supplied from a register 155 via buffers 156; the central processor furnishes four bits of address information ADD0, ADD1, ADD2, ADD3 to the register as well as a control pulse S (φ2). Information is clocked out of the five latches under the control of the timing generator, which supplies the timing and cadence control pulses ENB0, SCA, SCB, P60 and P120. The equipment data multiplexer supplies to the various parts of the system, at the appropriate times, data words represented by the bits EW2/0 ... EW2/7, EW3/0 ... EW3/7, EW4/0 ... EW4/7, and EW5/0 ... EW5/7. In addition, the circuit supplies special control signals denoted by C1, C2, C3, and C4, MUS, XOF, XO1 and TRT, LS and SND, and L1, L2, L3 and L4. Information from the latch 154 is multiplexed by a multiplexer 157 which is controlled by signals LP$\phi$1 and LP$\phi$2 from the timing generator to produce a control signal LP for control of the additional lamps of the groupsets.

Essentially, therefore, the equipment data multiplexer is used to convert information from the various parts of the system to a form which can be read by the central processor, and to convert information supplied by the central processor to a form which can be read by the various parts of the system. The significance of the various signals referred to will become apparent from the descriptions of the components to which they are related.

The Attendant Console

Most of the circuits of the attendant console fall into two main groups. The circuits of one group are used to generate and transmit information to the central processor in accordance with the operation of the keys on the attendant's control panel (FIG. 3), while the circuits of the other group are used to activate the lamps and digital displays in accordance with information received from the central processor. Since a great deal of incoming and outgoing information must be transmitted, and since the scanning system does not allocate more time to the attendant's console than to other ports of the system, two scans are normally required to update the console completely. The attendant's console differs from other terminals of the system in this respect, that instead of using serial data transmission on a single pair, the attendant's console uses parallel data transmission over a 25-pair cable. A speech network similar to that of a subset is included in the attendant's console. The circuits of the attendant's console are illustrated schematically in a composite diagram represented by FIGS. 20a, 20b, and 20c, and 21. These figures require to be examined in conjunction with one another.

Figure 20A:
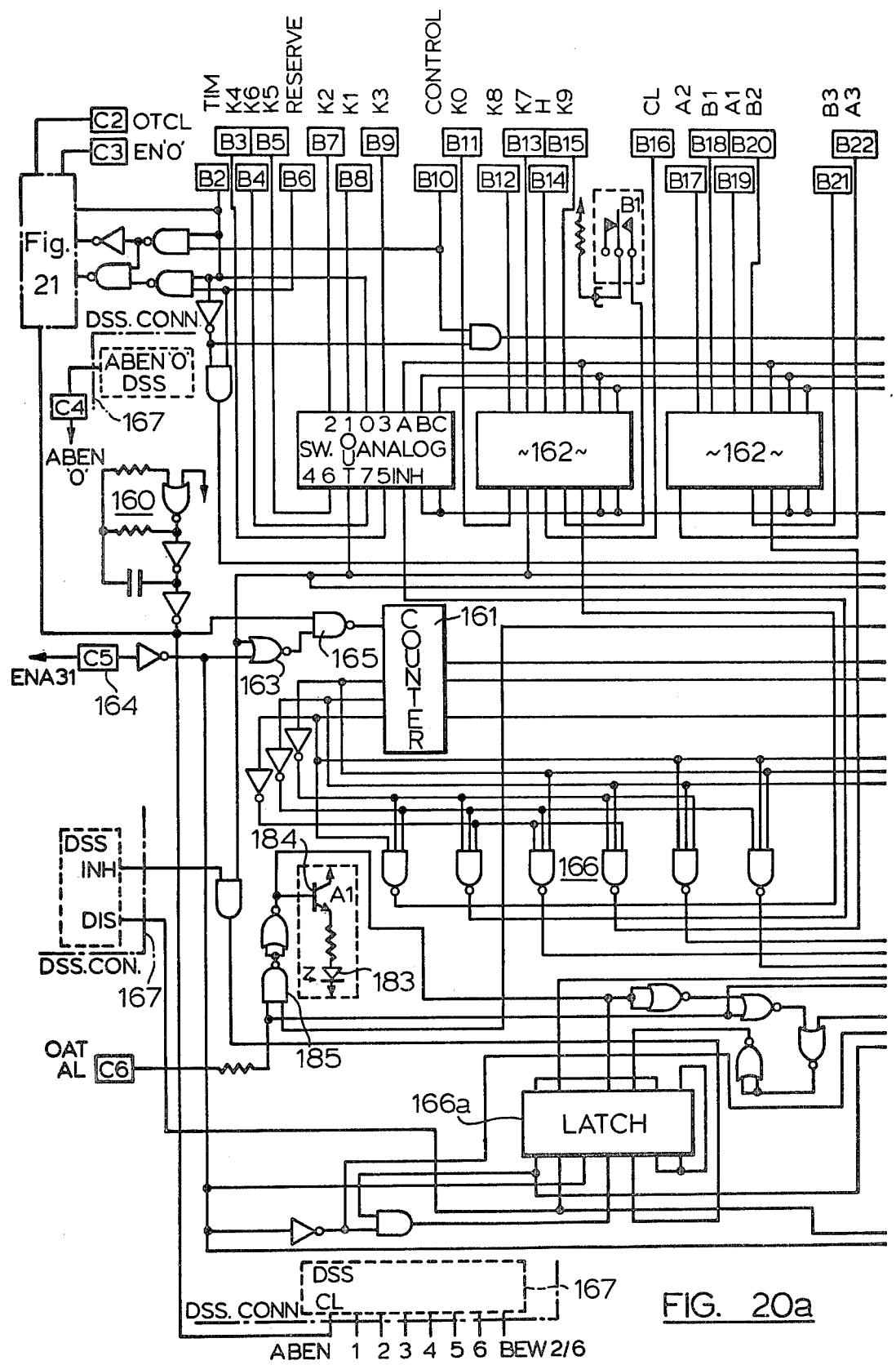
Figure 20B:
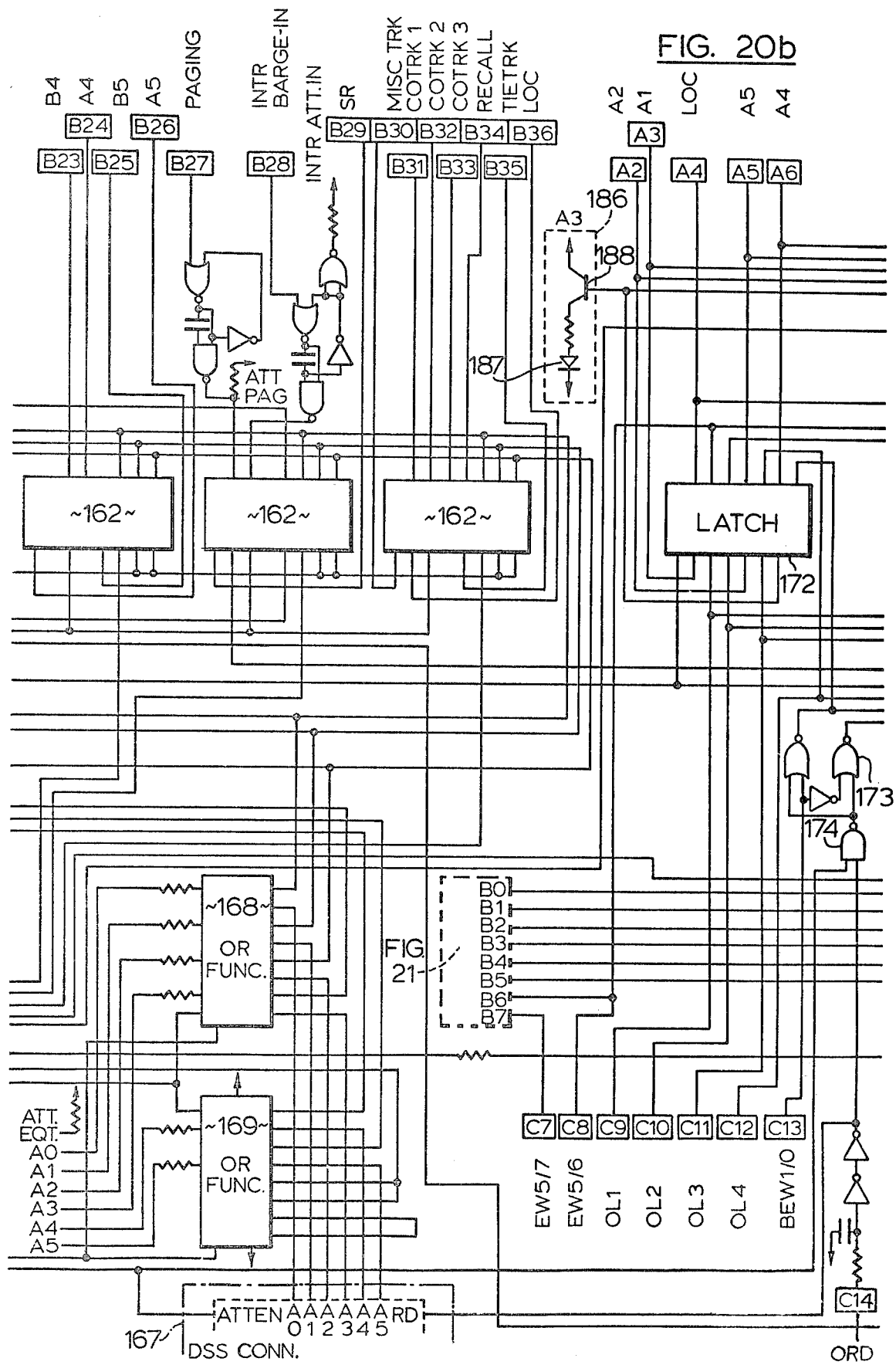

As shown in FIGS. 20a, 20b and 20c, the console provides thirty eight keys or push buttons B, which correspond to the thirty eight keys of the groups 13, 14 and 15 of the control panel illustrated in FIG. 3 and are referenced accordingly. Twenty one of these keys are associated with lamps A, corresponding to the lamps 16, 17 and 20 of the control panel. Six additional lamps corresponding to the display 22 of the control panel are also provided and denoted as lamps by the letter A. The keys are scanned by an on-board free-running oscillator 160, which feeds a counter 161. The keys B control a set of six analogue switches 162, the outputs of which are applied to a gate 163 and gated with the 390 $\mu$s pulse ENA31 which defines the time slot of the scanning cycle alloted to the attendant's console. The pulse ENA31 is derived from the control circuit illustrated in FIG. 58, this being the decoded output of the appropriate 7-bit address from the timing generator, and is applied to the attendant's console through a line receiver 164. It will be noted that all the incoming signals are applied through line receivers, each of which is denoted by the letter C. The output of gate 163 is applied to a gate 165 which controls the clock pulses into the counter 161 from the oscillator 160. The output of the counter is decoded by a set of gates 166, the decoded output controlling the six analogue switches 162. The output from the analogue switches 162 is applied to a latch 166a which, if data is present at the commencement of the pulse ENA31, presents the information to the central processor via the attendant's interface (FIG. 21), the outgoing information being represented in FIG. 19a by the bits ATT.EQT, A0, A1 ... A5. It will be noted that the circuitry of the attendant's console provides a number of connectors 167 for connection to the DSS console. The circuitry includes a pair of latches 168, 169, which receive information both from the attendant's operations and the DSS console, these latches being connected to provide an OR function with respect to this information.

The attendant's console includes a telephone instrument speech transmission network which is connected to the speech pair denoted by LNA31, LNB31. An oscillator 171 is connected to a sounder 170, by a transistor switch actuated in accordance with information fed out of the latch 166a.

Incoming data for actuating the lamps and the sounder is, as previously mentioned, applied to line receivers C, which convert the current signals to voltage swings, for the elimination of noise. Four latches 172 together constitute a two-part memory for incoming data, the data being fed in via gates 173, to which the pulse ENA31 is also applied so that the information is only gated into the latches during the appropriate time slot defined by that pulse. A "read data" pulse RD is gated with the ENA31 by a gate 174, the RD signal being derived from the timing generator and determining the time at which instructions from the central processor will be read. The incoming data is made up of words from the equipment data multiplexer, EW5/0 .. . 7, a buffered word BEW1/0, and bits OL1 ... OL5.

As previously mentioned, two scans are necessary to update the attendant's console completely. For this purpose, the memory latches 172 are selected alternately in pairs, each being selected for a duration of 50 ms.

The inputs to the lamps A are applied to a common OR gate 175, actually shown as being made up of a system of gates, the output being applied to a further transistor switch between the oscillator 171 and the common sounder. A double latch 176 is used to gate the output of the OR gate and thus control the activation of the sounder, and to inhibit sounder operation selectively in accordance with the operation of the buzzer key BZ KEY and night service requirements initiated by the NS KEY. The buzzer key is associated with a time delay circuit 177, the purpose of which is to override the effect of "bouncing" of key operation, the output of this circuit being applied to the latch 176. The latch 176 is alternatively controlled by the night service circuit 178, which is activated by the NS key and, as will be noted, also includes a time delay circuit 179 to override the effect of key bouncing. It will be noted, too, that when the attendant is engaged on a line, a signal is applied to the gate 180, the output of which also inhibits the operation of the sounder. The Schmitt triggers 181, 182 in the circuits 177, 178 serve to gate the inhibiting signals, when the sounder is to be inhibited, with a sharp time rise. It should be mentioned that an alarm signal ATAL from the remote alarm (FIG. 47) is also applied to the gates 175 and overrides the operation of the buzzer key BZ KEY, but only until the buzzer key is operated again. A visual warning of an alarm condition is provided by the LED 183, which is driven by a transistor 184 in accordance with the output of a Schmitt trigger 185 to which the alarm signal is applied. The other indicator lamps are typified by the circuit indicated at 186. This includes a LED 187 which is driven by a transistor 188, the latter being turned on in accordance with information from one of the latches 172.

Figure 21:
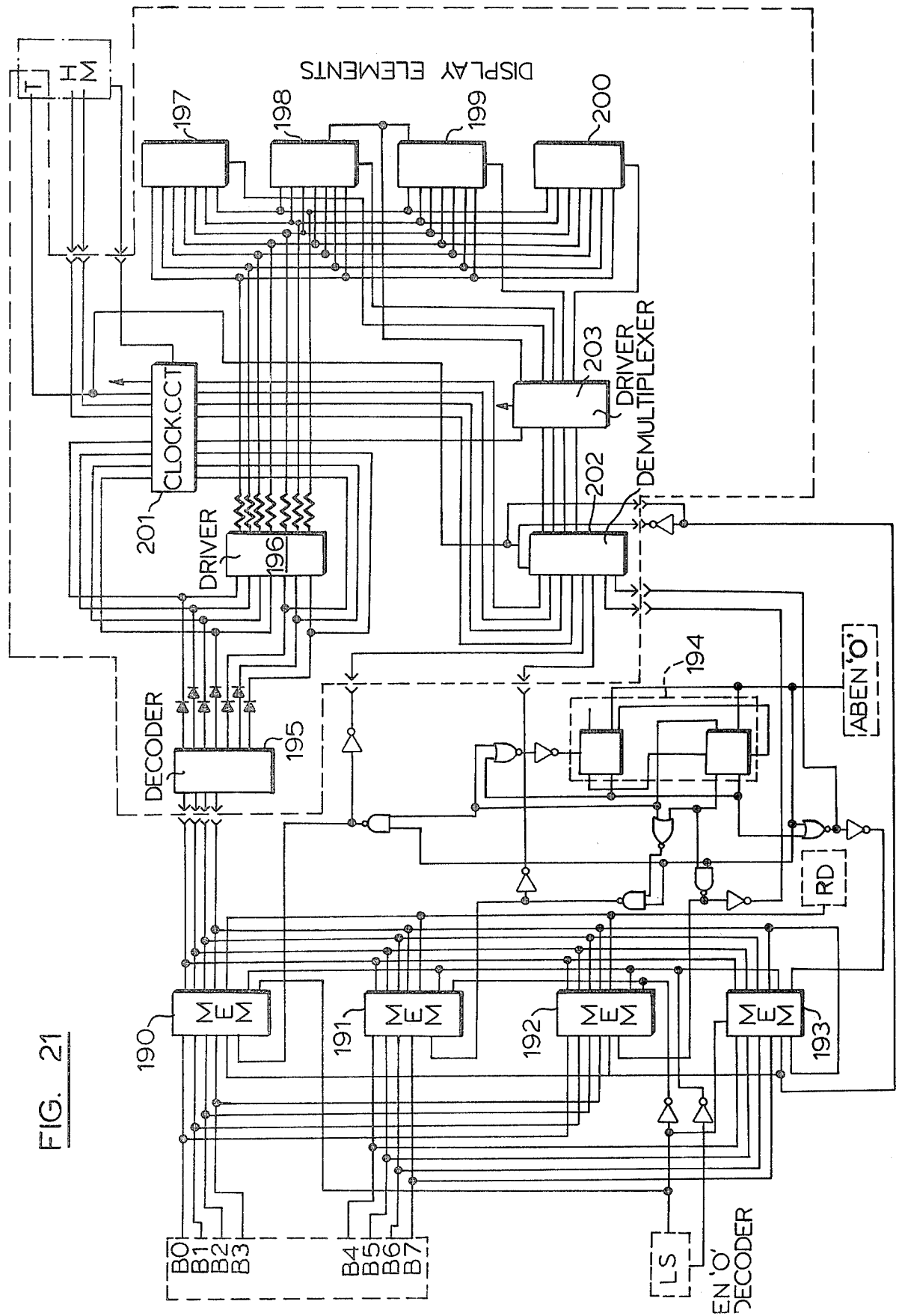
FIG. 21 illustrates another part of the circuitry of the attendant's console.

The circuits of FIG. 21 include a cell number identification circuit, and a time clock circuit. The call number identification circuit includes four 4-bit memories 190, 191, 192, 193, into which incoming information is clocked during the scanning period determined by pulse ENO. The incoming information is an 8-bit signal, the first four bits B0 . . . B3 being fed into memories 190 and 192, and the last four bits B4 . . . B7 being fed into memories 191 and 193. These memories are actuated during the ENO time slot by the control signal LS.

The memories 190 . . . 193 are scanned in cyclic sequence by a counter 194. The counter controls the readouts from the memories one at a time. This output information is decoded by a decoder 195, and applied to a driver 196 for the four digit display formed by four 7-segment numerical display elements 197, 198, 199, 200. Since each of these elements displays an alphanumeric cypher from seven segments, it is necessary to convert the 4-bit output from each memory to a 7-bit address for the respective display element, and this is accomplished by the decoder 195.

The display elements correspond to the display panel 21 of FIG. 3.

To display the time as four digits, when the attendant depresses the time key TIM, the display elements are actuated in the same manner from the driver, but the seven bit address is derived from a special clock display chip 201, which additionally feeds information to a demultiplexer 202, the output of which is applied to a second driver 203.

The Attendant Interface

Referring to FIG. 22a, data transmitted to the attendant console from the central processor is transmitted via a bank of nine buffer amplifiers 205. Lamp information for the attendant's loop lamps (lamps 16 of FIG. 3), represented by data L1, L2, L3 and L4, is buffered to provide the input signals OL1, OL2, OL3 and OL4. The "read data" pulse RD becomes the input instruction ORD. Equipment words EW1/0 and EW2/6 after buffering become BEW1/O and BEW2/6. Similarly, the signals ALS and TCL become OTAL and OATCL, respectively.

FIG. 22b illustrates the section of the attendant interface which handles information to be transmitted from the attendant's console to the central processor. The data represented by A0 . . . A5 is applied through line receivers 206 to a three-state latch 207, the information being stored into the latch and presented to a common bus only when the DE pulse becomes high. The need for the latching arises from the fact that the common data bus may be carrying other data when the information is stored into the latch. This latch provides the six bits of information W/0, W/1, Y/2, Z/3, V/4, U/5. When the attendant operates the intrude key, a signal INTR. ATT.-IN is produced and, after being buffered becomes the instruction signal INTR.ATT. An output signal OAEQT is produced when the attendant's console is connected in the system, the connection producing a signal AEQT which is gated with a signal ATT.EN to inform the central processor that the attendant console is connected.

The Callmaster

Figure 23A:
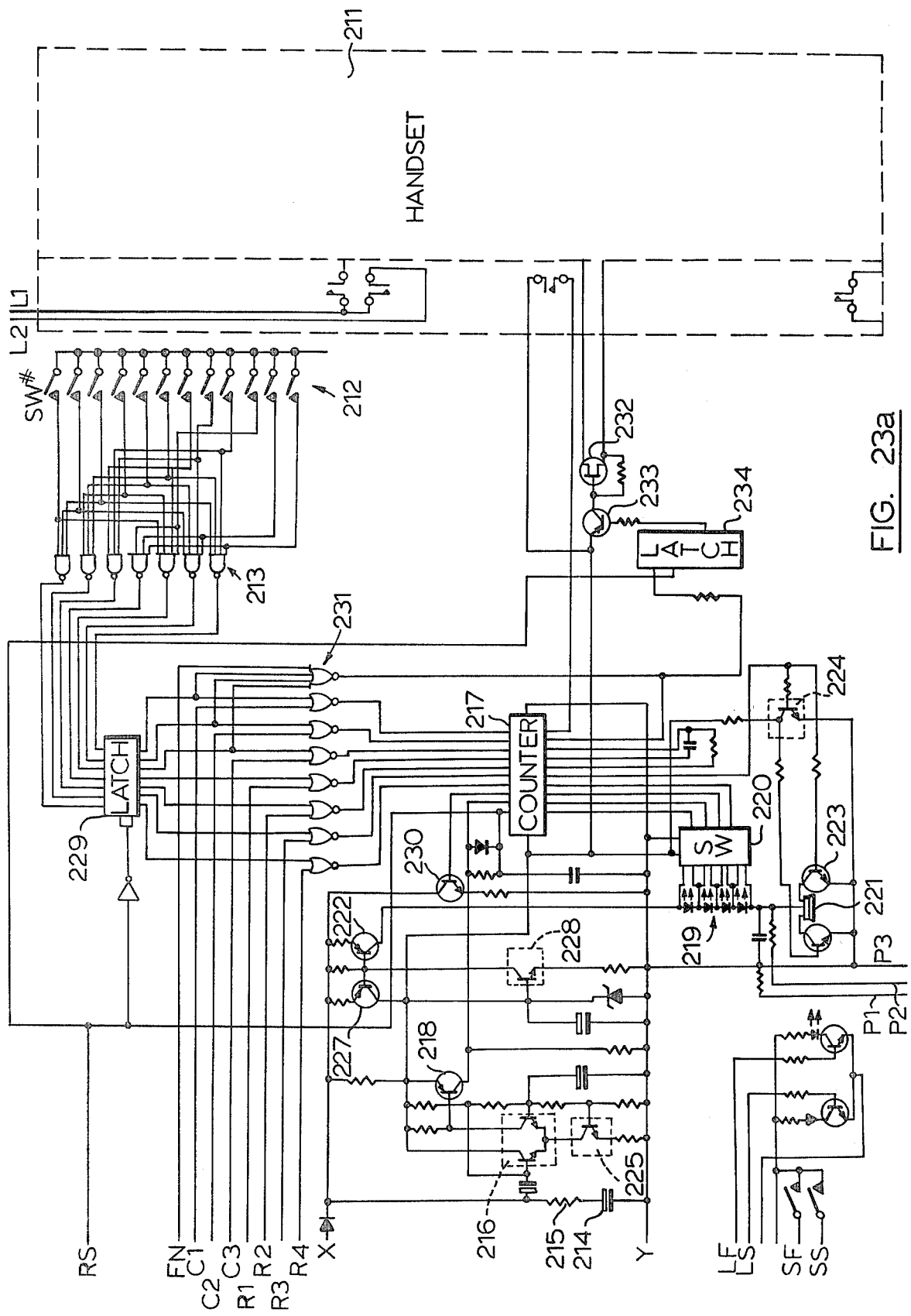
FIGS. 23a, 23b and 24 together form a schematic circuit diagram of the callmaster.
Figure 23B:
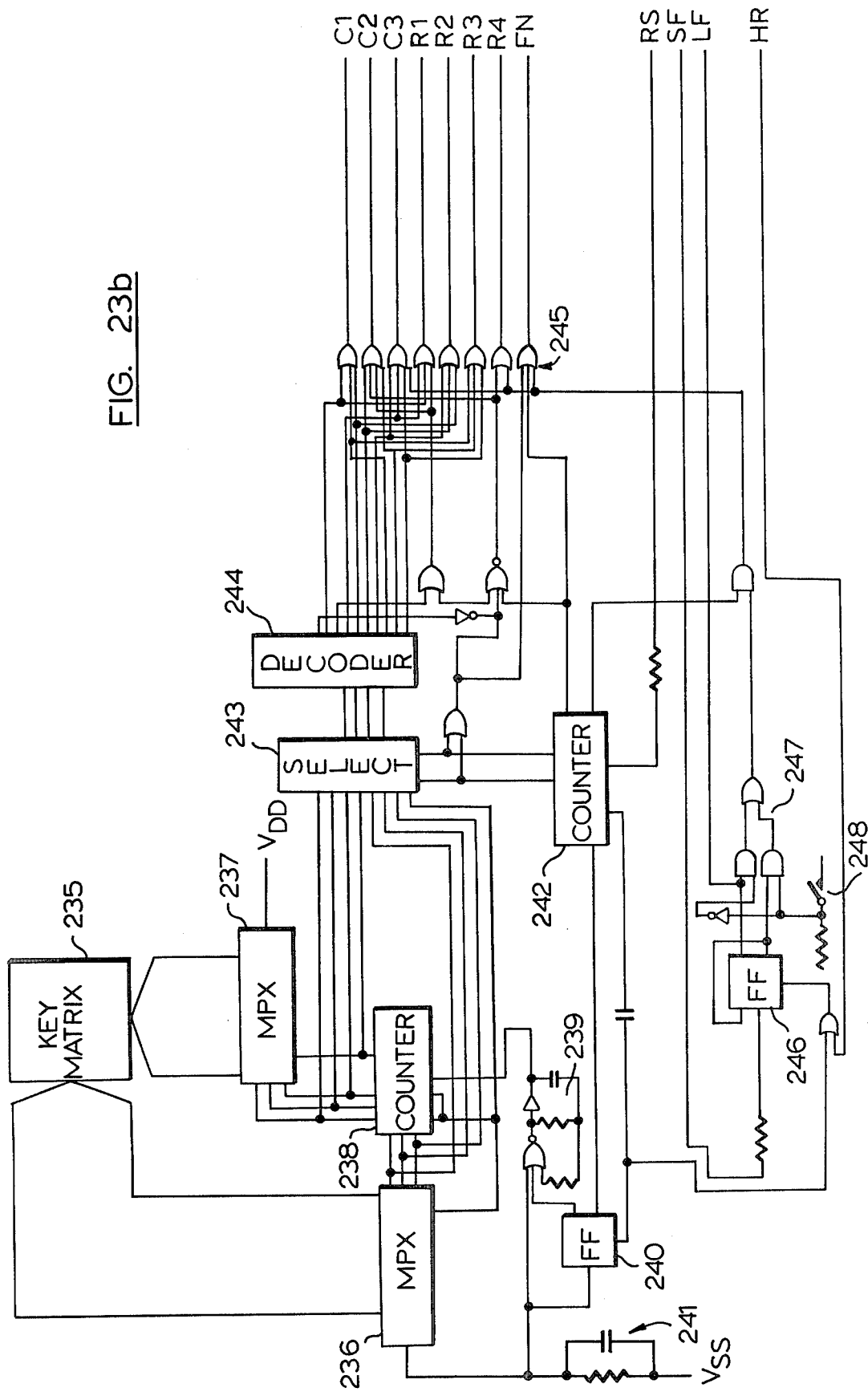
Figure 24:
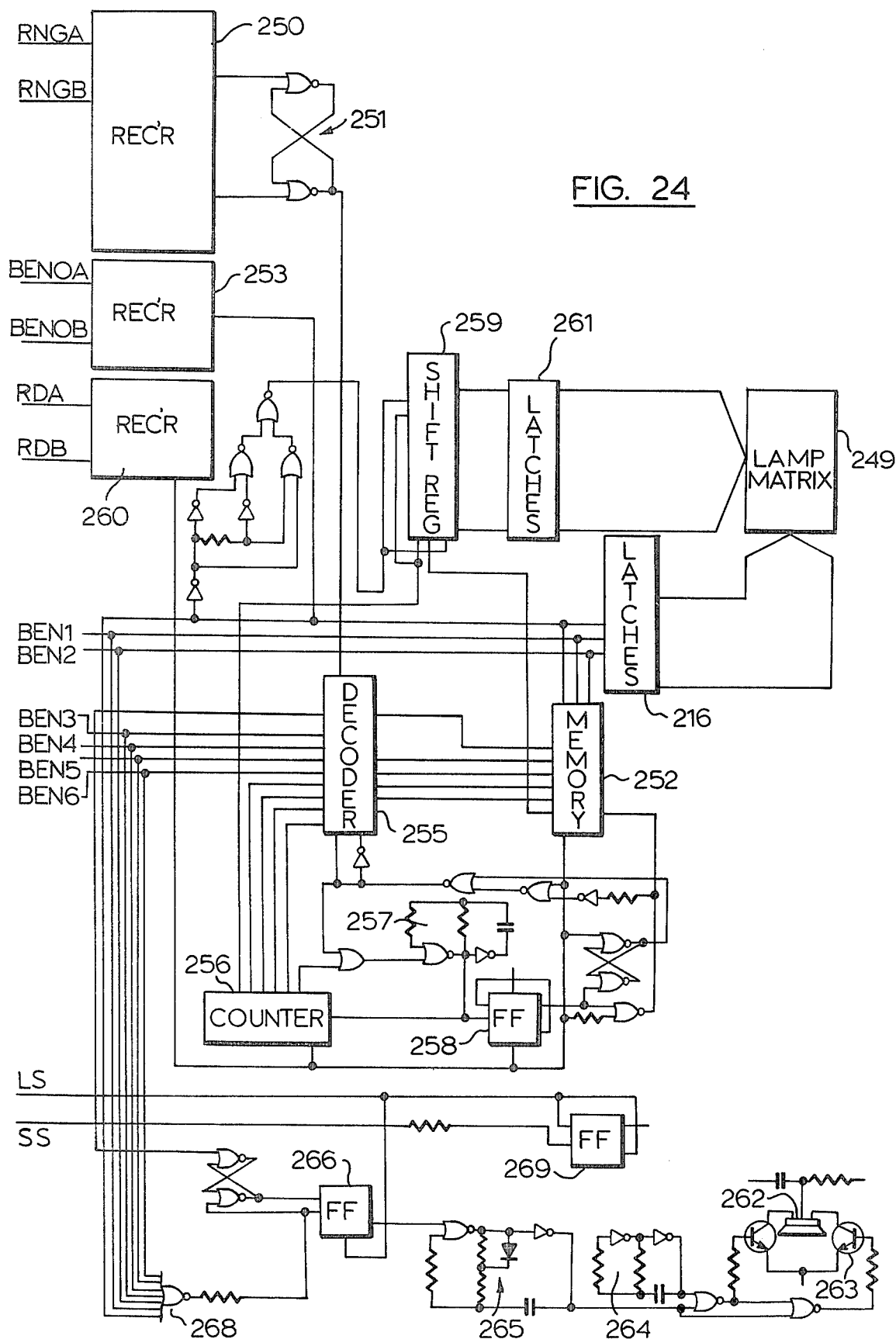

The special purpose terminal referred to as the "Callmaster" comprises two quite independent circuits, one being illustrated diagrammatically in FIGS. 23a and 23b, and the other being illustrated diagrammatically in FIG. 24. The two circuits will now be described with reference to these Figures.

Associated with the callmaster is a telephone handset, denoted by the block 211 in FIG. 23a, the speech network of which is conventional and the logic circuitry of which corresponds to that of the subset hereinbefore described. The speech path is connected to line terminals L1, L2. The subset component of the callmaster has a twelve-button keypad, illustrated schematically as a bank of switches 212, the switch configuration being coded by a bank of NAND gates 213. As in the case of the subset, D.T.M.F. signals instead of being generated at the instrument are generated at the central equipment and are inserted into the speech path of the instrument only when keying takes place. Signalling conditions are transmitted via a data pair XY.

The data pair XY is a balance line terminating in a line matching impedance 214, 215. A differential receiver amplifier 216 is connected across the line matching impedance to amplify incoming data and forward it to a special counter 217, which corresponds to the special counter 90 of the subset circuit shown in FIG. 13c. A squaring circuit in the form of a limiting amplifier 218 is provided to improve the shape of the data pulses after amplification prior to their being applied to the special counter. The counter 217 is used to control four LED's 219, through a switching device 220, which corresponds to the switching device 96 of FIG. 13c, in accordance with incoming data, and is used also to control a sounder 221. The LED's are supplied from a constant current source 222, which draws current from the data pair XY. The sounder 221 is driven by a push-pull amplifier 223 operating in the cutoff mode, the amplifier being controlled from the special counter 271 through a phase splitting inverter 224. A volume control circuit including a slide switch (not shown) is provided for controlling the volume of the sounder, the slide switch being connected to leads P1, P2 and P3.

The emitters of the transistors of the receiver amplifier 216 are connected to a transistor 225 which serves as a constant current source. As it is important that the current drawn from the line should not depend upon line length, a 5 mA constant current source incorporating transistor 227 is provided for the Zener stabilized supply to the receiver amplifier, the switching device 220, and the logic circuits. A transistor 228 whose base is connected to this supply serves as a constant current reference for the two current sources 222 and 227.

Outgoing data is initiated by the operation of the twelve-button keypad 212, the coded data being applied to a latch 229 having a debouncing function, and thence to the special counter 217. The data generated by the special counter 217 is applied to base of a transistor 230, the output of which takes the form of pulses imposed on the data pair XY. The data input to the special counter 217 is applied via a set of NOR gates 231, the second inputs of which receive data from the special circuit of FIG. 23b, as hereinafter described.

As in the case of the subset circuit, a special attenuator circuit including an FET 232 is provided, the FET being driven by a transistor 233. In the subset circuit of FIG. 13a the attenuator circuit is controlled by an off normal contact of the twelve-button keypad; in the case of the callmaster circuit, however, an FN signal is generated electronically and applied to the transistor 233 via a latch 234.

Referring now to FIG. 23b, the callmaster circuit provides a keypad, as shown in FIG. 5, the keys of which are connected electrically in a 10×10 matrix denoted schematically by the block 235. The rows and columns of keys are connected to respective multiplexers 236, 237, which receive inputs on the lines corresponding to the tens digit and units digit of the number corresponding to an operated key. The thus connected rows and columns of the key matrix are scanned by a counter 238 connected to the multiplexers 236 and 237, the counter being driven by a free running oscillator 239. When the counter finds the row and column corresponding to an operated key, the oscillator is disabled and the counter 238 is stopped. A flip-flop 240 serves as a latch to ensure that the oscillator is disabled for a time dependent on a delay circuit 241 to ensure that the current address is held. The flip-flop 240 at the time the oscillator 239 is stopped, enables a second counter 242, which controls a select gate 243, the two inputs of which are the respective tens and units counts registered by the multiplexers 236 and 237. The output from the select gate 243 is decoded by a decoder 244 and coded by gates 245 to provide an appropriately coded input to the special counter 217 of the circuit which transmits outgoing data. The counter 242 is clocked by a signal RS from the special counter at 50 ms intervals. Alternate ouputs of the counter are connected in circuit, the first and third outputs producing respectively the codes for # and 2. The fifth and seventh outputs of the counter 242 sequentially enable the select gate 243, thereby applying to the decoder 244 the tens count and units count in sequence. Thus, when a key of the key matrix 235 is depressed, the circuit automatically generates data corresponding to #2XY.

The mode key of FIG. 5, when operated, generates a signal SF which clocks a flip-flop 246, associated with a gating circuit 247, the effect of which is to place the callmaster circuit in a direct station selection mode. When this is done, a signal LF is generated to operate the mode lamp of FIG. 5 to inform the user that the system is not in its normal mode. Associated with the circuit 247 is a mode preselect switch 248, operation of which places the circuit normally in the direct selection mode, with the ability to convert to the regular mode of operation by depression of the mode key.

FIG. 24 illustrates the circuit which selectively controls the operation of the lamps of the callmaster console, these being the lamps of the keypad and lamp display 25 shown in FIG. 5. The lamp display is used only to indicate the ringing condition of internal extensions and up to three off-premise extensions, there being 99 such lamps operative in the 10×10 array. The callmaster is equipped with a sounder which responds to the ringing of an extension, and which may be disabled by operation of the key 27 (FIG. 5), the indicator lamp 29 being illuminated when the sounder is so disabled.

In principle, the display lamps are scanned in cyclic sequence in synchronism with the cyclic scanning of the system ports over a period of 50 ms, each lamp being illuminated when the corresponding extension is being rung. To avoid undesirable flicker due to a slow scanning rate, however, the lamps are scanned in groups of sixteen at a time, the lamps of each group being addressed in sequence. This is achieved by arranging the lamps electrically in a 16×8 matrix, denoted by the reference numeral 249 in FIG. 24. Data represented by bits RNGA and RNGB is transmitted over a balanced line from the central processor to a receiver 250, setting or resetting a latch 251 when the data changes from a high to a low state or vice versa. The data is stored in a memory 252. Address information from the timing generator, represented by a seven bit address is also applied to the memory 252, but the least significant bit being split as BENOA and BENOB for balanced line transmission to a receiver 253. The three least significant bits of the address information are applied to a latch 254, which includes drivers for the eight columns of lamps of the lamp matrix, for pulsing the lamps column by column in cyclic sequence. The four most significant bits BEN3 . . . BEN6 are decoded by a decoder 255 and applied to the memory 252. These four bits, which define a counting cycle of sixteen, are applied also to a modulo 16 counter 256, which drives a circuit for controlling the read-out and write-in of the memory 252. This circuit comprises essentially an oscillator 257 and a flip-flop 258, the latter being effective to unload the contents of the memory 252 into a shift register 259 at the sixteenth count, in accordance with timing pulses RDA and RDB received by a receiver 260 from the timing generator over a balanced line. The output of the shift register 259 is applied to the lamp matrix 249 via latches and drivers 261.

The sounder is shown at 262. This is driven by a push-pull amplifier 263 from an oscillator 264 and cadenced by a candence oscillator 265. The cadence oscillator 265 and hence the sounder 262 is controlled by a flip-flop 266 in accordance with receipt of a "ring" signal RNGA, RNGB from the latch 251 via a latch 267, the flip-flop being clocked by the pulse ENO from a NOR gate 268 in the first time slot of each scanning cycle. A second flip-flop 269, which is responsive to a pulse SS caused by operation of the buzzer key 27 (FIG. 5), is operable to reset the flip-flop 266 thus disabling the sounder circuit. When the flip-flop 269 is so actuated, its complementary output produces a pulse LS which operates the associated lamp 29 (FIG. 5) to warn the user that the sounder has been disabled.

The DSS Console

Figure 25A:
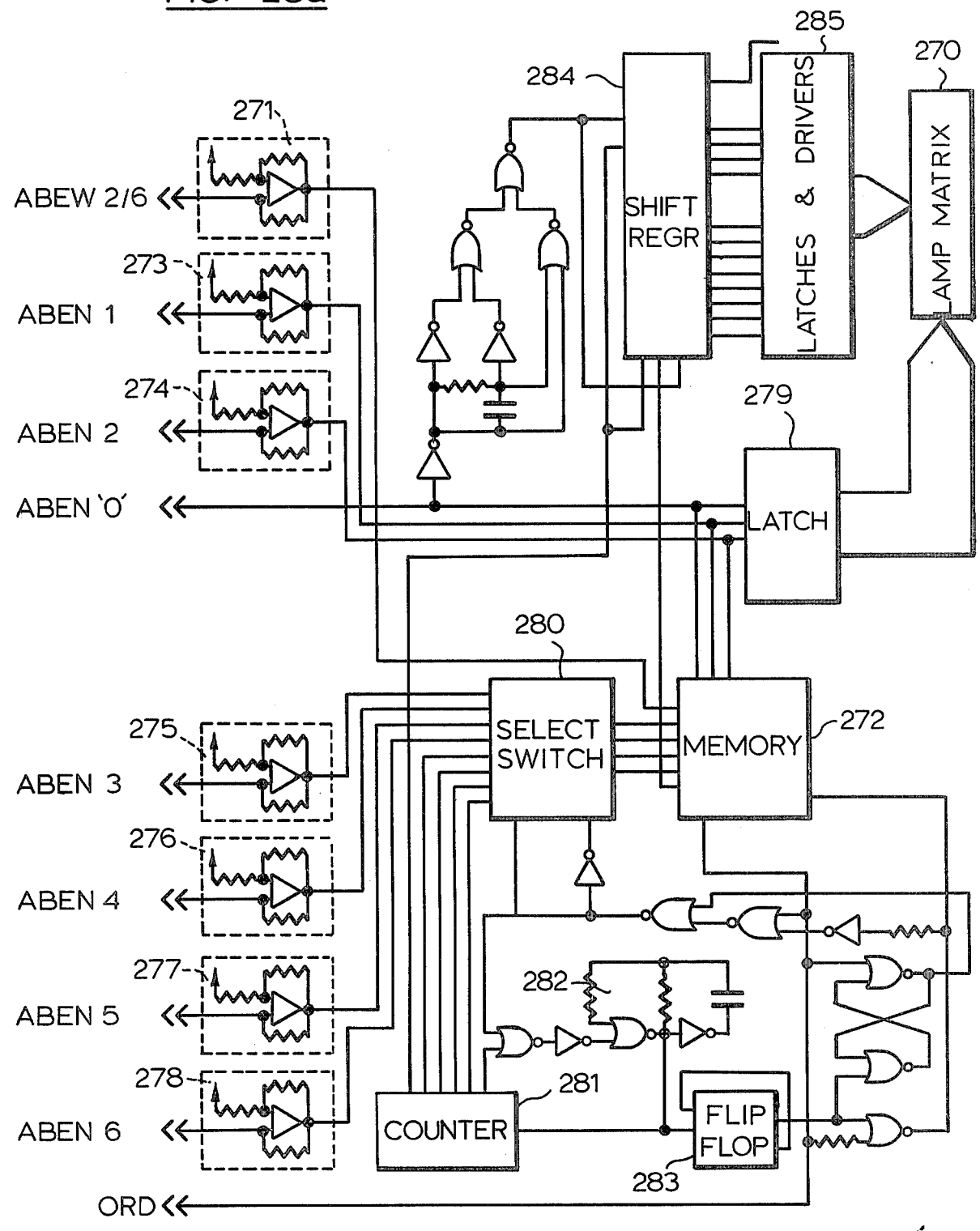
FIGS. 25a and 25b together illustrate the circuitry of the D.S.S. console.
Figure 25B:
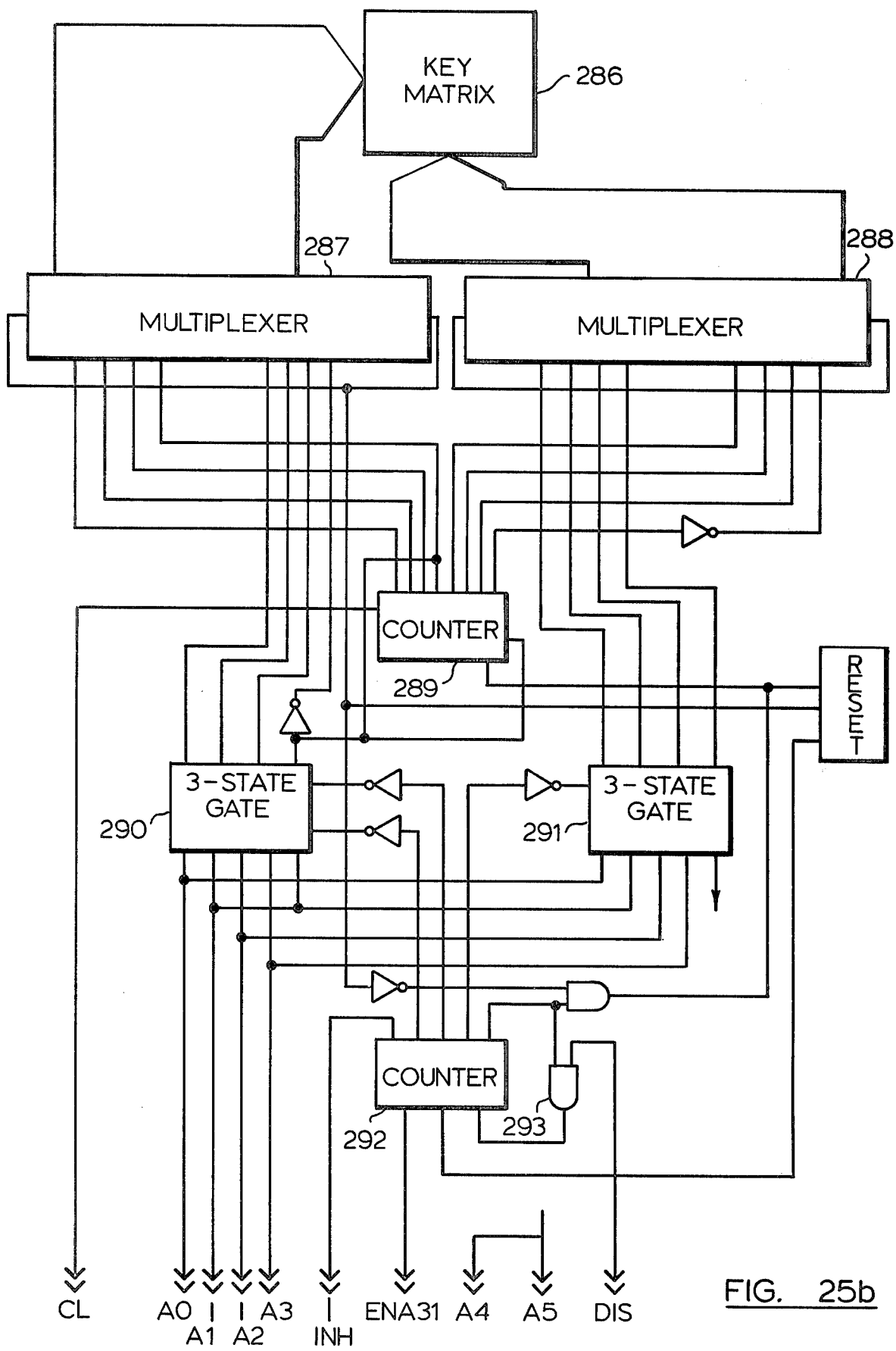

The direct station selection console also comprises two quite independent circuits, which are illustrated diagrammatically in FIGS. 25a and 25b, respectively. The two circuits will now be described with reference to these figures.

FIG. 25a illustrates the circuit which, in response to incoming data, controls the operation of the lamps of the DSS console, these being the lamps 22 shown in FIG. 5. As in the case of the callmaster console, the lamps are physically arranged in a 10×10 matrix and are selectively illuminated when the respective corresponding extensions are engaged.

As in the case of the callmaster console, the display lamps are scanned in cyclic sequence in synchronism with the cyclic scanning of the system ports over a period of 50 ms, and to avoid undesirable flicker due to a slow scanning rate the lamps are scanned in groups of sixteen at a time, the lamps of each group being addressed in sequence. This is achieved by connecting the lamps in a 16×8 matrix, denoted by the reference numeral 270 in FIG. 25a. Data represented by the bit ABEW2/6 is received by a receiver 271 and stored in a memory 272. Address information from the timing generator, represented by a seven bit address, is also applied to a memory 272; six of these bits are applied via receiver amplifier 273 . . . 278. The three least significant bits of the address information are applied to a latch 279, which includes drivers for the eight columns of lamps of the lamp matrix 270, for pulsing the lamps column by column in cyclic sequence. The four most significant bits of address information ABEN3 . . . ABEN6 are applied to the memory 272 via a select switch or decoder 280. These four bits, which define a counting cycle of sixteen, are applied also to a modulo 16 counter 281, which drives a circuit for controlling the read-out and write-in of the memory 272. This circuit comprises essentially an oscillator 282 and a T-type flip-flop 283, the latter being effective to unload the contents of the memory 272 into a shift register 284 at the sixteenth count, on receipt of the timing pulse ORD from the timing generator. The output of the shift register 284 is applied to the lamp matrix 270 via latches and drivers 285.

The keys 23 of FIG. 4 are arranged in a 10×10 matrix, denoted by the block 286 in FIG. 25b. The rows and columns of keys are connected to respective multiplexers 287, 288, which register the tens digit and the units digit, respectively, of the number corresponding to an operated key. The rows and columns of keys are scanned by a free running two-part counter 289, which is driven by a clock line CL from a free running oscillator in the attendant's console. The binary output of the first part of the counter is connected to the control leads of the multiplexer 287 so that, when a key is depressed, the corresponding crosspoint being interconnected, the corresponding inputs of the two multiplexers are interconnected. In this case, when the two outputs of the counter correspond to the tens digit and the units digit of the keyed number, the counter is stopped. Its outputs are fed to a pair of 3-state gates 290, 291, the information therefrom being multiplexed and sent sequentially to the data bus of the attendant's console, this data being represented by the bits A0 . . . A3. The multiplexing of the data supplied to the attendants console is controlled by a second counter 292, which is clocked at 50 ms intervals at the appropriate time slot of each scanning cycle by the pulse ENA31. The first and second timing pulses of ENA31 enable part of the 3-state gate 290 and release the number 2 twice in binary form. The third timing pulses steps the counter 292 up to 3 and there is no output at this time. The fourth timing pulse enables the latch 291, which releases the tens digit of the keyed number in I.T.T. code C. At the fifth count there is a pause, and the sixth timing pulse steps the counter 292 to enable the latch 290 and so release the units digit of the keyed number. The next timing pulse resets the circuit.

It should be noted that when the direct station selection console is in use, the signal INH to the attendant's console is high, inhibiting the generation of data from the attendant's console. When the attendant's console is in use, a signal DIS is applied to gate 293, inhibiting the direct station selection console.

The Crosspoint Matrix

Figure 26:
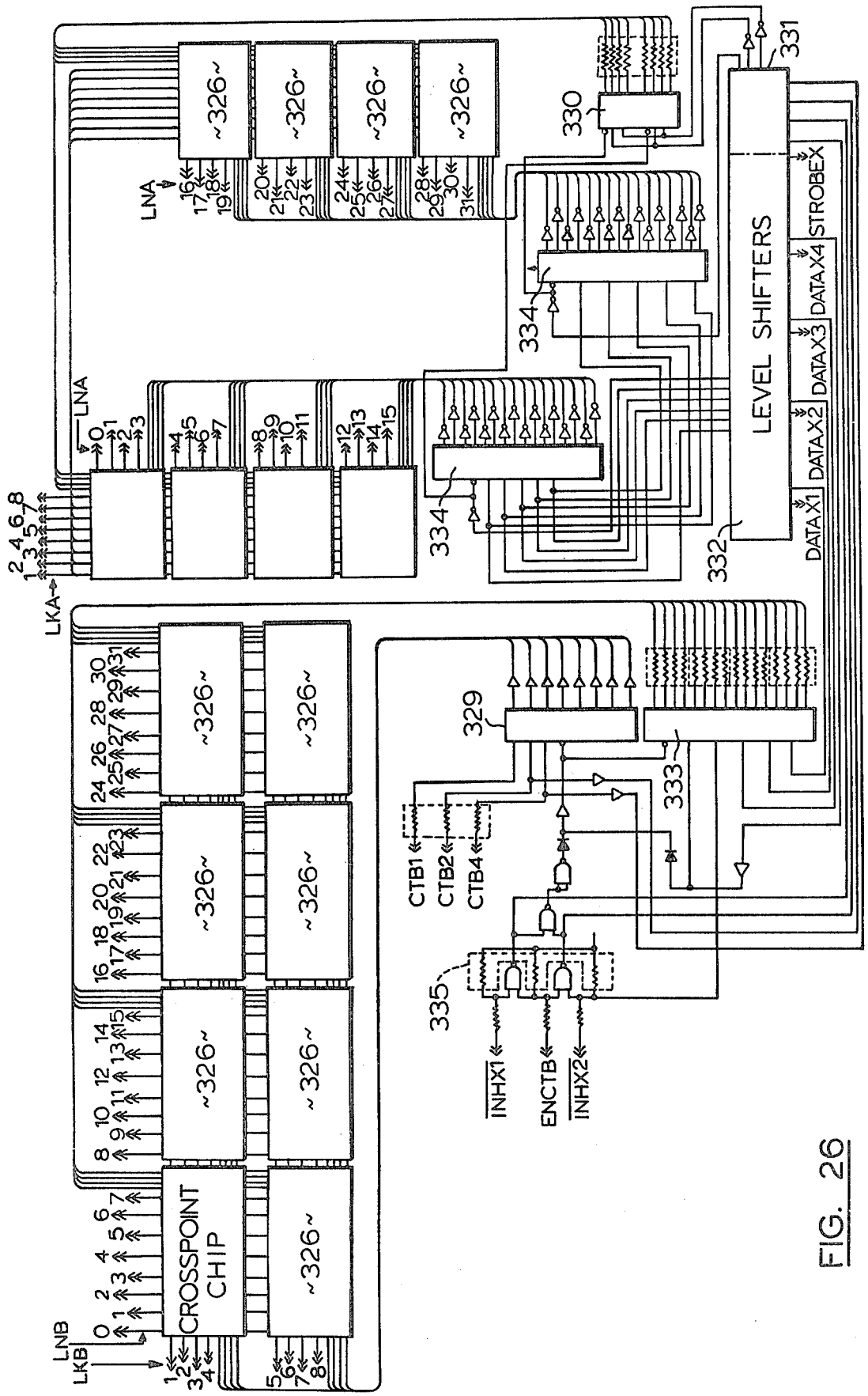
FIG. 26 is a circuit diagram of one board of the crosspoint matrix, there being up to sixteen such boards in the system.
Figure 27:
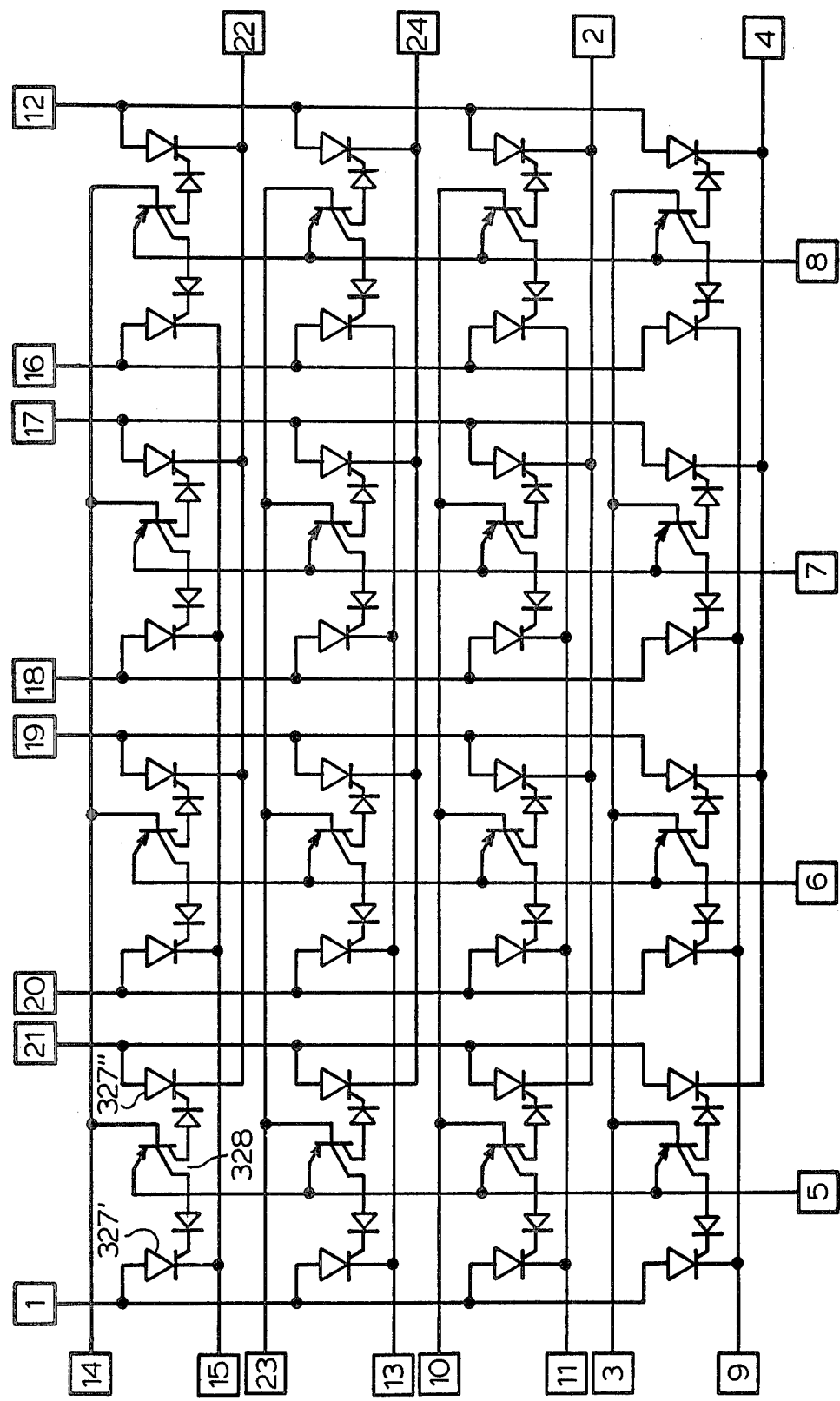
FIG. 27 is a simplified circuit diagram of a crosspoint chip used in the crosspoint matrix.

The crosspoint matrix comprises up to sixteen boards, the circuitry of one board being illustrated schematically in FIG. 26. Each board is adapted to serve eight links and thirty-two lines, and comprises an array of crosspoint chips 326 set in two banks of eight. The chips are of the Motorola type MC3416, and one such chip is illustrated schematically in FIG. 27. Referring to FIG. 27, the chip comprises a rectangular array of sixteen crosspoints, each crosspoint being composed of a pair of SCR's 327' and 327" associated with a multi-collector transistor switch 328 by which they are triggered. The crosspoint chips cannot be used conventionally because of the different directions of current flow in the two elements of a line pair. A crosspoint chip is therefore used in the form of an eight-by-four matrix associated only with line pair elements of the same type.

Referring to FIG. 26, a system of gates 335 selects the particular crosspoint board out of sixteen, the board selected being the one with the ENCTB bit and one of the bits $\overline{INHX1}$ or $\overline{INHX2}$ high simultaneously. Of the thirty-two line pairs $LNA_n$, $LNB_n$ (n=0, 1, 2 . . . 31), the required pair is selected according to the bits DATAX1, . . . DATAX4 and $\overline{INHX1}$ or $\overline{INHX2}$ derived from the crosspoint preselector and applied to decoders 333 and 334 through level shifters 332. The decoders 333 and 334 apply the line triggers to the left and right banks respectively, of the crosspoint chips 326. Of the eight link pairs $LKA_m$, $LKB_m$ (m—1,2 . . . 8), the correct one is selected according to the bits CTB1, CTB2, CTB4, applied to the decoders 329 and 330 through level shifters 331. The decoders 329 and 330 apply the link triggers to the left and right banks respectively, of the crosspoint chips 326. STROBEX and ENCTB signals also control the timing of the line and link triggers within the proper 390 μs time slot. It should be noted that for crosspoint switching, besides the above operations, the appropriate link power supply needs to be marked by its LKA leg being at −26 v. The selected link is instructed by the crosspoint preselector so as to mark itself.

The Crosspoint Preselector

Figure 28B:
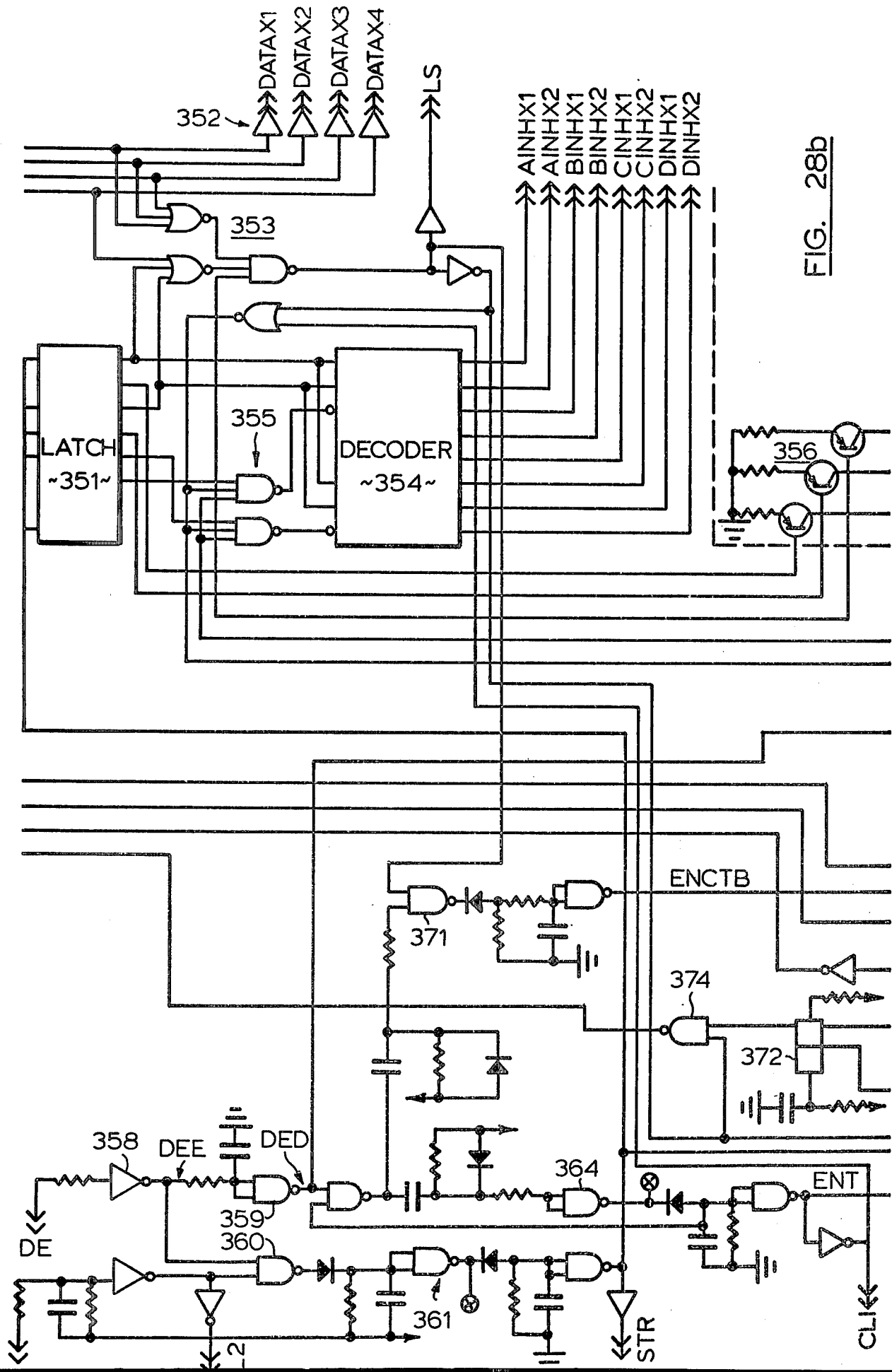
Figure 28C:
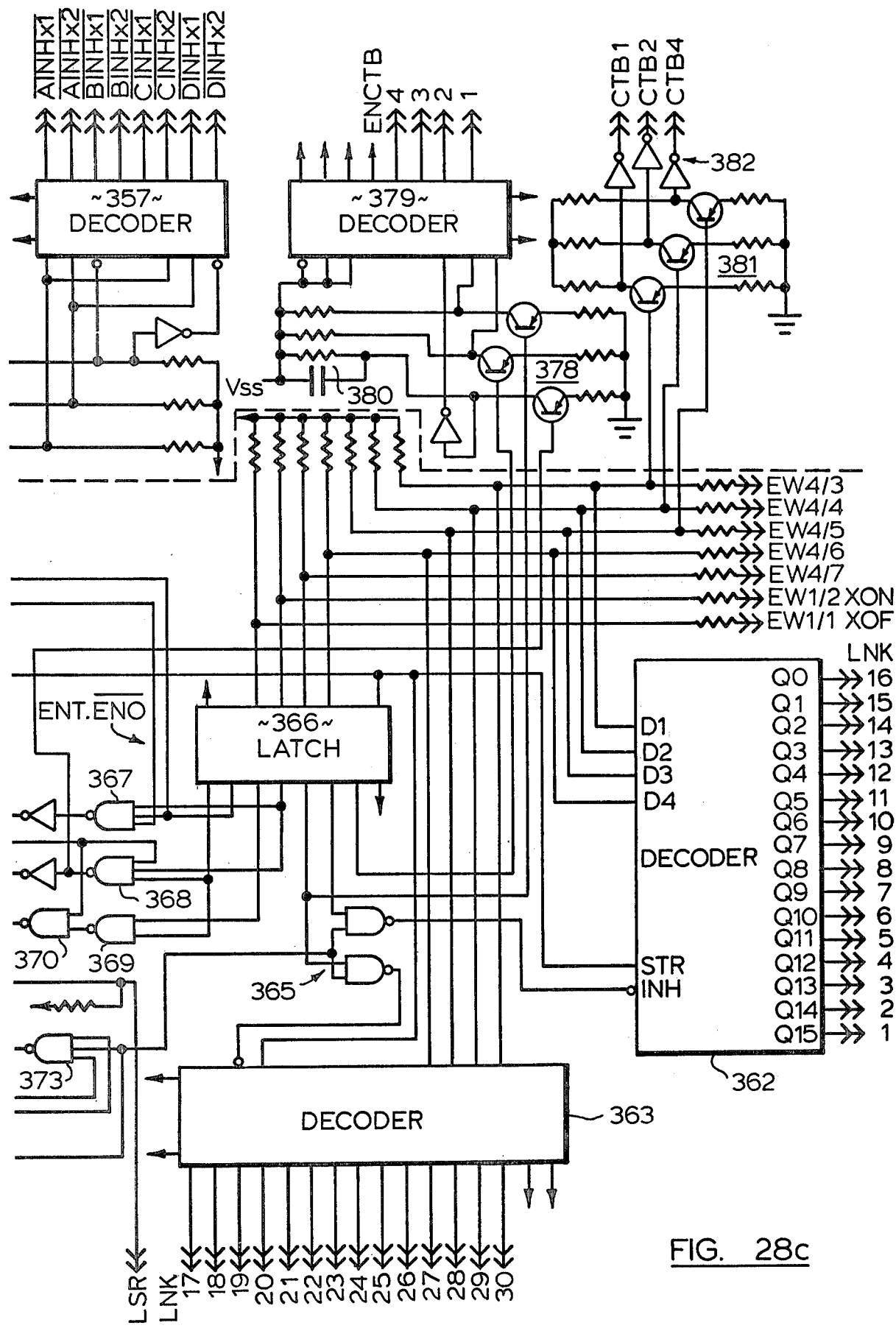

A crosspoint in a given row of the matrix is turned on or off only when the system scan reaches the port to which the crosspoint row is connected. The crosspoint preselector receives the scan information from the timing generator and crosspoint switching commands and link address information from the central processor. This information is sorted and forwarded to the appropriate crosspoint, and to the crosspoint selector and link power supply boards. The information is combined to turn on or off the selected crosspoint. The circuit of the crosspoint preselector is illustrated in the composite diagram formed by FIGS. 28a, 28b, and 28c.

Three bits of address information from the timing generator, ENB4, ENB5, ENB6 are entered into a latch 351. The first four bits ENB0 . . . ENB3 are applied to buffers 352, the outputs of which determine the signals DATAX1, DATAX2, DATAX3, DATAX4, which are supplied to the crosspoint selector (FIG. 30), the crosspoint matrix (FIG. 26) and are also used in trunk interface control circuits. The crosspoint preselector sends information to the central processor only in the scanning time slot EN0, and in this period a determination of whether a link is equipped or not is made. The data bits are combined by a system of gates 353, the combination being at logic 0 in the time slot EN0 and resulting in a "link search" signal LS. The outputs of the latch 351 are applied to a decoder 354, which is enabled by gates 355, and the complementary outputs of the latch are applied via a level shifter 356 to a decoder 357. The decoded eight bit output $\overline{AINHX1}$ etc. is sent to the crosspoint matrix and used to determine the row in which a crosspoint is to be triggered. The decoded eight bit output AINHX1 etc. from the decoder 354 is sent to the crosspoint selector; this output is normally high, only one of the eight bits being low at any given time, and then only for the purpose of switching off a selected crosspoint.

The signal DD is derived from the timing generator (FIG. 10) and is thirty microseconds wide. From this signal is derived a signal CL2, which is used for timing purposes on all the trunk interfaces of the system. A "data enable" pulse DE from the timing generator, after inversion by an inverter 358, results in a signal DEE which, after delay and inversion and shaping by a Schmitt trigger 359 results in a signal DED. The signal DED performs the function of latching the "crosspoint on" and "crosspoint off" signals XON, XOF, and the link address bits from the central processor EW4/3 . . . EW4/7. The signal DEE is gated with the pulse DD, the latter being inverted, by a gate 360 and applied to a pulse stretcher 361. The output of the pulse stretcher 361 produces the strobe pulse STR and provides a clock to the latch 351.

Figure 29:
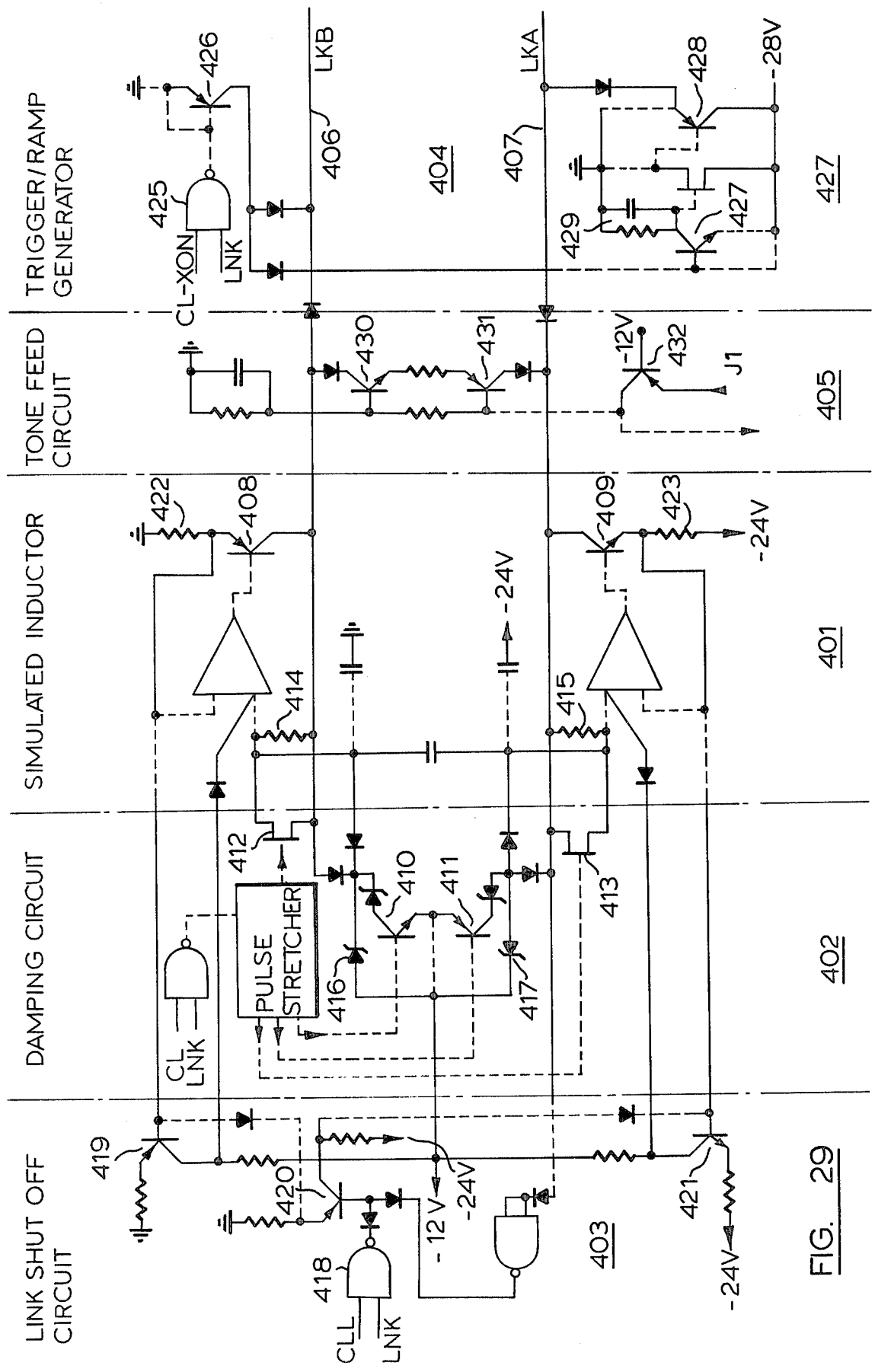
FIG. 29 is a schematic circuit diagram of a system referred to herein as the "link power supply"

The signals LNK1 . . . LNK30, which are the decoded outputs of decoders 362 and 363, are supplied to the link power supply (FIG. 29). A signal ENT, which is the output of a monostable multivibrator 364, is used only on the preselector board for timing purposes, the monostable multivibrator 364 being triggered by the signal DED. The signal ENT produces the output $\overline{CL1}$, which is the timing pulse TKCLK used in trunk interfaces as hereinafter described.

A pair of gates 365 are used to select the decoders 362 and 363 only when the signal ENT is high.

The "crosspoint off" signal XOF is derived from the central processor and applied to a latch 366, to which the "crosspoint on" signal XON and two bits of the link address are also applied. The latch 366 furnishes signals XON, XOF, $\overline{XON}$, and $\overline{XOF}$, which are clocked out of the latch by the clock signal DED. These outputs are applied to gates 367, 368, 369 and 370, and combined with signals ENCTB and ENT.$\overline{ENO}$ to produce the gated output signals CLL, CL.XON, and CL. The signal CLL is a "clear link" pulse which is used to reduce the link voltage to zero for a period of 200 μs and so release all crosspoints connected to the link. The signal CL.XON is sent to the link power supply only for the purpose of switching on a selected crosspoint. The signal CL is used for the purpose of clocking links, both for turning on and off crosspoints. It will be noted that the signal ENCTB derived from gate 371 is blocked during the time slot ENO.

The signals AINHX1, etc. are selected by the gates 353, 355 and decoder 354 only when the signal ENO is low and signals ENT and XOF are high.

The "link search" interrogating signal LS results in a response LSR from the link power supply if the link power supply is equipped. As the exchange of information with the central processor is effected only during the scanning time slot defined by the pulse ENO, it is necessary to store the information LSR in a one-bit store 372, where the information is stored for one cycle and clocked out by the pulse ENO applied to gates 373, 374. The output of gate 374 is the pulse $\overline{LEQ}$, this pulse being transmitted to the central processor in the proper time slot to inform the central processor that the link is equipped.

It will be noted that outputs of the latch 366 are sent with the pulse ENCTB via a level shifter 378 to a decoder 379, a small delay being applied by a time constant circuit 380, the decoded output being represented by signals ENCTB1, ENCTB2, ENCTB3, and ENCTB4 which selectively determine the link which has been addressed. The link address signals EW4/3, EW4/4 an EW4/5 are also applied via a level shifter 381, the output being inverted by inverters 382 resulting in the "link select" bits CTB1, CTB2 and CTB4 used by the crosspoint matrix. The crosspoint preselector board contains, in addition power supplies for powering the crosspoint matrix boards and protection circuitry associated with the power supplies.

The Link Power Supply

The link power supply feeds direct current to the telephones, applies a trigger to turn on selected crosspoints, inserts DTMF and supervisory tones in conjunction with the tone insertion circuits, and presents a high impedance path for speech currents. Two link power supplies are contained on a single board.

FIG. 29 is a simplified schematic diagram of one of the link power supplies. As indicated in the diagram, the linkpower supply can be divided broadly into five sections, namely a simulated inductor 401, a damping circuit 402, a link shut-off circuit 403, a trigger/ramp generator 404, and a tone feed circuit 405.

The simulated inductor 401 is central to the link power supply. This component, through transistors 408 and 409 supplies a direct current to the instrument connected to the link pair 406, 407, through the crosspoint matrix. The circuit appears as a low resistance voltage source between the lines 406, 407 for direct current, while presenting a high inductive impedance for speech signals. Since the switching on or off of a crosspoint must take place within a time slot of 390 μs, it is necessary that the link power supply should adjust to current demands of load variations caused by such switching within the 390 μs period. To achieve this, the link power supply is made to appear as a low resistant voltage source for alternating current signals as well as direct current during switching, while recovering smoothly to its high impedance alternating current state following a load change. The damping circuit is used for this purpose. The damping circuit receives a clamping pulse CL during the appropriate time slot in which a crosspoint needs to be turned on or off. A "link enable" pulse LNK is also applied to the selected link, at the same time, and so activating the damping circuit of the selected link. Transistors 410, 411 are turned on, as also are the field effect transistors 412, 413, which effectively short-circuit the resistors 414, 415, thereby reducing the apparent impedance presented by the simulated inductor 401 across the line pair 406, 407. The transistors 410, 411 are switched off after approximately 1 mS and the field effect transistors recover to their high impedance state with a time delay of approximately 100 ms. A pair of Zener diodes 416, 417 are provided for the purpose of clipping speech under signal overload conditions.

The link shut-off circuit 403 is used to disconnect all crosspoints connected to a link at the end of a call, to limit the current in the case of a short circuit fault between the line pair 406, 407, and to shut-off the link power supply in the event of a ground fault on line 407. At the end of a call, a "clear link" pulse CLL of 200 μs duration is applied to a gate 418, with the "link enable" pulse LNK of the appropriate link. For the duration of the CLL pulse, transistors 419, 420 and 421 are turned on, causing the transistors 408, 409, to be turned off.

Therefore, the link current falls to zero, releasing all crosspoints connected to that link. At the end of the "clear link" pulse CLL, the damping circuit 402 is activated to restore the link power supply to its initial condition.

In the case of a short circuit fault across the lines 406, 407, the current is limited to about 140 mA. This is accomplished by sensing the voltage drop across the resistors 422, 423 resulting from link current and partially turning on the transistors 419, 421. A ground short to line 406 does not present any problem since a diode 424 becomes reverse biased. However, a ground short to line 407 which persists for more than 5 mS is detected and used to turn on transistors 419, 420, 421, so turning off the transistors 408, 409 and ensuring that no damage will result in the circuit. If the ground short occurs on the line side, the link power supply is switched off in the manner described above and also ensures that the crosspoints are switched off, thereby preventing damage to the crosspoints.

To turn on a crosspoint connected to a selected link, the voltage on the negative leg must be brought down to $-26$ volts or lower when the trigger is applied to the crosspoint. This is achieved on the link power supply by the trigger/ramp generator 404. A "crosspoint on" pulse CL.XON and a "link enable" pulse LNK are gated by a gate 425 and applied to transistor 426, which is turned on together with transistor 427, bringing the emitter of transistor 428 to approximately $-26$ volts. When the signal CL.XON is removed, a time constant circuit 429 ensures that the voltage on line 407 is raised to the normal value of $-18$ volts with a time constant of approximately 250 μs.

Transistors 430, 431 and 432 forming the tone feed circuit 405 are used to insert the D.T.M.F. and supervisory tones on the link. Tone currents J1 from the tone insertion unit are inserted at the emitter of transistor 432, converted to a voltage at the collector, and applied to the base of transistor 431. The transistors 430 and 431 perform the actual insertion of the tones onto the link pair 406, 407.

In order to reduce crosstalk and noise, individual on-card voltage regulators are used to generate the voltage of $-24$ volt required for the link power supplies from $-28$ volt. LED's are turned on by the pulse CL.XON and are turned off by the pulse CLL at the end of a call, to indicate that a link is busy or free.

The Crosspoint Selector

Figure 30:
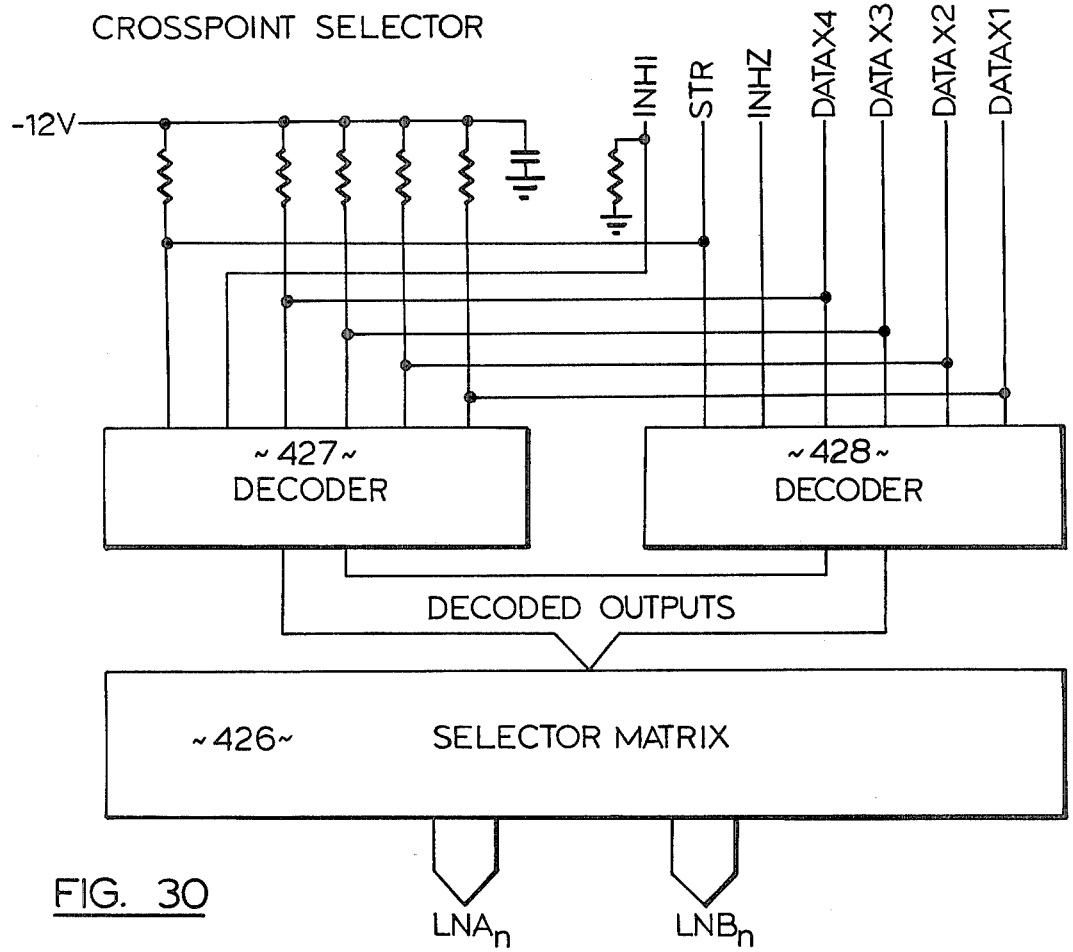
FIG. 30 is a schematic circuit diagram of a system component referred to herein as the "crosspoint selector"

FIG. 30 is a schematic diagram of the crosspoint selector circuit, which, under instruction from the crosspoint preselector (FIGS. 28a, 28b and 28c), switches off a selected crosspoint of the crosspoint matrix. This is achieved in the crosspoint selector by driving the positive leg of the line pair more positive than the positive leg of the link pair and driving the negative leg of the line pair more negative than the negative leg of the link pair, thereby reducing the current through the crosspoint to zero and causing it to release.

Figure 31:
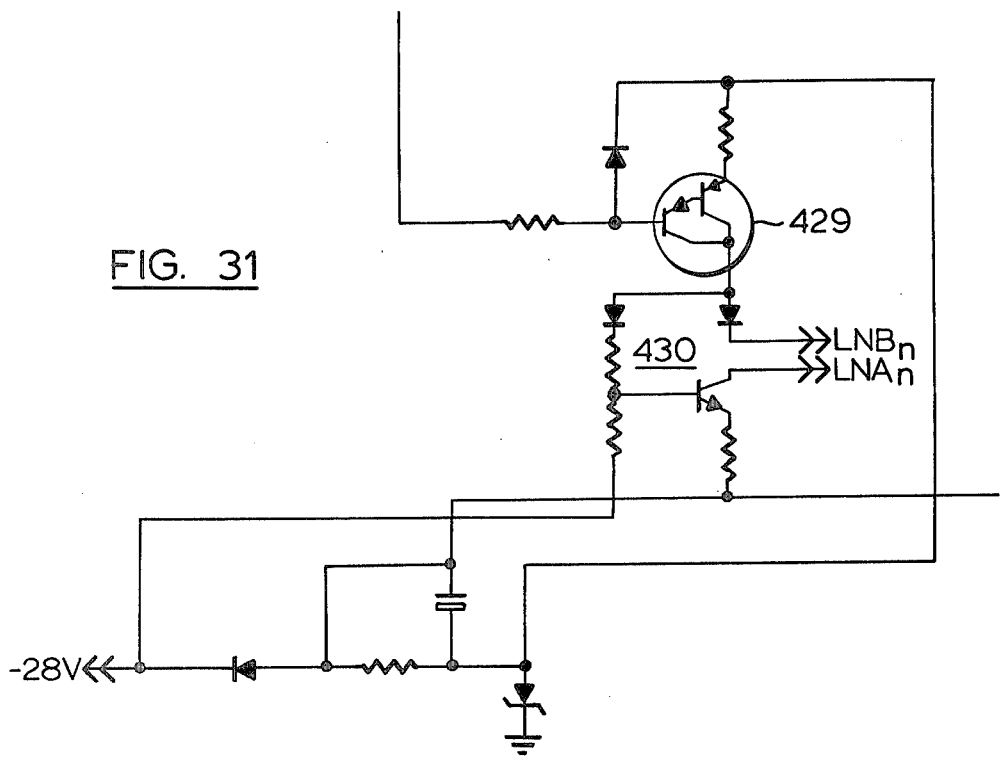
FIG. 31 illustrates a detail of the crosspoint selector circuit.

The circuit comprises a selector matrix 426 consisting of an array of thirty-two switching circuits, one of which is shown in detail in FIG. 31. The switching circuits are selectively operated by the outputs of a pair of decoders 427 and 428. The bits DATAX1, DATAX2, DATAX3, DATAX4 and INH1 or INH2, derived from the crosspoint preselector, thus determine which crosspoint selector board and which one of the thirty-two switching circuits on a board shall be activated. A strobe pulse STR serves to latch the DATAX1 . . . DATAX4 bits in the decoders. In FIG. 30, the annotations $LNA_n$ and $LNB_n$ refer to any of the thirty-two line pairs obtained by setting n=0, 1, . . . 30, 31.

Referring to FIG. 31, each of the decoded outputs Q is applied to the base of a switching transistor 429, which is thus turned on causing the transistor 430 also to turn on. The two transistors when switched on, pull $LNB_n$ sufficiently high and $LNA_n$ sufficiently low to cause the release of the crosspoints connected through them. When a crosspoint is to be turned on, trigger pulses are applied to the selected link power supply and designated crosspoint boards in order to turn on the proper crosspoint. When the trigger pulses are removed, the crosspoint SCR's continue to hold due to the line current that has been established through them.

The D.T.M.F. Receiver

Figure 32:
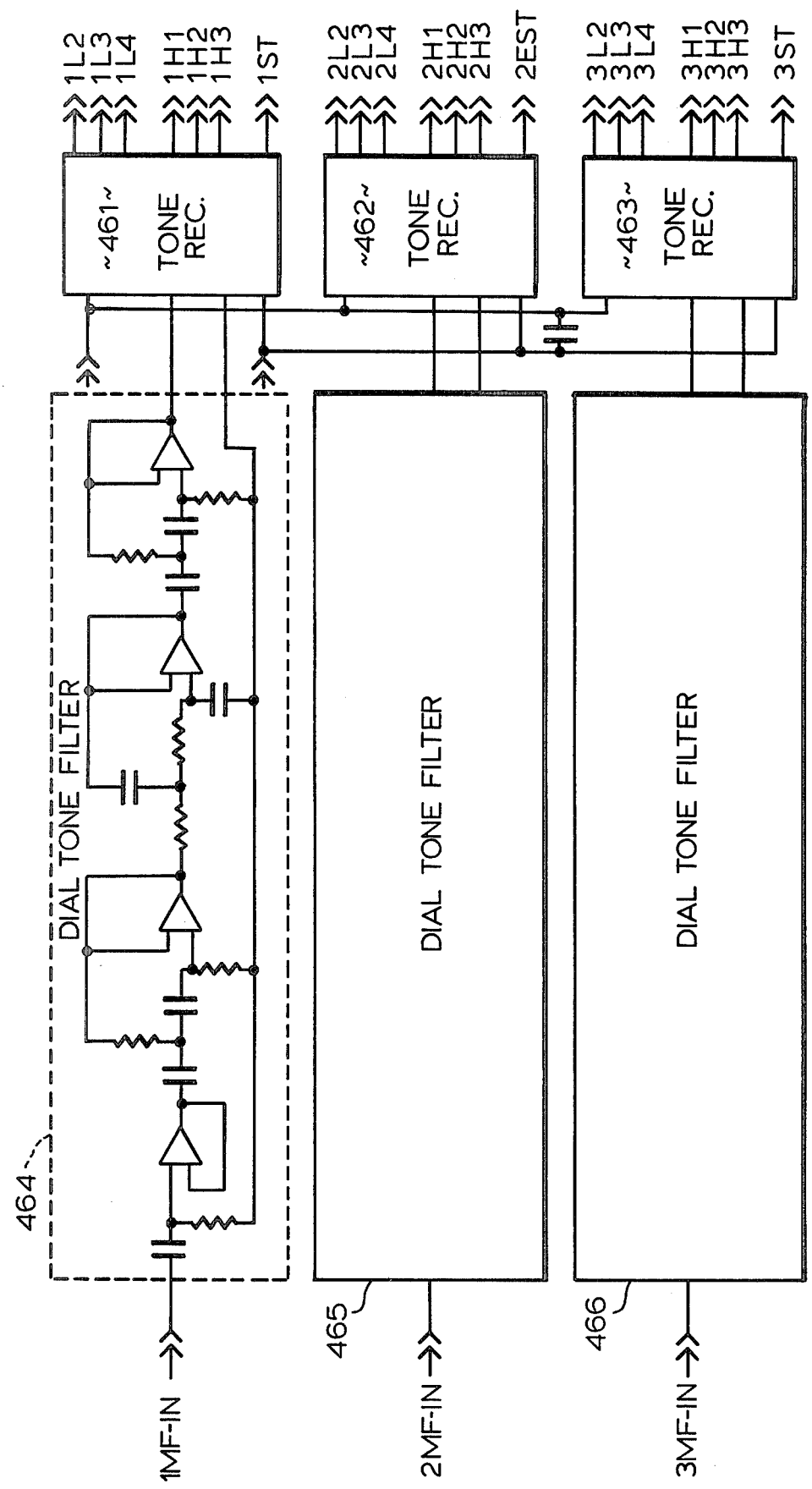
FIG. 32 is a schematic circuit diagram of a system component referred to herein as the "D.T.M.F. receiver"

The circuit of the D.T.M.F. receiver board is illustrated in FIG. 32. This comprises three tone receivers of a standard type 461, 462 and 463, which are preceded by dial tone rejection filters 464,465 and 466, only one of these being illustrated in detail in the drawing. Tone signals 1MF -IN, 2MF-IN and 3MF-IN are received from the D.T.M.F. receiver selector (FIGS. 33a and 33b), low and high tones 1L2, 1L3, etc. and 1H1, 1H2, etc. being supplied to the D.T.M.F. receiver selector. The signals 1ST, 2ST and 3ST are steering outputs which enable the information to be clocked in when valid information is received.

The D.T.M.F. Receiver Selector

When "Touchtone" is received from Tie trunks or off-premise extensions, the D.T.M.F. receiver selector circuit connects the appropriate interface to the D.T.M.F. receiver board, selecting the appropriate receiver, when instructed to do so by the central processor via the equipment data multiplexer. The D.T.M.F. receiver selector also includes the circuits required to multiplex the digital outputs of the tone receivers and to forward them to the central processor via the equipment data multiplexer at the correct times.

Figure 33A:
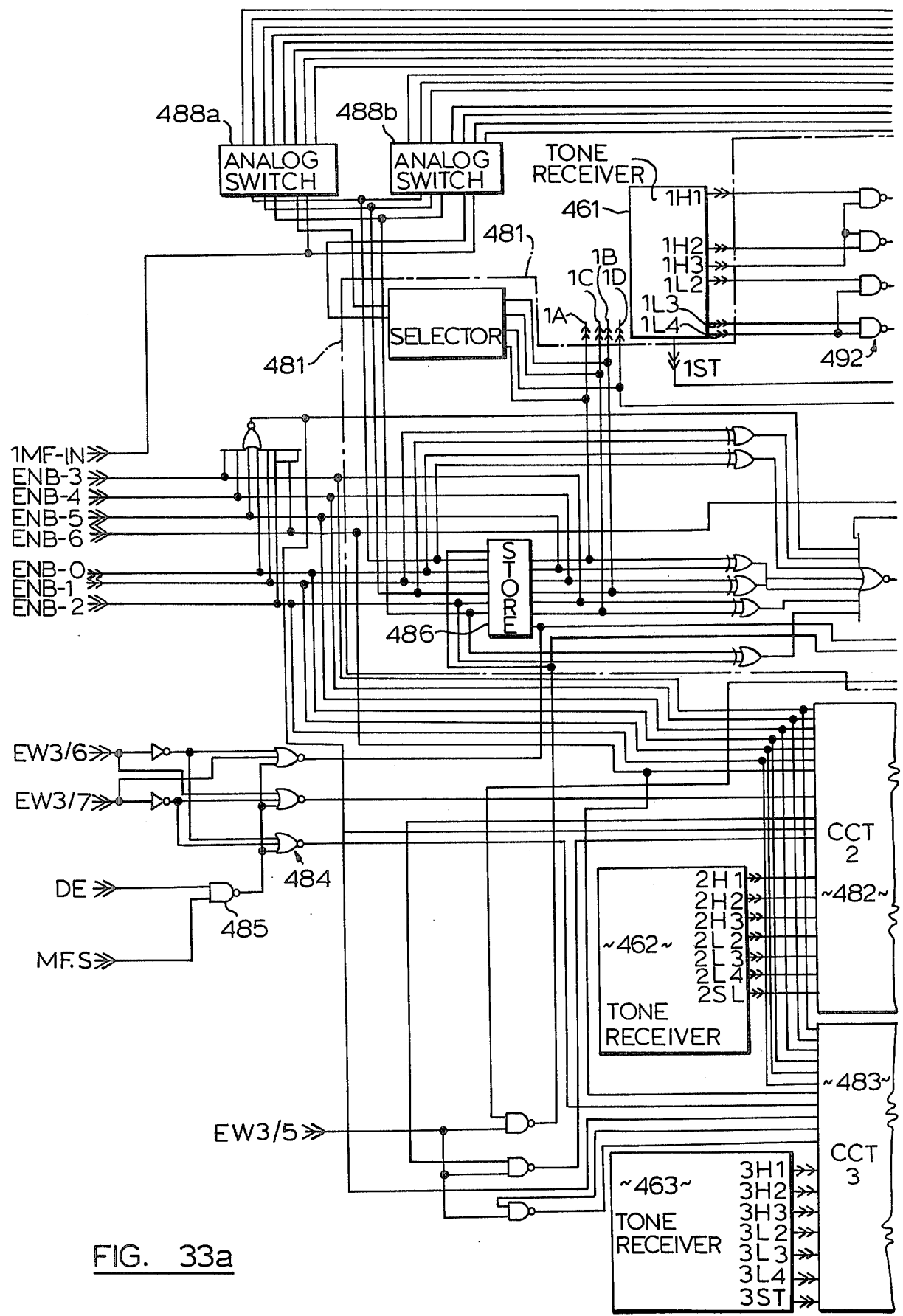
FIGS. 33a and 33b together form a schematic circuit diagram of the D.T.M.F. receiver selector.
Figure 33B:
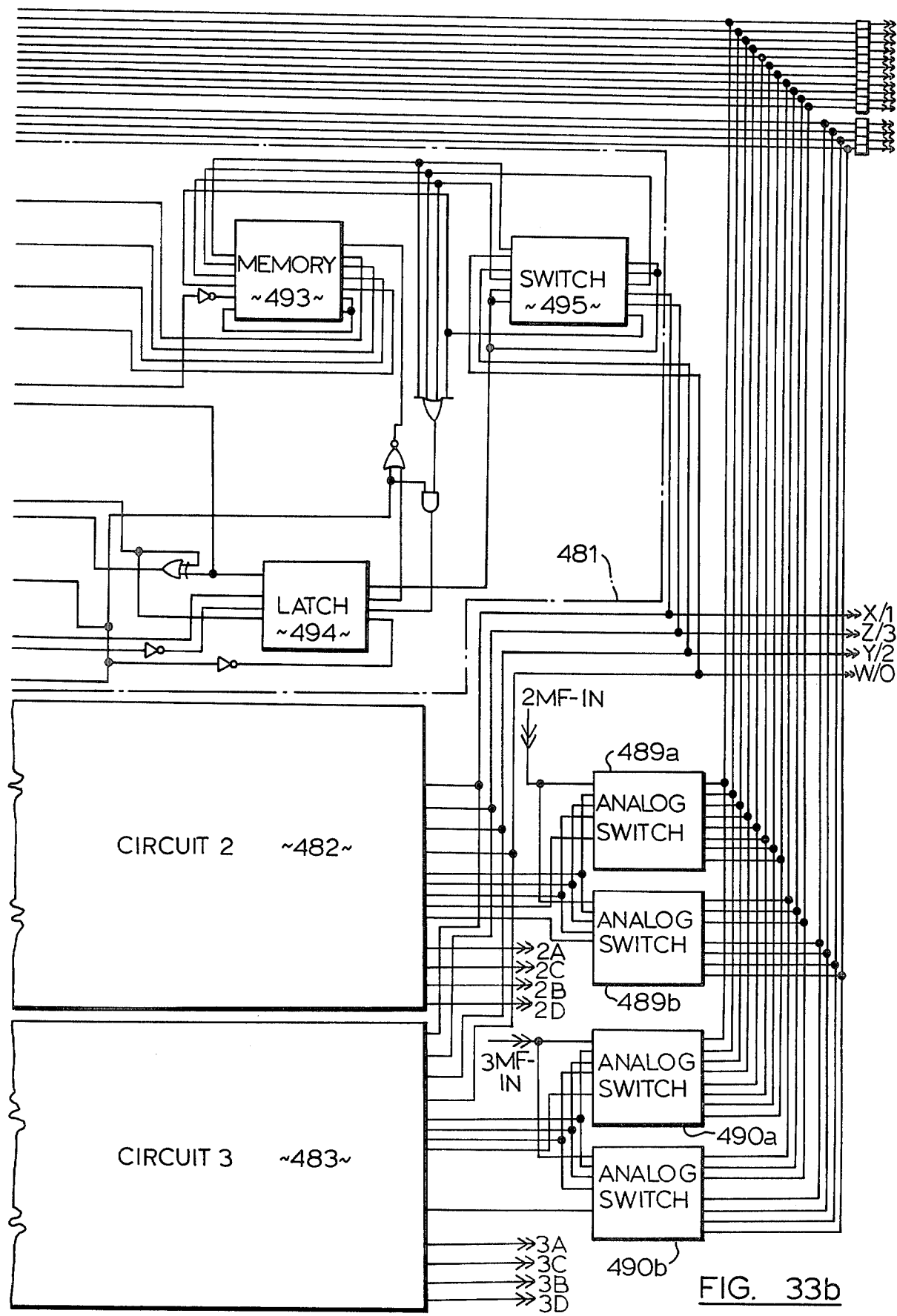

FIGS. 33a and 33b together show a schematic diagram of the D.T.M.F. receiver selector which actually comprises three identical selector circuits, only one of these being shown in detail.

The three selector circuits, identified by the numerals 481, 482 and 483, are associated respectively with the three tone receivers 461, 462 and 463, from which they receive the high and low tone signals 1H1, 1L2, etc. The circuits are selected in accordance with two tone receiver selecting bits EW3/6 and EW3/7, which are decoded by gates 484. These gates are enabled by a signal MF.S from the equipment data multiplexer, which signal goes high when D.T.M.F. tone is required and is connected to the gates 484 after being gated by a gate 485 at a time determined by the arrival of the "data enable" pulse DE from the timing generator, producing a clock pulse for latches 486 to store the data (i.e. the seven bits). The seven address bits ENB0 . . . ENB6 from the central processor are stored in the latches 486 of the selector circuits; thus, when the circuit 481 is selected by the tone receiver selecting bits EW3/6, EW3/7, the store 486 yields four bits of information 1A, 1B, 1C, and 1D, which identify the relevant one of fourteen trunks 487. Three pairs of analog switches 488a, 488b, 489a, 489b, 489c, 490a, 490b, are connected to the trunks through amplifiers 491. The analog switches are operated in accordance with the contents of the stores 486, and selectively enable the tone signals 1MF-In etc. to the D.T.M.F. receiver (FIG. 32). The high and low tone d.c. level signals 1H1 etc. are decoded by gates 492, the resultant information being stored in a memory 493 and steered in by a steering pulse 1ST from the tone receiver, the information being applied to a latch 494 and a switch 495, from which are derived the four bits X/1, Y/2, Z/3, W/0 which are transmitted to the equipment data multiplexer.

The Tone Supply

Figure 34:
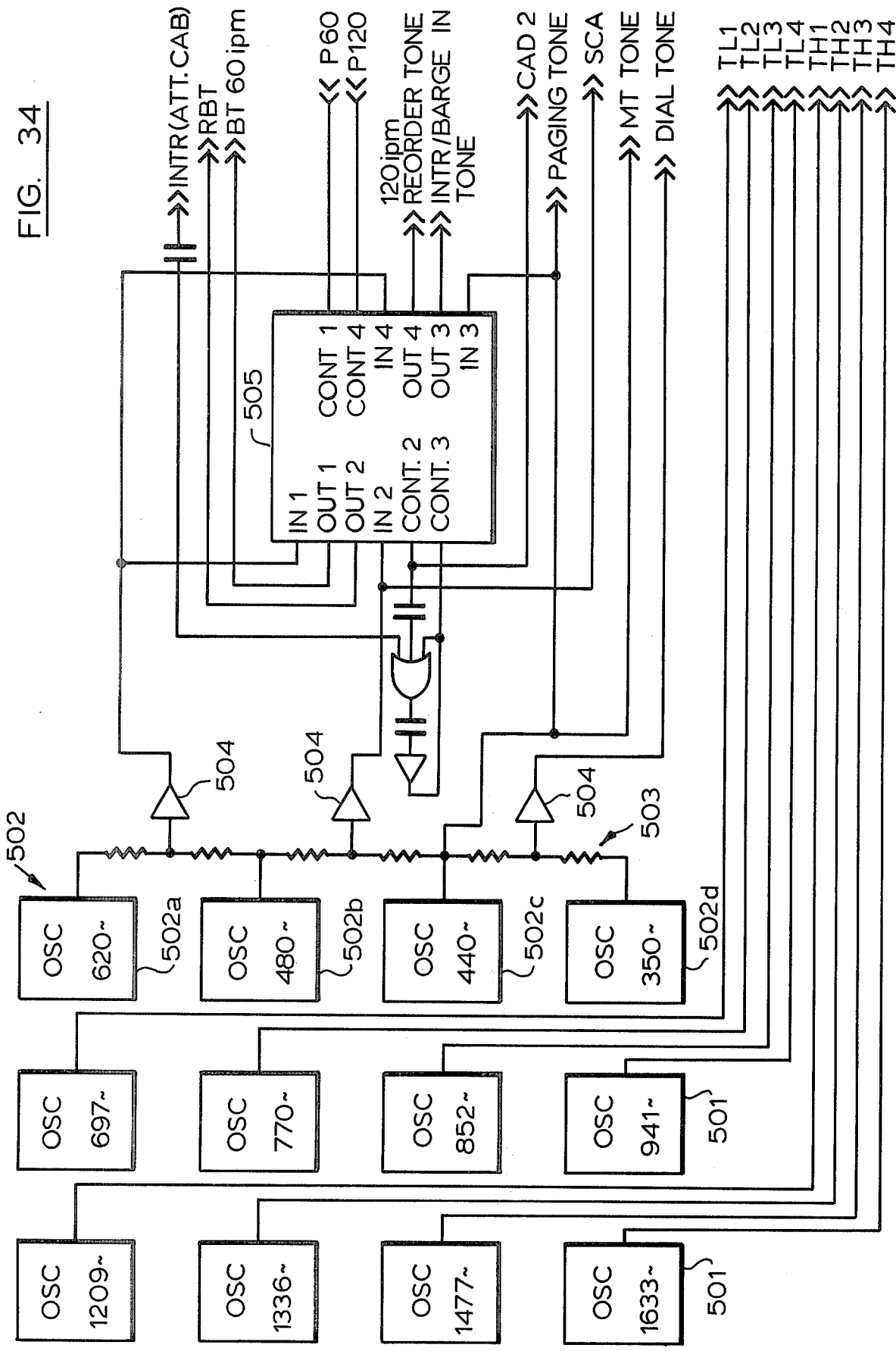
FIG. 34 is a schematic circuit diagram of a system component referred to herein as the "tone supply unit"

Referring to FIG. 34, the tone supply unit includes eight oscillators 501, which generate eight pure tones TL1 . . . TL4 and TH1 . . . TH4, which are combined two at a time in the tone insertion unit (FIG. 34) for producing the conventional D.T.M.F. tones. The unit also includes four oscillators 502, which generate four additional pure tones, these being applied to a resistance network 503 and combined two at a time by mixer amplifiers 504 to produce supervisory tones. The unit also includes a CMOS switch 505, having four inputs, four controls and four outputs.

The outputs of oscillators 502a and 502b are combined and applied to the first input of the switch 505, the output being controlled by the cadence signal P60 from the timing generator, as a modulated busy tone signal BT. The mixed output of oscillators 502a and 502b is also applied to the fourth input of the switch 505, and modulated in accordance with the cadence signal P120 from the timing generator, the output being the REORDER TONE. The outputs of socillators 502b and 502c are mixed and applied to the second input of the switch 505, these being controlled by the input signal CAD2 resulting in the output of ring back tone signal RBT. The output of oscillator 502c provides the miscellaneous tone MT, and the PAGING TONE, and is also applied to the third input of the switch 505. In accordance with an "intrude" signal INTR (ATT.CAB) from the central processor initiated by an attendant's operation, the third output is subject to an overriding control resulting in the signal INTR/BARGE IN TONE, this signal being used to permit intrusion by the attendant on most connected lines.

The Tone Insertion Unit

The tone insertion unit may be considered primarily as a specialized crosspoint matrix and a 6-bit memory, which select the required tone or pair of tones to be delivered to a predetermined link. The low power levels involved allow the use of complementary metal oxide semiconductor crosspoints which are easier to control and less expensive than the SCR's used in the main crosspoint matrix. It should be noted that all the tones, including D.T.M.F. signals are available as continuous supplies and, when keying takes place it is the special crosspoints of the tone insertion unit which respond to keying to give the impression of direct key control.

Figure 35A:
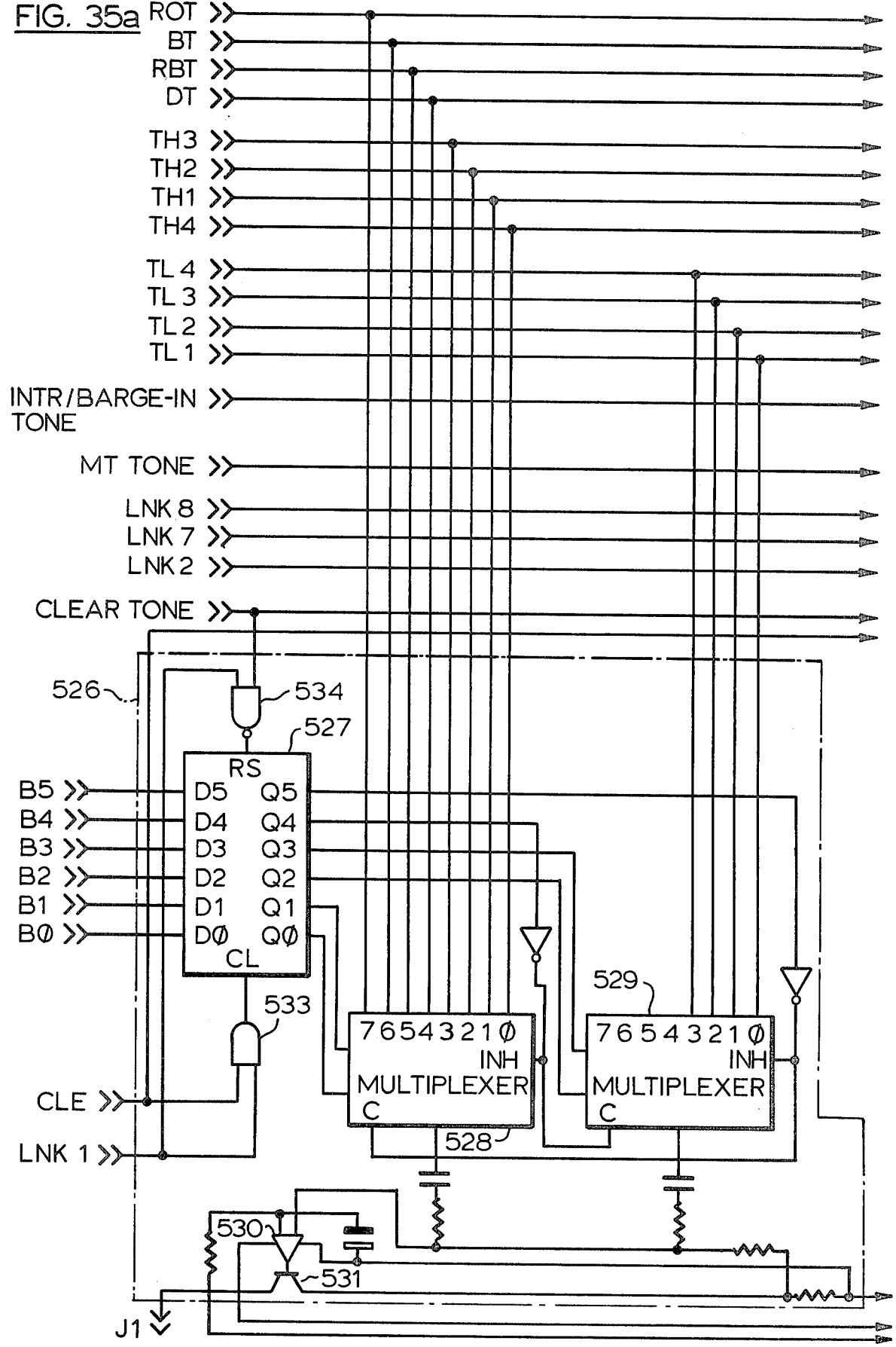
FIGS. 35a and 35b together form a schematic circuit diagram of a system component referred to herein as the "tone insertion unit"
Figure 35B:
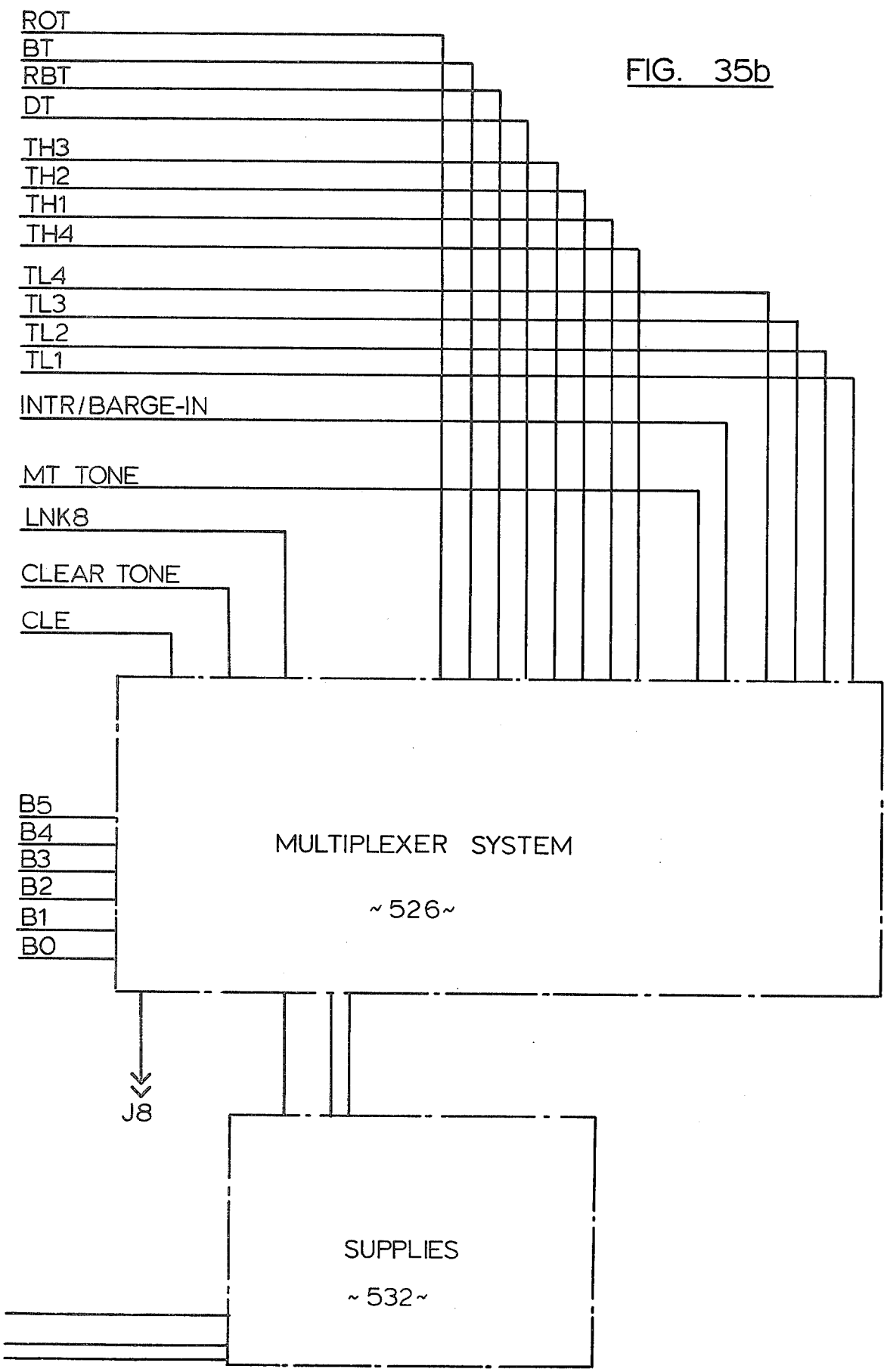

The tone insertion unit which serves the system is made up of four boards, each board containing eight identical multiplex systems which receive address information and control data. FIGS. 35a and 35b illustrate the connections to the first and eighth multiplex systems of one of the boards, the connections to the intermediate corresponding systems being similarly arranged. Each of the multiplex systems 526 comprises essentially a latch 527, a pair of multiplexers 528, 529, and an output circuit comprising an amplifier 530 and transistor 531. A voltage regulator unit 532 is provided to establish a reference voltage level for noise immunity. The latch 527 receives six bits B0 . . . B5, which are in fact the bits EW2/0 . . . EW2/5 from the equipment data multiplexer. This data is clocked into the latch by signals CLE from the control circuit shown in FIG. 35c (which will presently be described) and the relevant "link select" signal LNK1 from the crosspoint preselector, which signals are gated by the gate 533. The latch 527 is reset by the CLEAR TONE signal also derived from the circuit shown in FIG. 32c which is gated with the "link select" LNK1 by a gate 534. It will be appreciated that the other seven systems on the board are similarly controlled using the "link select" signals LNK2, LNK3 . . . LNK8. The output of the latch 527 is used to control the multiplexers 528, 529 selectively, which multiplexers receive the following bits of data. The multiplexer 528 receives the bit ROT (reorder tone) from the tone supply unit, and bits RBT, BT, DT, as well as the four "high tone" signals TH1 . . . TH4, also from the tone supply unit. The multiplexer 529 receives the four "low tone" bits TL 1 . . . TL4 from the tone supply unit, the INTR/BARGE-IN tone and the MT tone from the tone supply unit. These tones are multiplexed, resulting in the coded tone signals J1 . . . J8 from the output circuits 530, 531 which are delivered to the link power supplies.

The control circuit shown in FIG. 35c is common to the four tone insertion unit boards. The purpose of this circuit is to control the tones inserted by the tone insertion unit, the logic being arranged to detect codes which are not valid. The "clear link" pulse CLL from the crosspoint preselector is gated with the input information B0 . . . B5 in the manner shown in the figure, so as to produce a "clock enable" CLE if the information is valid, which is used to clock the information into the latches of the various multiplexer systems. If the information is not valid, the pulse CLE is not produced. The gated output CLT is simply a "clear tone" signal used to reset the latches 527 as previously described.

The "Dial 9" Central Office Trunk

Figure 36:
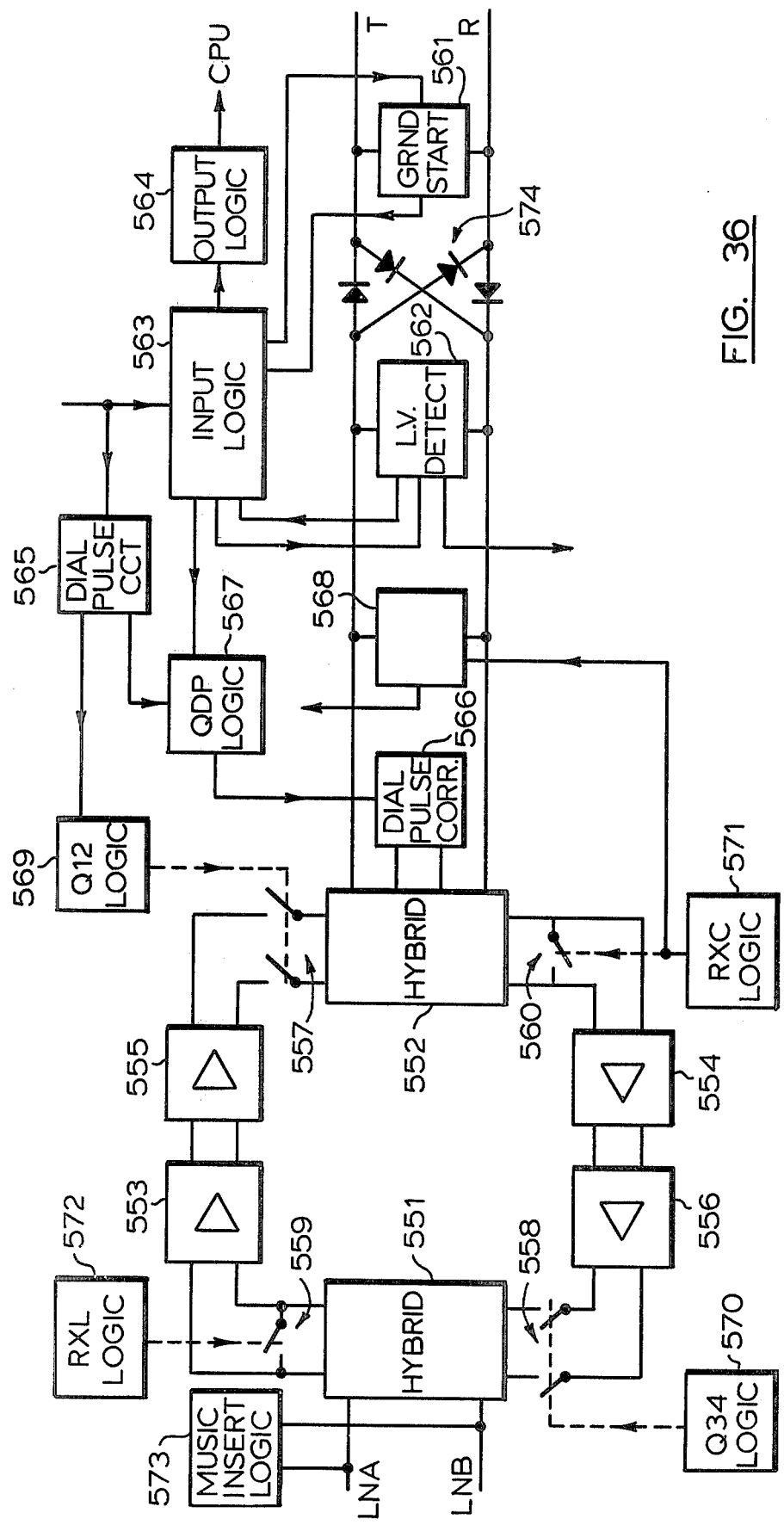
FIG. 36 is a simplified block diagram of a central office trunk interface and control logic therefor.

FIG. 36 is a simplified block diagram of the "dial 9" central office trunk interface and associated control circuitry. The interface is connected to the central office by a two-wire cable T, R, and to the crosspoint matrix by a two-conductor path LNA, LNB. Two resistance hybrids 551, 552 at the ends of the interface are used to convert the two-wire speech path to a four-wire speech path, and vice versa; amplifiers denoted as the RXL amplifier 553, the RXC amplifier 554, the Q12 amplifier 555 and the Q34 amplifier 556 provide amplification of the speech signals to offset load and hybrid losses. The hybrids also provide matching impedances at the ends of the interface, and are associated with solid state switches 557, 558, 559 and 560, (shown schematically in FIG. 36) which are used for signalling and control purposes.

The logic circuits associated with the trunk include a ground start and tip detector circuit 561, a loop impedance detector circuit 562, an input logic circuit 563, an output logic circuit 564, a dial pulse circuit 565, a dial pulse correction circuit 566, a "QDP logic" circuit 567, a longitudinal sense and limit circuit 568, a "Q12 logic" circuit 569, a "Q34 logic" circuit 570, an "RXC logic" circuit 571, and "RXL logic" circuit 572, and a "music insert" circuit 573. These circuits will be described in more detail subsequently, but first the operation of the trunk interface will be described in general terms.

In the idle condition of the trunk, switches 557 and 558 are open and the shorting switches 559 and 560 are closed. At the central office, a potential of −48 volts is applied on the ring lead R and the tip lead T is open. On receipt of an instruction from the central processor to set up an outgoing call, the input logic 563 activates the ground start and tip detector circuit 561, which applies a ground on the ring lead R and connects the tip lead T to a potential of −48 volts. The central office detects the current on the ring leand and responds by connecting the tip lead to ground. The tip detector circuit detects the resulting current on the tip lead and sets an "incoming seize" latch in the circuit 563. The setting of this latch causes the following operations: switch 557 is closed and the ground start and tip detector circuit 561 is deactivated; the central office relays continue to be held by the Q12 amplifier 555; the switch 558 is also closed and the switch 560 is opened, allowing the dial tone from the central office to be heard by the calling party. The RXC logic 571 activates the longitudinal sense and limit circuit 568; the "incoming seize" latch also activates the dial pulse circuit 565 and, the loop impedance detector 562, and finally informs the central processor of the response from the central office.

On receipt of this information, the central processor sends the dial pulse information received from the calling party, to the trunk, in the form of a 4-bit code, which code is stored in the dial pulse circuit 565, the latter sending out a suitable number of makes and breaks by opening and closing the switch 557. The dial pulse circuit 565 also controls the dial pulse correction circuit 566 through the $\overline{QDP}$ logic 567. Afer all the digits have been sent to the central office, the switch 559 is opened, enabling two-way conversation when the called party answers.

Reversals of polarity on the tip and ring leads, which may be caused by the central office when the called party answers, are ignored by the trunk due to the diode bridge 574. During a call the loop impedance detector 562 supervises the call progress, and when the call ends by the called party going on-hook first, the resulting open loop condition on the central office side is sensed by the loop impedance detector and signalled to the central processor. The latter releases the call by sending an outgoing release pulse, which resets the trunk to the idle condition. If the call ends by the calling party going on-hook first, the central processor sends an "outgoing release" pulse to the trunk; this causes the switch 557 to open and an open loop condition is signalled to the central processor. The trunk is held "busy" for outgoing calls until the central office releases. The central office release is detected by the loop impedance detector, which resets the trunk to the idle condition.

To set up an incoming call, the central office applies a ground on the tip lead T, the ring lead R being at −48 volts potential. Closure of the loop at the central office is sensed by the loop impedance detector, which immediately busies the trunk for outgoing calls by appropriately informing the central processor. After about one second delay, to ensure that the loop closure was not due to a transient fault at the central office, the loop impedance detector sends a signal to the input logic 563, which labels the call as an incoming call and sets the "incoming seize" latch. The ringing current, which is also sent by the central office is not used by the trunk.

The "incoming seize" latch being set, the information is sent to the central processor, which sends an outgoing seize signal and connects the trunk to the attendant's console. Since both outgoing and incoming seize signals are present, the switch 557 is closed and the resulting loop current trips the central office ringing, the switch 558 is closed, and the switches 559 and 560 are opened. The central office senses the loop current and connects the trunk at its end to the calling party, permitting the call to proceed.

The call is supervised by the loop impedance detector circuit and, at the end of call, release of the trunk and the central office circuits proceed exactly as in the case of an outgoing call. When the trunk is placed on "Hold" during a conversation, music is inserted on the trunk on instruction from the central processor.

Figure 37A:
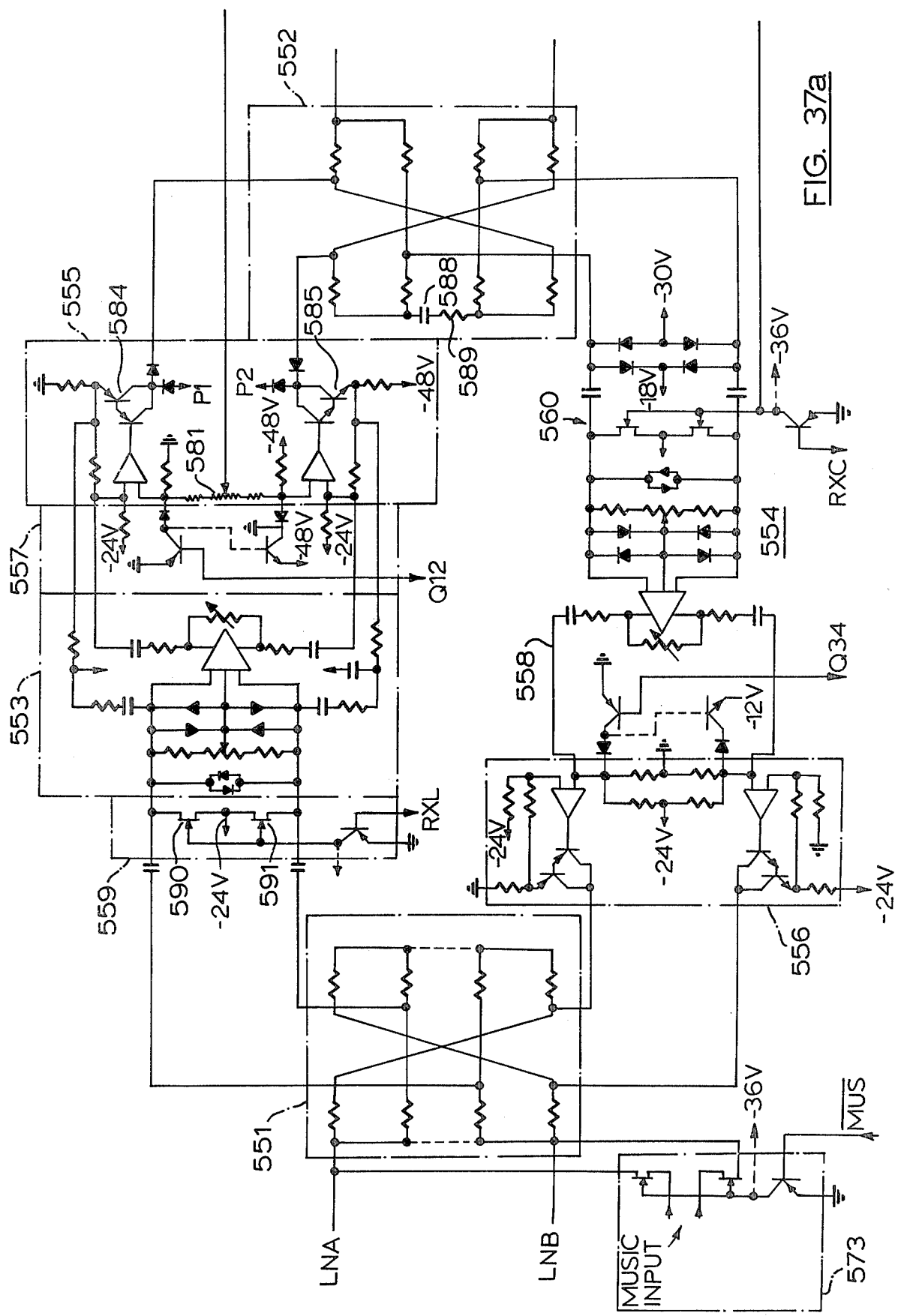
FIGS. 37a and 37b together form a schematic circuit diagram of the speech path of the central office trunk and part of the control logic therefor.
Figure 37B:
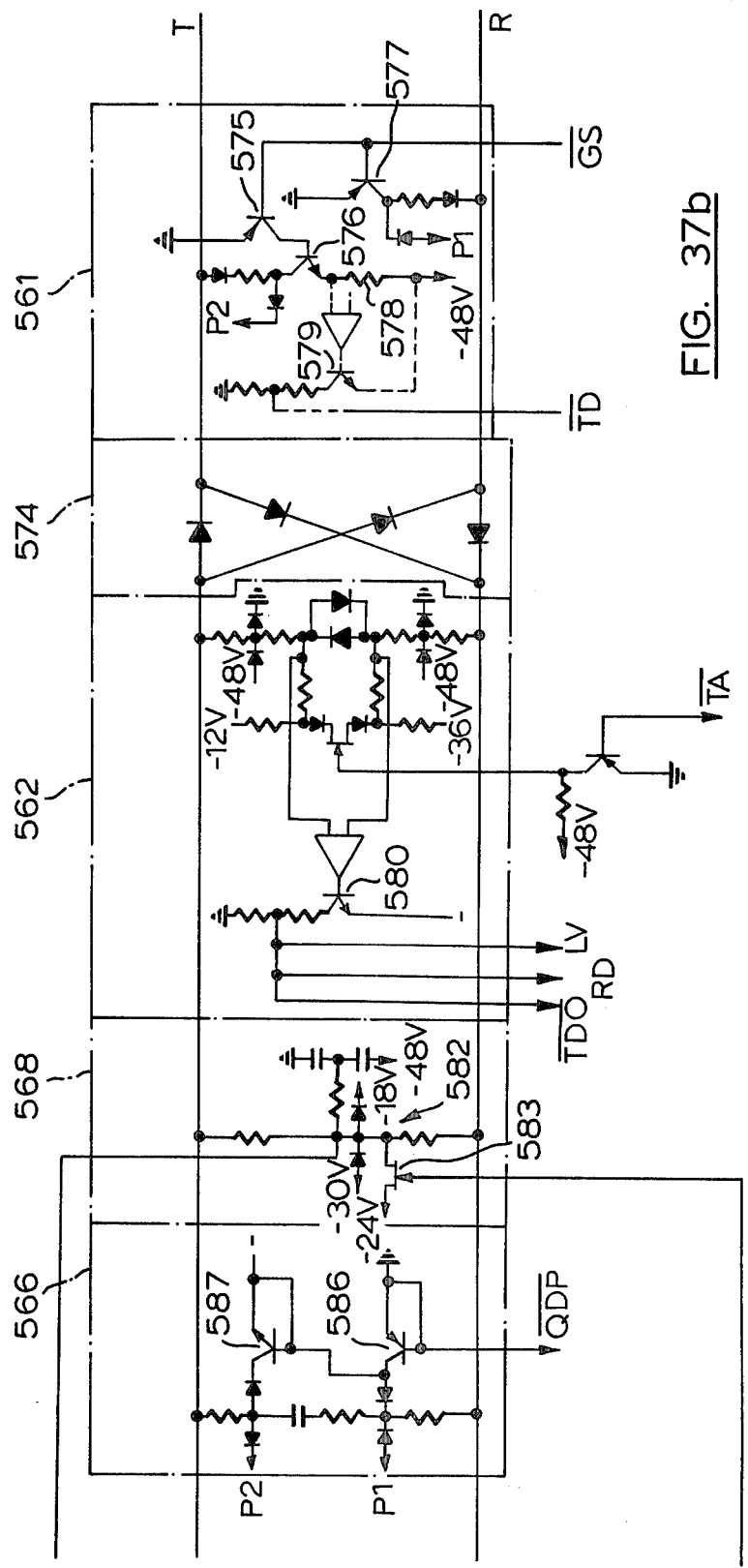

The central office trunk system will now be described in greater detail with reference to FIGS. 37a and 37b, which together show details of the speech path and certain switching circuits, and FIGS. 38a to 38h, which show details of certain associated logic circuits. Thus, FIGS. 37a and 37b show particularly the resistance hybrids 551, 552, the RXL amplifier 553, the RXC amplifier 554, the Q12 amplifier 555, the Q34 amplifier 556, the switches 557, 558, 559 and 560, the ground start circuit 561, the loop impedance detector 562, the dial pulse correction circuit 566, the longitudinal sense and limit circuit 568, and the "music insert" logic 573. The remaining figures show respectively the input logic (FIGS. 38a and 38b), the control logic (FIG. 38c) the output logic (FIG. 38d), the dial pulse circuit (FIG. 38e), the RXC logic (FIG. 38f), the RXL logic (FIG. 38g), and a "music insert" control element (FIG. 38h).

Referring to FIGS. 37a and 37b, to apply a ground start the signal $\overline{GS}$ derived from the input logic 563 applied to the base of transistors 575 and 577 of the ground start circuit 561 is taken low; this switches on transistors 575, 576, 577, and the last applies a ground on the ring lead R and transistor 576 applies −48 volts on the tip lead T. When the central office applies a ground on the tip lead in response to the ground on the ring lead, the resulting current on the tip lead is sensed across a resistor 578. This voltage turns on transistor 579 and the signal $\overline{TD}$ goes low. $\overline{TD}$ goes to the input logic.

The loop impedance detector 562 detects closure of the loop at the central office for incoming calls and detects opening of the loop at the end of the call, for both incoming and outgoing calls. In the idle condition of the trunk, with the tip open and battery on ring at the central office, there is no current in the tip and ring leads T, R. Accordingly, transistor 580 is on and signals LV, $\overline{TDO}$ and RD are all low. When the central office applies a ground on the tip lead, a voltage difference of approximately 40 volts is detected and transistor 580 is switched off, causing signals LV and $\overline{TDO}$ to go high with no time delay; the signal RD also goes high after approximately 1 second. It should be mentioned at this point that signals LV and RD go to the input logic 563, while signal $\overline{TDO}$ goes to the RXC logic 571.

At the end of the call, when the central office opens the tip lead, the loop impedance detector senses the zero or near zero voltage difference between the tip and ring leads and switches on transistor 580, causing signals RD and $\overline{TDO}$ to go low with little or no time delay and causing the signal LV to go low after a 100 ms time delay.

As a result of earth potential differences between the system and the central office, due to pick up from power lines and other causes, common mode or longitudinal voltages may be present on the tip and ring leads T, R. The trunk is required to provide a low impedance path for such voltages. This is achieved by sensing the longitudinal voltage on the tip and ring leads and feeding back to the amplifier 555 to reduce the longitudinal impedance; this amplifier circuit includes an adjustable resistor 581 for obtaining the best longitudinal balance. A diode network 582 limits the amount of feed back voltage and a FET switch 583 is used to apply or cut off the feedback. During a call the switch 583 is off and the feedback is applied.

To transmit dial pulses to the central office on outgoing calls, transistors 584 and 585 of the Q12 amplifier are switched off (break) and switched on (make) by the switch 557. When these transistors are off, transistors 586 and 587 are switched on; when transistors 584 and 585 are on, the transistors 586 and 587 are switched off. In this way the hybrid balance capacitor 588 and the line capacitance are charged and discharged fast, improving the dial pulse waveform.

The resistance hybrid 552 used to convert the two-way speech signals on the tip and ring leads to two one-way signals. A resistor 589 and the capacitor 588 form the balance network of the hybrid. Speech signals from the local to the central office are impressed on the hybrid by the Q12 amplifier 555, and speech signals from the central office to the local are separated by the hybrid and applied to the RXC amplifier 554. The hybrid ofers high attenuation for the signals from the Q12 amplifier reaching the RXC amplifier input.

This Q12 amplifier 555 is used both to apply a d.c. potential on the tip and ring leads to hold the central office circuits, and to transmit speech signals to the central office. The amplifier can be turned on or off by the switch 557. In the off condition, the amplifier 555 presents a high impedance.

The switch 557 keeps the Q12 amplifier off during idle condition of the trunk and switches off and on the Q12 amplifier during dial pulsing. When the bit Q12 is high, the transistors of this switch circuit are off, the diodes being reverse biased, and the Q12 amplifier 555 being on. When the Q12 bit is low, the switching transistors are on, the diodes being forward-biased, and the Q12 amplifier 555 is held off.

The RXL amplifier 553 receives the differential and common mode voltages from the local end hybrid 551, rejects the common mode signals and amplifies the differential signals. The output of this amplifier is connected to the Q12 amplifier 555. Adjustable resistors are including for gain control and for obtaining the best common mode rejection. The input of this amplifier 553 can be short-circuited by the switch 559, which comprises FET's 590 and 591, to reduce the gain to a very low value, during idle condition of the trunk and during pulsing.

The function of the resistance hybrid 551 is the same as that of the hybrid 552. This hybrid transmits speech signals from the crosspoint end of the interface to the RXL amplifier 553, while maintaining a good rejection for signals from the Q34 amplifier 556.

The music insert logic 573 is a switch which is opened or closed in accordance with instructions received from the central processor. When this switch is closed, music is connected to the line pair LNA, LNB, and thence to T and R.

The Q34 amplifier 556 amplifies the signals received from the RXC amplifier 554 and impresses the amplified signals on the local end resistance hybrid 551. The switch 558 allows switching on and off of the amplifier 556.

The functions of the RXC amplifier 554 and the switch 560 are the same as those of the RXL amplifier and its associated switch. The RXC amplifier 554 amplifies the signals received from the central office, the switch 560 enabling shunting of the RXC amplifier input to reduce the gain to a low value. Adjustable resistors are provided to adjust the gain of the amplifier to the appropriate value and to adjust for the best common mode rejection.

Figure 38A:
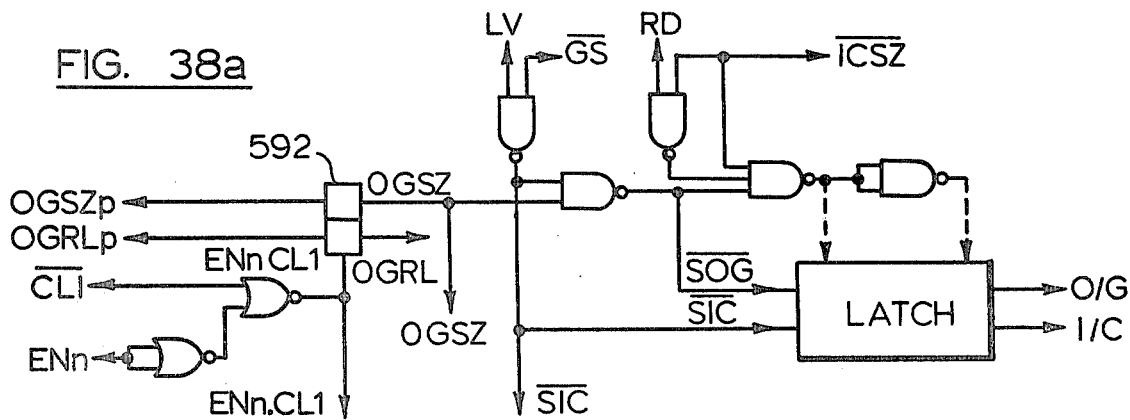
FIGS. 38a–38h illustrate diagrammatically various control circuits of the central office trunk interface.

Referring now to FIG. 38a, the input logic circuit receives the instructions from the central processing unit and also the "loop open" or "loop closed" instruction from the central office through the loop voltage detector 562, and labels the call either as an incoming call or an outgoing call. The call label is maintained for the duration of the call. To seize the trunk for outgoing calls, the central processor sets the signal OGSZ high and signal OGRL low during the relevant trunk time slot of the scanning cycle. This information is latched by latch 592. If signal LV is '0' when signal OGSZ is received, the call is marked as an outgoing call and set up accordingly. If signal LV is received from the loop impedance detector 562 and signal OGSZ is a logic zero, the trunk is made temporarily busy for outgoing calls. When signal RD is received from the loop impedance detector, the call is labelled as an incoming call and is set up accordingly.

Figure 38B:
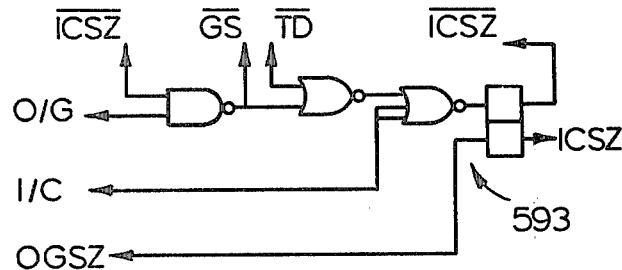

The "incoming seize" latch of the input logic is illustrated in FIG. 38b. This latch 593 is set as soon as the call is labelled as an incoming call (I/C high). For outgoing calls, the latch is set after a ground start has been set and after the central office has returned a ground on tip ($\overline{TD}$ low).

Figure 38C:
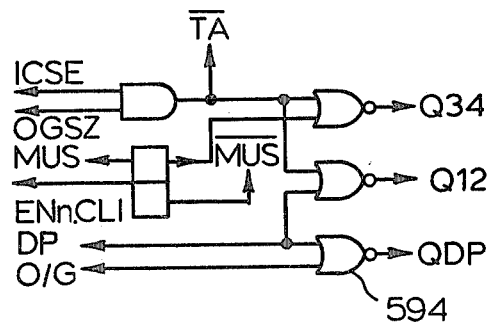

FIG. 38c illustrates the control logic 567, 569, 570. Only when both signals ICSZ and OGSZ have been received is the trunk ready to pulse out (for outgoing calls) or to accept speech (for incoming calls). The loop impedance detector needs to hold on voltages of as low as four volts between tip and ring, once the call is set up. The control logic enables signals Q34 and Q12 only when both signals ICSZ and OGSZ are both high. The $\overline{TA}$ output is used to lower the threshold of the loop impedance detector from the normal 40 volts during idle condition to about the 4 volts required during speech. It may be noted that signal Q34 is switched off by this circuit during music, the gate 594 is enabled only when a call is labelled as an outgoing call, (resulting in signal $\overline{QDP}$), and Q12 is pulsed according to the DP information received from the dial pulsing circuit.

Figure 38D:
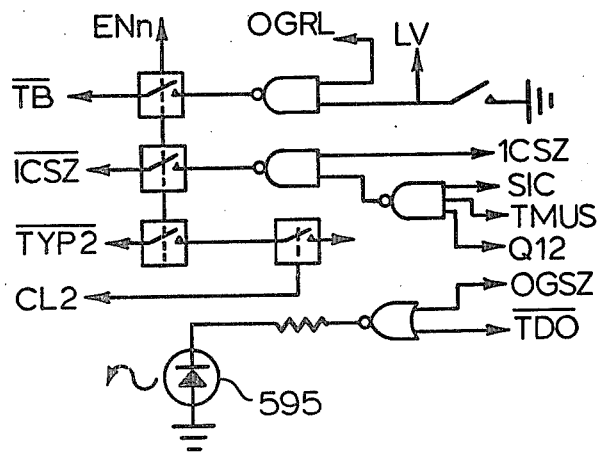

The operation of the output logic circuit 564 will be understood from FIG. 38d. The circuit performs the following functions.

(i) as soon as a signal OGSZ or loop voltage $\overline{TDO}$ is received, this circuit lights up an LED 595 to indicate visually that the trunk is in use.

(ii) The circuit sends a $\overline{TB}$ bit to the central processor to busy the trunk for outgoing calls as soon as the loop impedance becomes sufficiently small.

(iii) The circuit sends an $\overline{ICSZ}$ bit to the central processor to indicate that the central office loop is closed, as soon as the "incoming seize" latch is set. It also removes the $\overline{ICSZ}$ bit to the CPU at the end of the call, when signal LV goes to a logic zero.

(iv) By means of the bit $\overline{TYP2}$, the circuit informs the central processor that the slot is equipped with a "dial 9" central office trunk.

Figure 38E:
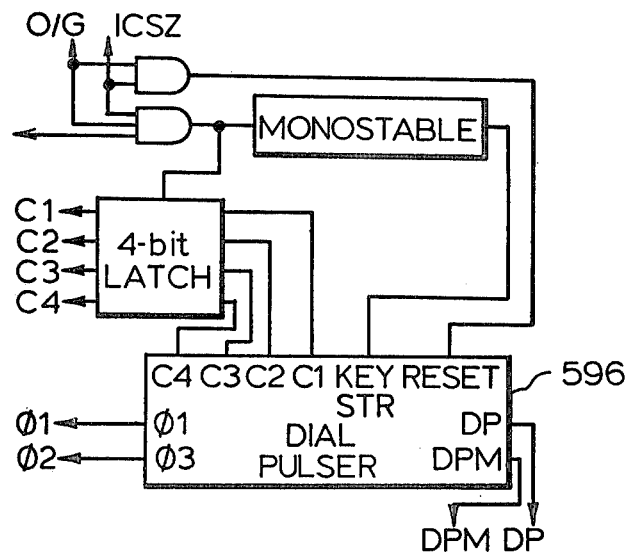

The dial pulsing logic 565, shown in FIG. 38e, receives the dial pulse code (C1, C2, C3, C4 bits) from the central processor and provides the DP and DPM bits to other logic circuits. Signal DP goes high to indicate that a break is required, and as many breaks are sent as are indicated by the dial pulse code received. Signal DPM goes high as soon as digits are loaded into the dial pulse chip 596 and stays high until all digits have been pulsed out. The dial pulsing logic is enabled only for outgoing calls (O/G high) and only after the "incoming seize" latch has been set (ICSZ high).

Figure 38F:
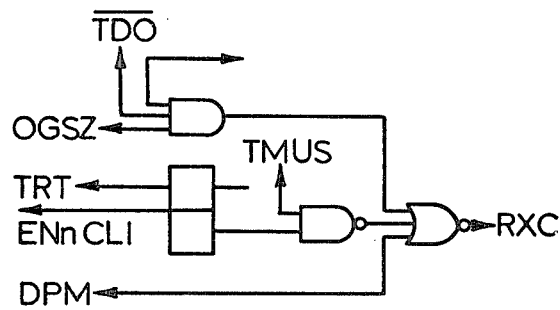

Referring now to FIGS. 38f, the RXC amplifier is switched on as soon as signals OGSZ and ICSZ have both been received (Q34 high), and is switched off as soon as the loop impedance detector notes a central office "loop open" condition ($\overline{TDO}$ low). The amplifier is also switched off during pulsing (DPM high) and when the central office trunk is unterminated on the crosspoint side (TRT high).

Figure 38G:
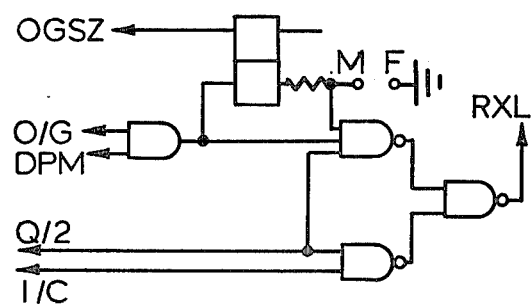
Figure 38H:
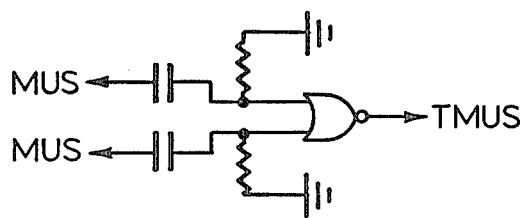

The RXL switching logic is illustrated in FIG. 38g. Since RXL goes high as soon as a call has been labelled as an incoming call (I/C high) and both signals OGSZ and ICSZ have been received (Q12 high). For outgoing calls, however, the signal RXL does not go high until all the digits have been dialled out; this ensures that the dial pulses and the D.T.M.F. tones are not sent simultaneously to the central office. To convert the trunk from a dial pulsing type to a D.T.M.F. type, it is only necessary to take out the dial pulser chip 596 (FIG. 38e), which is socket mounted, and strap two pins M and F (FIG. 38g). With this modification, signal RXL goes high on receipt of both OGSZ and ICSZ, whether the call is incoming or outgoing.

The Off Premise Extension Interface

Figure 39:
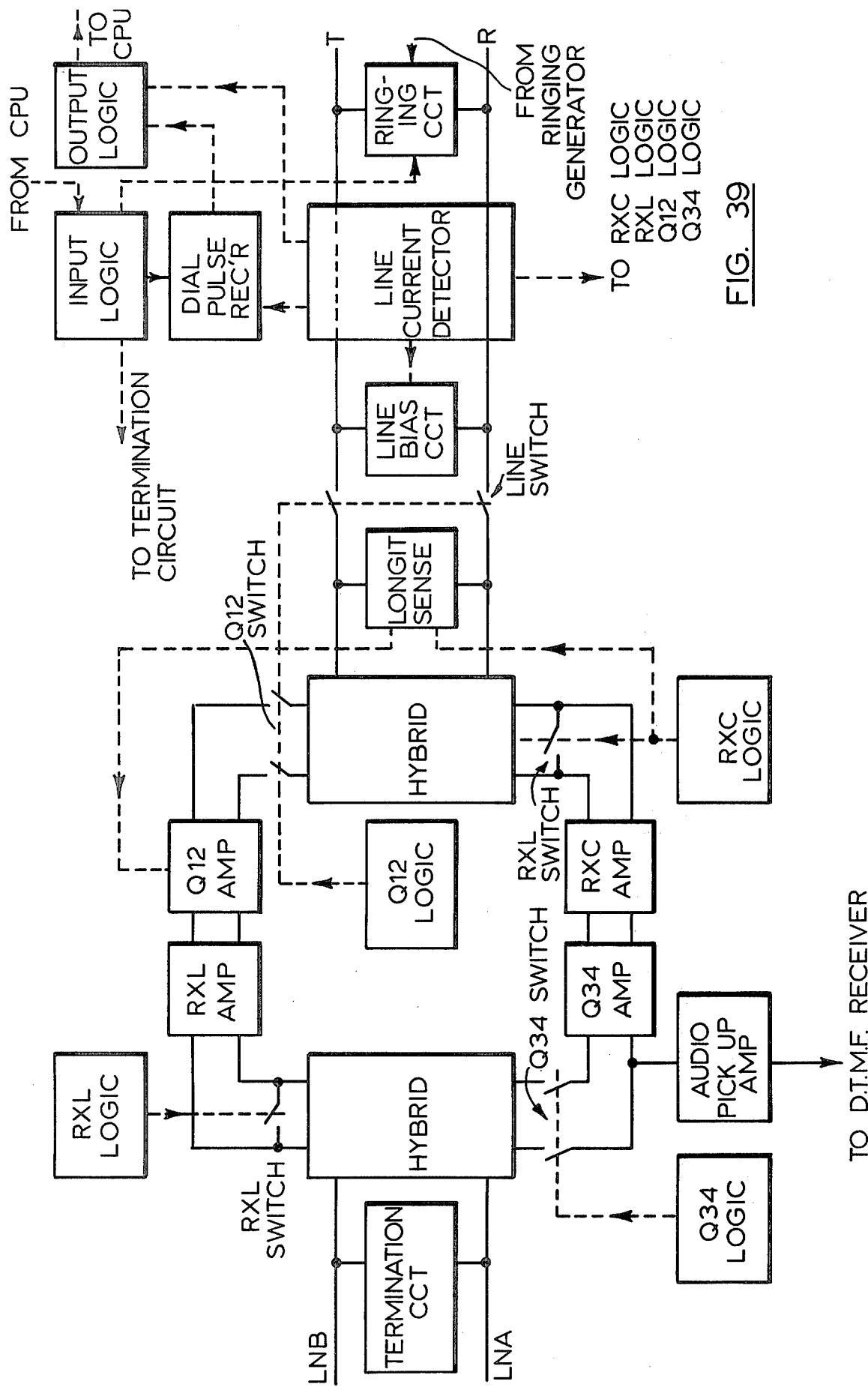
FIG. 39 is a simplified block diagram of an off-premise extension trunk interface and control circuits therefor.
Figure 40A:
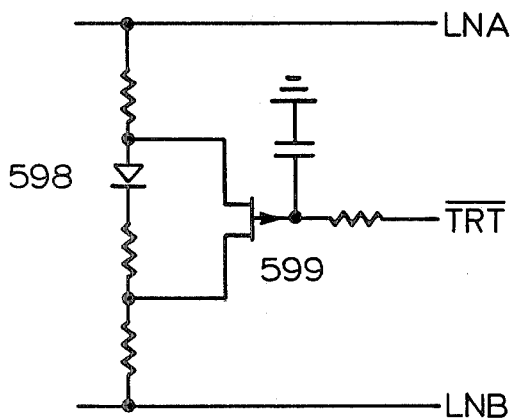
FIGS. 40a and 40b respectively are circuit diagrams of the termination circuit and the audio pick-up amplifier of the off-premise extension trunk shown in FIG. 39.
Figure 40B:
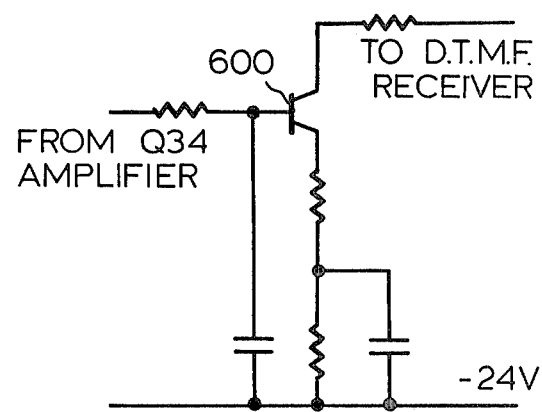

FIG. 39 is a block diagram of the off premise extension interface. The speech path is substantially the same as that of the central office trunk, and will not be described and illustrated in detail. However, two special circuits, namely, the termination circuit shown in FIG. 40a and the audio pickup amplifier shown in FIG. 40b, will be described. The audio pickup amplifier provides D.T.M.F. signalling capability in the off premise extension through a transistor amplifier 600 (FIG. 40b) which is turned on by the Q34 amplifier output to pickup the D.T.M.F. signal and pass it to a D.T.M.F. receiver. In order to allow the D.T.M.F. signals to pass through to the Q34 amplifier, the RXC switch (FIG. 39) must be open at times when the resistance hybrid 597 is not properly terminated. The termination circuit (FIG. 40a) is used to ensure stability by providing the proper termination, this being achieved by either the diode 598 or FET transistor 599 with a series resistance. During conversation, the diode 598 is reverse biased and the transistor 599 is off. The termination circuit then appears to be open. When the crosspoints are opening during call transfers, the diode 598 is forward biased to switch in the termination. When the crosspoints are closed and the link is not terminated during incoming ringing, the central processing unit sets the TRT bit to turn on transistor 599 to give the same result.

Figure 41:
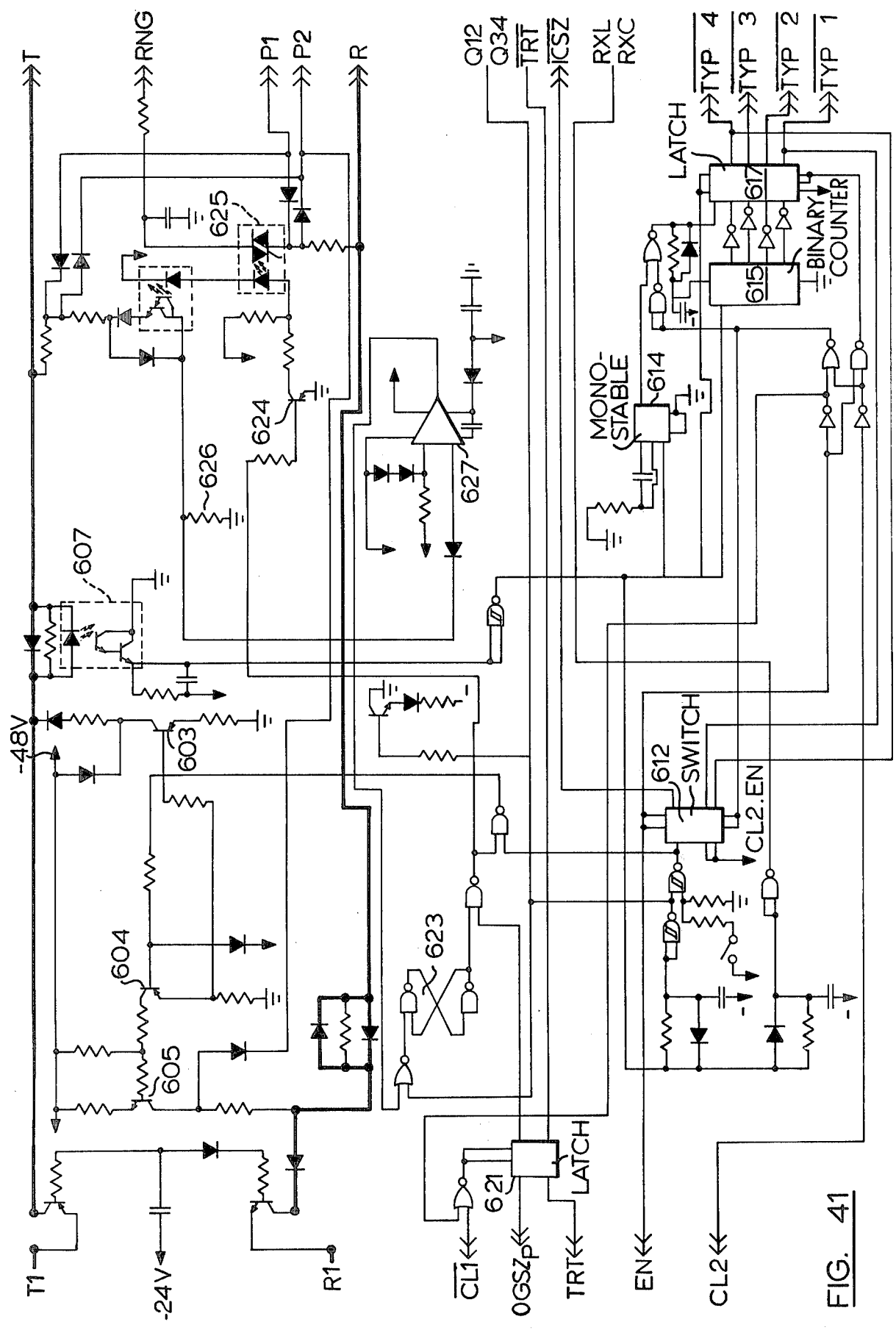
FIG. 41 illustrates the control circuitry of an off-premise extension interface.

In the idle condition, the transistors 603, 604 and 605 in the line biasing circuit (FIG. 41) are ON, providing a ground and a battery on the tip and the ring conductors respectively. For an incoming call, when the off premise extension goes "off hook" current flows in the line. The line current turns on an opto-coupler 607 to produce signals RXL, RXC, Q12 and Q34. These signals control the switching circuits of the trunk interface in exactly the same manner as has been described in relation to the "dial 9" central office trunk. The line switch which is controlled by switch Q12 (FIG. 39) is turned ON. At the same time, the "incoming seize" is set and transistors 603, 604 and 605 are switched OFF, leaving the Q12 amplifier to supply the line current. The signal $\overline{ICSZ}$ and "equipment type" information are sent to the central processor via a switch 612. Upon receiving the signal $\overline{ICSZ}$, the central processor connects dial tone to the line when it is ready to accept digits; either D.T.M.F. signals or dial pulses can now be sent. D.T.M.F. signals are transmitted to a tone receiver by the audio pickup amplifier (FIG. 40b) whereas dial pulses are transmitted to the dial pulse receiver (see FIG. 39) in which the shaped dial pulses are fed into the clock input of a binary counter 615 and the trigger input of a retriggerable monostable multivibrator 614; the output of the latter, when set, inhibits data to clock into a three-state output latch 617. After the pulsing of each digit, the inverted outputs of the binary counter 615 are clocked into the three-state latch 617, waiting to send to the central processor, and then the binary counter 615 is reset for the next digit.

For outgoing calls, a signal $OGSZ_p$ from the central processor is applied to a latch 621, the output of which activates the ringing circuit by turning on a transistor switch 624, and accordingly the opto-couplers 625, thus placing ringing on the line. When the off-premise extension answers, the ringing current is increased by the drop of line impedance, raising the peak voltage across resistor 626. The voltage rise is sensed by a voltage comparator 627, causing its output to go high to set a latch 623 which then trips the ringing by turning off the transistor switch 624 and the opto-couplers 625. Release is controlled solely by the off premise extension, which holds the interface busy as long as it is off hook. Its going "on hook" turns off the opto-couplers 607 and restores the interface to its idle condition.

The DID Trunk

The direct inward dialing trunk interface is essentially similar to the interface of the central office trunk, and is not separately illustrated. It should be mentioned, however, that the interface does include two pairs of line switches, which are essentially high voltage opto-couplers. These switches are selectively operated for the purpose of reversing the polarity of the speech lines according to the polarity required. The interface has a special control circuit, which is illustrated schematically in FIGS. 42a and 42b.

Figure 42A:
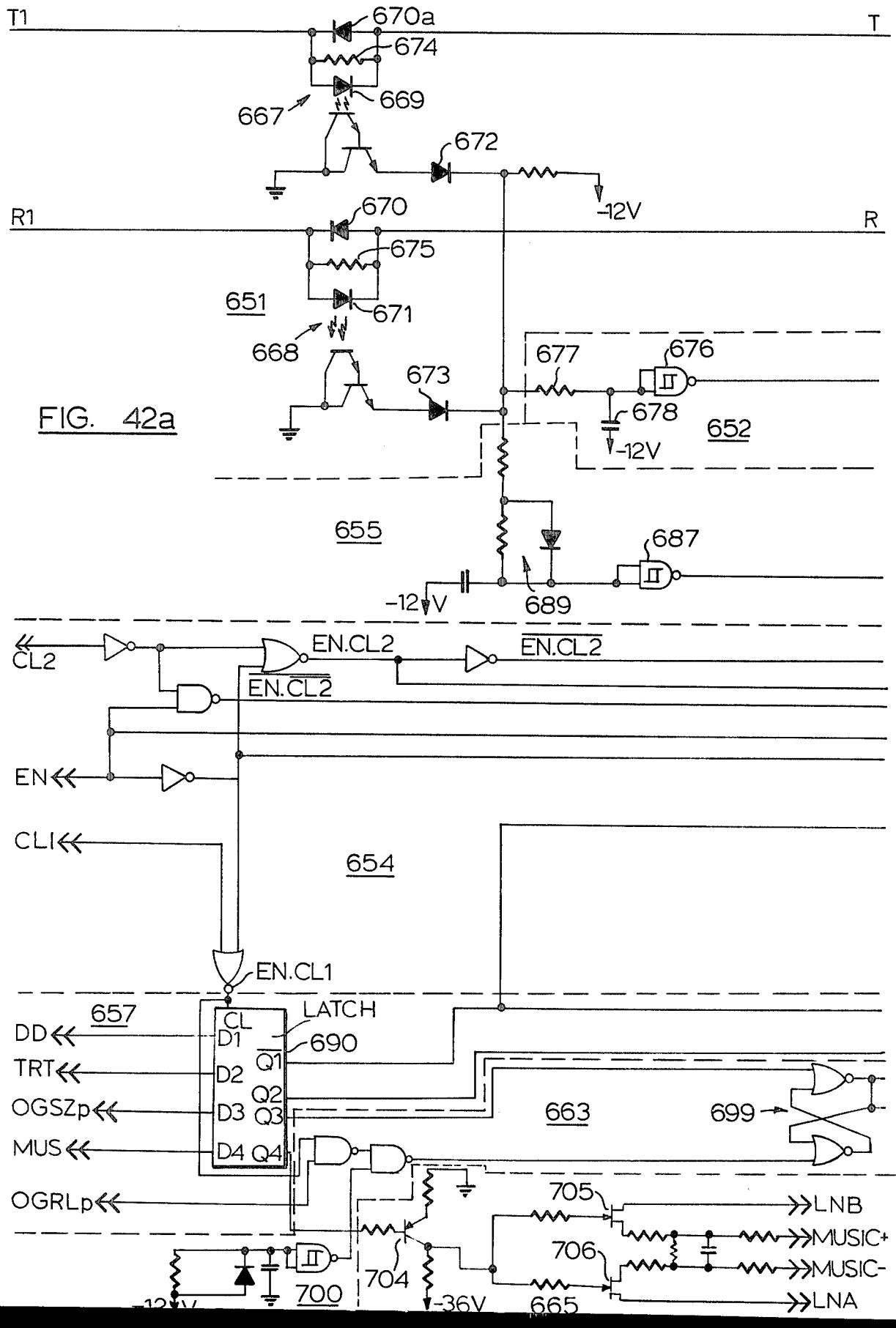
FIGS. 42a and 42b together illustrate the control circuitry of a DID trunk interface.
Figure 42B:
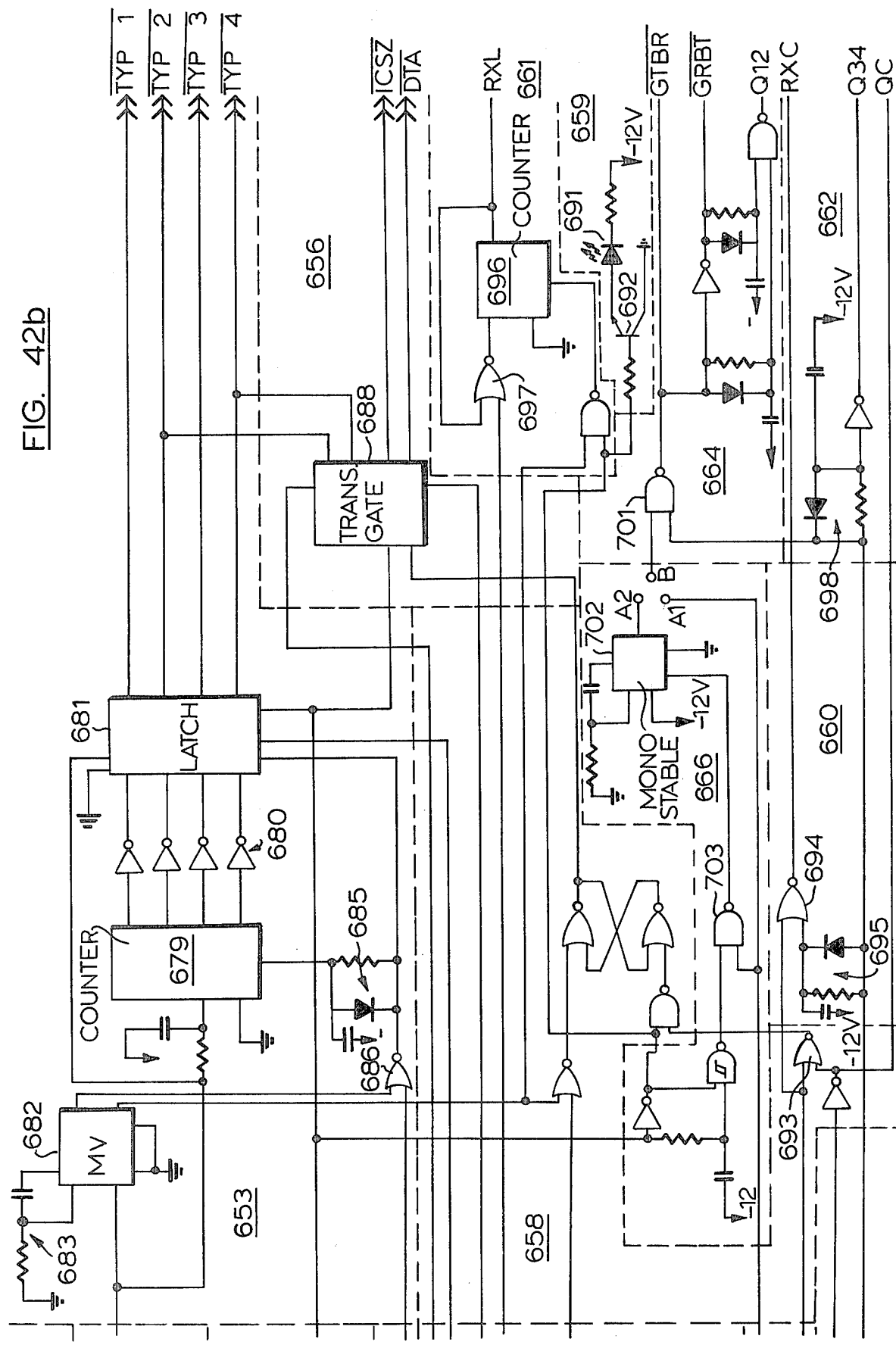

Referring to the figures, the DID trunk control circuit may be considered to comprise sixteen interrelated parts, these being, a line current detection circuit 651; a dial pulse shaping circuit 652; a dial pulse receiver circuit 653; a timing pulse generating circuit 654; an "ICSZ" signal generating circuit 655; an output buffer 656; an input buffer 657; a "directing to attendant" latch 658; a seizure indicator 659; an "RXC" control circuit 660; and "RXL" control circuit 661; a "Q34" control circuit 662; a "talk state" latch 663; a line switch control circuit 664; a music insertion circuit 665; and a wink start circuit 666. Although FIGS. 42a and 42b illustrate the entire control circuit, the sixteen components listed above are shown separated by broken lines to facilitate reading of the diagram.

The line current detection circuit 651 includes a pair of opto-couplers 667, 668 which are responsive to line current. When the trunk is idle, the central office end being open, no current flows through the light-emitting diodes of the opto-couplers, the outputs of which are therefore low. Upon seizure of the line, the central office end presents a low impedance, a current path from T1 to R1 being completed. Current flows through the LED 669 of opto-coupler 667, and through the diode 670 associated with opto-coupler 668. When the call is answered, the voltage across the line is reversed; current then flows from R1 to T1 through the LED 671 of the opto-coupler 668, and the diode 670a associated with the opto-coupler 667. The output of the opto-coupler 667 goes low, therefore, and the output of opto-coupler 668 goes high. These outputs are selected by an OR gate constituted by diodes 672, 673 to produce a high output whenever the loop is closed at the central office end. Each of the resistors 674, 675 connected across the LED's sets a threshold current of 7 ma below which the LED's will not be turned on. Dial pulses are recognized as breaks on the line after seizure, the output of the respective opto-coupler being low during the break; the output is inverted and shaped by a Schmitt trigger 676 to produce a clear positive pulse which is applied to the dial pulse receiver circuit 653. A delay circuit constituted by a resistor 677 and a capacitor 678 provides a time constant of about 10 ms to eliminate false counts due to transient currents.

The shaped dial pulse from the circuit 652 is used as the clock for binary counter 679. The count is retained in binary form and, after inversion by inverters 680, is stored in a four-bit three-state output latch 681. The leading edge of the shaped dial pulse triggers a retriggerable monostable multivibrator 682, the output of which holds the reset of the counter 679 low. This output remains high for a time determined by the time constant of a CR circuit 683, i.e. 150 ms following the leading edge of the last dial pulse. The leading edge of the first EN.CL2 pulse from the circuit 654, after the output of the monostable multivibrator 682 goes low, latches the inverted dial pulse code into the latch 681. The counter 679 is then reset by the same EN.CL2 pulse. The time constant of a CR network 684 ensures tht the reset to the counter is low when the leading edge of any dial pulse arrives at the clock input, and a delay network 685 ensures that the inverted dial pulse code is latched before the counter is reset.

Considering now the timing pulse generating circuit 654, the interface receives timing pulses EN,CL2 and $\overline{CL1}$, from which timing pulses EN.CL1, EN.CL2, $\overline{EN.CL2}$ and $\overline{EN.CL2}$ are generated. The pulse EN.CL1 is used to latch any signal coming from the central processor. The pulse EN.CL2 is used to send out "type" information to define the type of interface presently connected. The pulse $\overline{EN.CL2}$ is gated with the output of the monostable multivibrator 682 by a gate 686 to generate a pulse to latch the inverted dial pulse code into the latch 681 and to reset the counter 679. The pulse $\overline{EN.CL2}$ is used to release the information stored in the latch 681.

The gated output of the opto-couplers 667, 668 is inverted by a Schmitt trigger 687 to derive the signal $\overline{ICSZ}$ which is transmitted from the transmission gate 688 during the EN time slot. The delay network 689 simply provides a guard time of approximately 150 ms against false release due to switching operations at the central office.

The transmission gate 688 connects the output signals from the interface to a common bus, the signals $\overline{ICSZ}$ and $\overline{DTA}$ being sent out during the EN period. The information type signals $\overline{TYP2}$ and $\overline{TYP4}$ are sent out during the period of pulse $\overline{EN.CL2}$.

All incoming signals from the central processor are transmitted into the input buffer through the common bus. The signals DD, TRT, OGSZ$_p$, MUS are latched into the latch 690 of the input buffer by the trailing edge of the generated signal EN.CL1 in each cycle.

The circuit 658 is simply a latching circuit which is set when the signal DD goes high during pulsing, that is to say, when the inverted output of the monostable multivibrator 682 is low. The latching circuit is reset when a high level is present at the output of the talk state latch 663, or at the TRT output of latch 690, or at the output of the $\overline{ICSZ}$ signal generating circuit.

The seizure of the trunk is indicated by the ON state of a light emitting diode 691 of the circuit 659, the ON and OFF states of this LED being controlled by a transistor switch 692. This transistor is turned on when the signal $\overline{ICSZ}$ is low, and holds the LED ON. A high level of signal $\overline{ICSZ}$ turns off the transistor and the LED.

The output of latch 690 is gated with the inverted output of the talk state latch 663 by a NOR gate set formed by gates 693, 694, producing the signal RXC. This signal is high only during the talk state. A network 695 ensures fat turn off and a slow turn on with approximately 10 ms delay for the signal RXC, to ensure that the signal will only be present when signal Q34 is high. The TRT output of latch 690 sets the signal RXC low during transfer of calls.

The signal RXL is the output of a binary counter 696, the reset input of which is high in the idle condition of the trunk. The reset input is pulled low when the trunk has been seized, and the inverted EN pulse is gated with the output of the counter by gate 697, resulting in a delay of 200 ms during the turn on. The counter is reset on receipt of a dial pulse.

The signal Q34 is normally low, being only high in the talk state, and so the signal Q34 is simply the twice inverted output of the talk state latch. The network 698 is provided to ensure a fast turn on and a slow turn off, 10 ms delay.

Since the signal OGSZ$_p$ is sent out only once by the central processor, this must be stored for the whole duration of the talk state. A latch constituted by two NOR gates 699 is used for this purpose, the latch being reset either by signal OGRL$_p$ going high during the pulse interval EN.CL1 or by a "power up" pulse generated by a circuit 700.

As previously mentioned, the speech interface includes two pairs of line switches constituted by high voltage opto-couplers. When ON, one pair puts ground and battery, respctively, on the tip and the ring of the line, and the other pair when ON does the opposite. When a low level signal $\overline{GTBR}$ is applied to one of a pair of driving transistors which control the line switches, the transistor passes 10 ma current through the LED's of the first pair to turn them on, and a high level signal turns off the transistor and therefore the LED's the signal $\overline{GTBR}$ is inverted to produce a signal $\overline{GRBT}$ which turns the second pair of opto-couplers on and off in the same manner through the other driving transistor. For a "delayed dialing" operation the terminals A1 and B of the wink start circuit are strapped together. In the idle condition of the trunk, the inverted output of the talk state latch 663 and the inverted "delay to dial" latch output are both high, the output $\overline{GTBR}$ of NAND gate 701 then being low, placing ground on the tip and battery on the ring. A change of state in either the "delay to dial" latch or the talk state latch 663 switches the signal $\overline{GTBR}$ to a logic high, placing a reverse voltage on the line. For a wink start trunk, the terminals A2 and B are strapped together, instead of the terminals A1 and B. The operation remains unchanged. The signal Q12 is normally high, and goes low for a period of 4.7 ms every time the signal $\overline{GTBR}$ or $\overline{GRBT}$ changes level; this negative pulse actuates the switching circuit of the speech interface.

For wink start, the wink start pulse is generated by a monostable multivibrator 702, which is triggered by the trailing edge of the output of a gate 703. When the trunk is seized, the output from the gate 703 goes low for a period of 150 ms. If no "delay to dial" signal is received, the monostable multivibrator 702 is triggered at the end of the 150 ms period, but is otherwise triggered when the "delay to dial" signal is removed.

The music insertion circuit 665 includes a transistor 704 which is normally off; the collector voltage of −36 volts is presented to the gates of a pair of field effect transistors 705, 706, holding both FET's off. When a music signal is received, i.e. when the signal MUS goes high during the pulse interval EN.CL1 the transistor 704. is turned on, and so turns on the FET's 705, 706 causing the transmission of MUSIC+ and MUSIC− to the line defined by LNA, LNB.

The Tie Trunk

FIG. 43 is a simplified block diagram of the tie trunk interface and associated control circuitry. The interface is connected to the central office by a two-wire cable T, R, and to the crosspoint matrix by a two-wire connection LNA, LNB. Two resistance hybrids 711, 712 at the ends of the interface are used to convert the two-wire speech path to a four-wire speech path, and vice versa; amplifiers denoted as the RXL amplifier 713 and the RXC amplifier 714, the Q12 amplifier 715 and the Q34 amplifier 716 provide amplification of the speech signals to offset load and hybrid losses. The hybrids also provide matching impedances at the ends of the interface, and are associated with solid state switches 717, 718, 719 and 720, (shown schematically in FIG. 43) which are used for signalling and control purposes. The switch 719 differs from the switch 559 in FIG. 37a in that it is a polarity reversing switch controlled by a "polarity logic" circuit 721.

Other logic circuits associated with the trunk include a line current and polarity detector circuit 722, an input logic circuit 723; an output logic circuit 724; a dial pulse logic circuit 725; a QC logic and control circuit 726; a longitudinal sensing circuit 727; a "Q12 logic" circuit 728; a "Q34 logic" circuit 729; an "RXC logic" circuit 730; an "RXL logic" circuit 731; a dial pulse detection circuit 732; and a "music insert" circuit 733. The speech path is terminated at the local end of the interface by a termination circuit 734, which includes a transistor switch and, in accordance with a bit (TRT) sent by the central processor, or in accordance with the associated crosspoints being open, places a 600 ohm termination on the speech path. Each of the unidirectional component two-wire speech paths between the hybrids 711 and 712 includes a 2 dB pad 735 or 736 which is controlled by a logic circuit 737 and used to reduce the interface gain by 2 decibels for the purpose of providing stability on certain tandem connections.

The line current and polarity detector circuit 722 senses line current and the polarity of the current and operates in a manner similar to that of the circuit 651 of the DID trunk. The circuit uses two opto-couplers which respectively respond to the currents on the tip and ring leads.

Figure 44A:
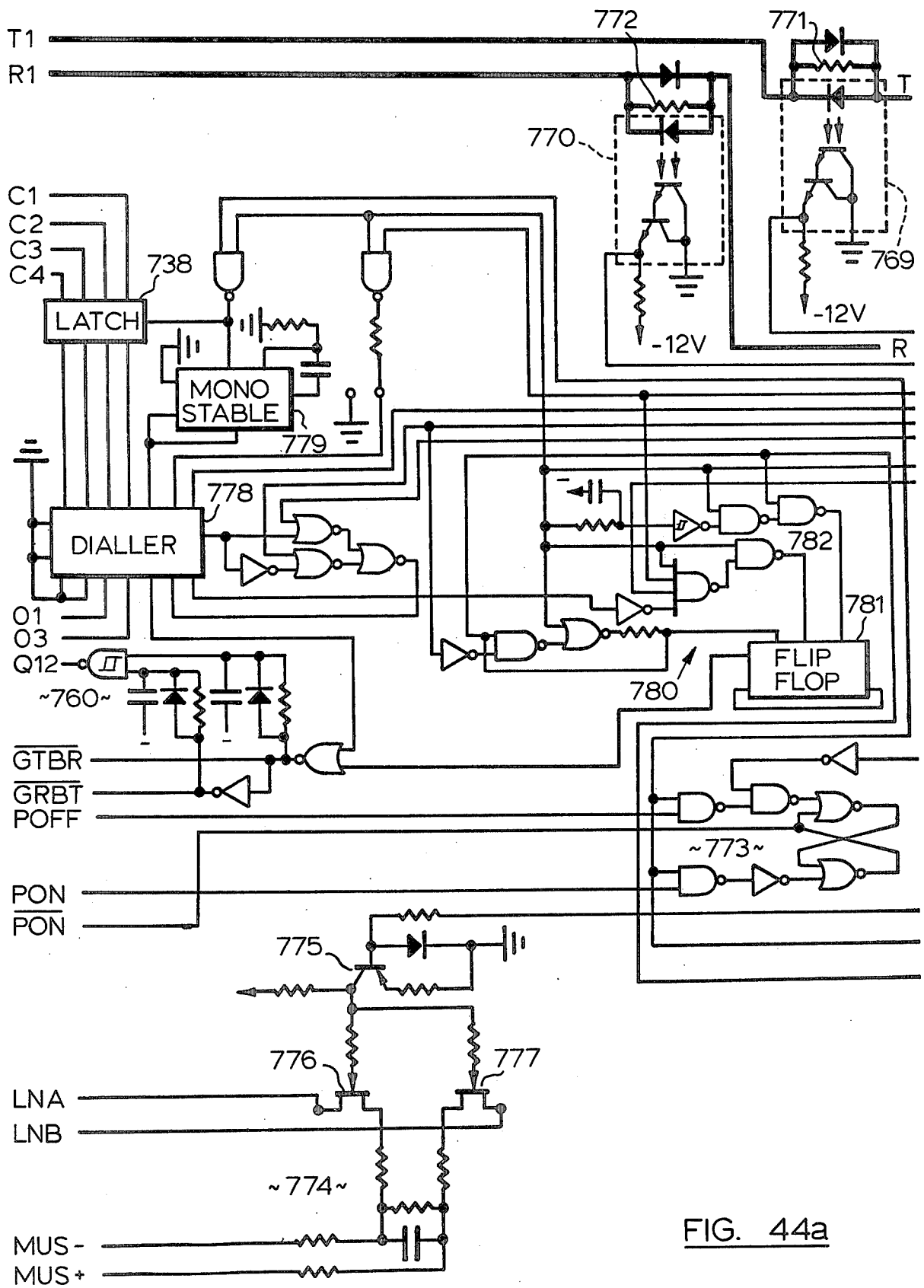
FIGS. 44a, 44b and 44c together illustrate the control circuitry of the tie-trunk interface.
Figure 44B:
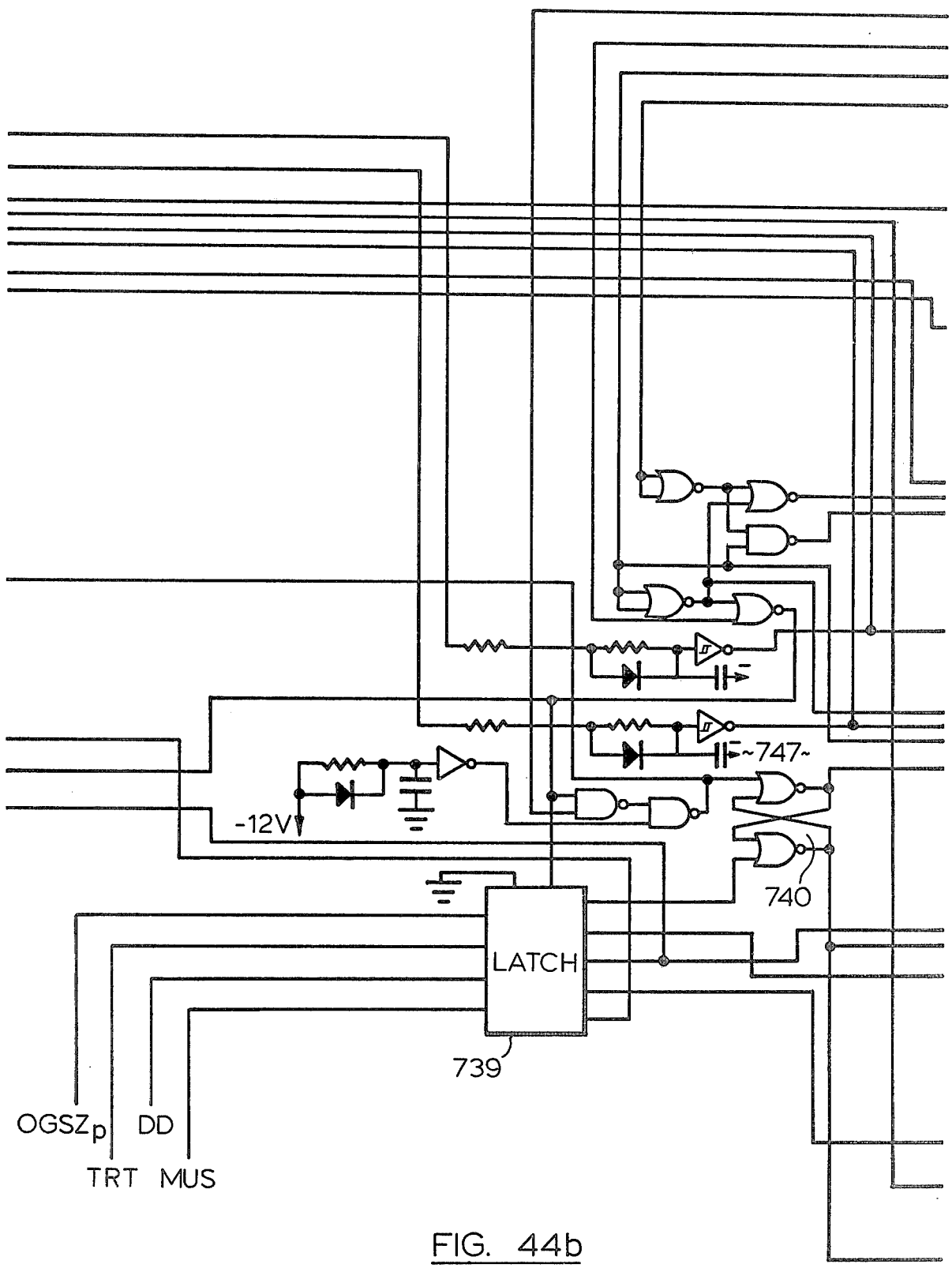
Figure 44C:
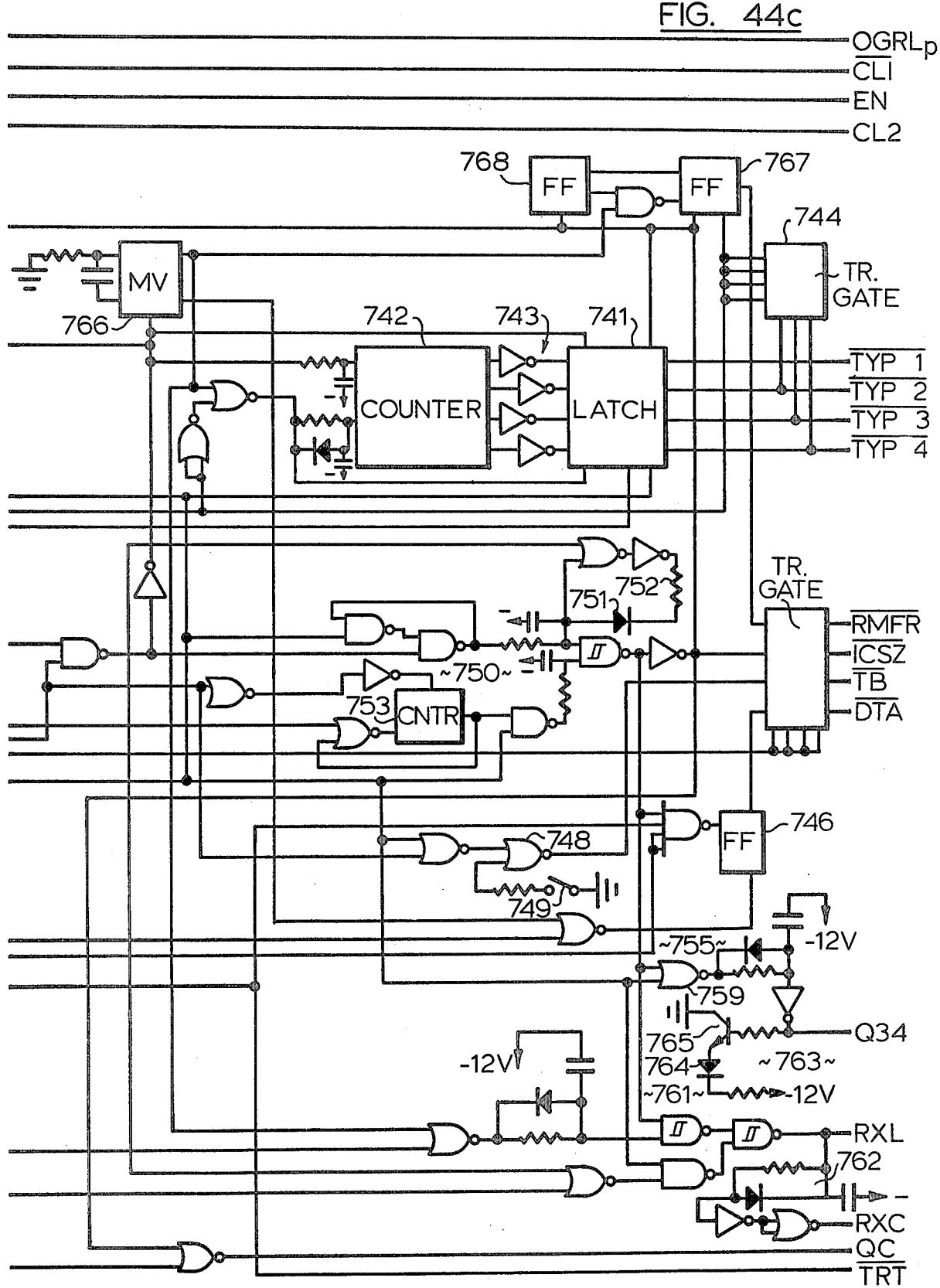

FIGS. 44a, 44b and 44c illustrate in greater detail the control circuits for the tie trunk interface, FIG. 45 being a diagram showing the manner in which these figures are organized.

The input logic circuit 723 is made up of three components shown in FIGS. 44a and 44b, namely an input buffer (FIGS. 44a and 44b), an outgoing seize latch (FIG. 44b) and a timing pulse generator (FIG. 44b). The input buffer comprises a pair of latches 738, 739, by which information transmitted from the central processor along a common bus is latched in readiness for use in the appropriate time slot of the scanning cycle, the information being updated or replenished in each cycle. The function of the outgoing seize latch 747 is to store the OGSZ bit from the central processor, the circuit including a NOR latch 740 (FIG. 44b) which is reset by either a power-up pulse or the OGRL bit. The function of the timing pulse generator is to generate pulses EN.CL1, EN.CL2, $\overline{EN.CL2}$, $\overline{EN.CL2}$ in response to timing pulses EN,CL1 and CL2. The generated pulse EN.CL1 is used as a clock pulse applied to the latch 739 for latching information from the central processor. The pulse EN.CL2 is applied to a latch 741 of the dial pulse receiver circuit to control the output of "Type" information TYP1, TYP2, TYP3, and TYP4. The pulse $\overline{EN.CL2}$ is used to latch the inverted dial pulse code in the latch 741, and also to reset a dial pulse counter 742, the output of which is applied to the latch 741 through inverters 743. The pulse $\overline{EN.CL2}$ is used to send out inverted dial pulse code.

The output logic 724 is made up of four main components. It comprises an output buffer (FIG. 44c) which includes transmission gates 744, 745, which are closed at the appropriate time slots of the scanning cycle to pass information to the central processor via the common bus. A second component is the DTA logic circuit (FIG. 44c), the pulse $\overline{DTA}$ being the inverted output of a flip-flop 746 which is set when dial pulses are received from the far end and delay-to-dial is requested. Resetting of the flip-flop 746 is effected by setting the outgoing seize latch 747, or by a TRT bit, or by signal $\overline{ICSZ}$ being high. A third component of the output logic is the "trunk busy" logic 748 (FIG. 44c). The signal $\overline{TB}$ is normally high. A seizure by the far end, resulting in signal $\overline{RV}$ going low, causes the signal $\overline{TB}$ to go low, the latter being restored to a high value by setting the outgoing seize latch 747. A switch 749 is provided for actuating the "trunk busy" logic to turn the signal $\overline{TB}$ low for maintenance purposes. The fourth component of the output logic is the "incoming seizure" logic 750 (FIG. 44c). The signal $\overline{ICSZ}$ is normally high but may be set low by one of two different circuits depending on whether the call is incoming or outgoing. If the outgoing seize latch 747 is not set and line current is detected in response to an incoming call, the signal $\overline{ICSZ}$ is set low after 150 ms delay. Diode 751 and resistor 752 furnish a delay to ensure that the signal ICSZ remains low during dialing. If the outgoing seize latch is set when line current is detected, in accordance with an outgoing call condition, the incoming call circuitry is disabled and the outgoing call circuitry is activated. The main component of this activated circuit is a 12-stage binary counter 753, which starts counting for 6.4 seconds on detecting a reverse voltage at the far end. At the end of this period the signal $\overline{ICSZ}$ is set low so as to inform the central processor that the far end has answered. Restoration to normal voltage within the 6.4 second period resets the counter and the signal $\overline{ICSZ}$ remains high. In both cases, once the signal $\overline{ICSZ}$ is set low, it remains low for a period of 150 ms after line current disappears, to minimize false releases.

The QC logic circuit 726 is shown in FIG. 44c and comprises essentially a NOR gate 754 which is operable by the outgoing seize latch 747 and the incoming seizure logic circuit, so as to set the signal QC high when the outgoing seize latch is set and the signal ICSZ is high. The purpose of this circuit is to reduce the line current after a call has been established.

The "Q34 logic" circuit 729 is denoted in FIG. 44c by the reference 755. This circuit produces a signal Q34 for operating the switch 720 (FIG. 43), the switch being turned on when the outgoing seize latch is set or when the signal ICSZ is high. An element provided by diode 756, resistor 757 and capacitor 758 at the output of NOR latch 759 provides for fast turn on and a slow turn off.

The "Q12 logic" circuit 728 (FIG. 43) is denoted by the reference numeral 760 in FIG. 44a. Because of high capacitance in the line and the hybrid 712, a fast voltage reversal is not possible with normal drive from the amplifier 715. To improve the speed of the voltage reversal, a 5 ms pulse is generated by the Q12 logic circuit to increase the drive from the amplifier 715 at every change of polarity on the line.

The logic circuits 730 and 731 (FIG. 43) are denoted by the general reference 761 in FIG. 44c. In the case of an incoming call, the signal RXL is set to open the switch 717 (FIG. 43) as soon as signal ICSZ goes high. It is cleared during delay-to-dial or pulsing. After a period of 150 ms following the end of delay-to-dial or pulsing, the signal RXL is set high again to allow ring back tones to go through. In the case of an outgoing call, the signal RXL is set to open the switch 717 as soon as the outgoing seize latch has been set. It is cleared during digit pulsing, and is set again when digit pulsing ends. The signal RXC is set or cleared in the same mannner as the signal RXL. To ensure that the signal Q34 is always high when the signal RXC is set, a delay of 10 ms is provided by the diode-resistance-capacitance network 762.

The "busy indicator" circuit 763 (FIG. 43) is shown in FIG. 44c. It includes an LED 764 which is switched on by a transistor switch 765 to indicate a busy condition when the trunk is seized by either the far end or by the central proccesor. Since the signal Q34 is high under similar conditions, this signal may be used to turn on the LED 764.

The dial pulse detector circuit 732 (FIG. 43) is shown in FIG. 44c. Incoming dial pulses are detected as breaks in the line current, and so the outputs from the line current detector circuit are used to generate pulses corresponding to the dial pulses received. These pulses are fed to the clock input of the binary counter 742. The count in each train of pulses is retained until it is latched by the latch 741 in inverted form to be sent out at the proper time slot of the scanning interval. Once the count is latched, the counter 742 is reset and made ready to count the next train of pulses. A retriggerable monostable multivibrator 766 with an output pulse of 150 ms duration prevents the output of counter 742 from being latched before all the pulses in a train have been counted. At the reception of the first pulse, the data input of a D-type flip-flop 767 sets a flip-flop 768, and thus the input of the flip-flop 767 is kept high until the trunk is released; therefore, a low level on signal RMFR is sent out only once.

The line current and polarity detector 722 of FIG. 43 is shown in greater detail in FIG. 44a. The line current is detected by opto-couplers 769, 770. Resistors 771 and 772 connected across the LED's of the opto-couplers set the threshold current at 7 ms to avoid detection of leakage currents. The opto-coupler 769 is turned on by a current coming in from the far end along the tip conductor T, indicating a normal voltage, i.e. ground on tip, battery on ring, at the far end. The otpo-coupler 770 is turned on by a similar current along the ring conductor R, indicating a reverse voltage, i.e. ground on ring, battery on tip. The line current must be sustained for more than 5 ms before the detector outputs are set, and they remain set for 15 ms after the line current dissappears; this minimizes the effect of transients on the line and also guards against false breaks during voltage reversals.

The pad control logic 737 of FIG. 43 comprises essentially a system of gates 773 (FIG. 44a) which include a NOR latch. This latch is set when the outgoing seize latch 747 is reset, that is to say, when the central processor releases the trunk, or by a high level on POFF. Resetting of the latches is effected by a high level on PON. A low level from the output of this NOR latch turns the 2 dB pad on, and a high level turns it off; thus the pad is normally off and is only turned on when requested by the central processor.

FIG. 44a also show the "music insert" circuit, indicated generally at 774, which is identical with the "music insert" circuits of the DID and central office trunks. The transistor 775 is normally off, applying a voltage of $-36$ volts to the gates of the FET's 776, 777 to keep them off. When music is to be inserted, the transistor 775 responds to a low level applied to its base from the latch 739 in accordance with the input signal MUS, and turns on the FET's 776, 777.

At the heart of the dial pulse logic circuit 725 is a telephone dialler 778, by which digit pulsing is controlled. For incoming calls the reset input to dialler 778 is held high to disable it, but for outgoing calls the reset input is brought low to enable it. A valid dial pulse code is presented to the data input and a monostable multivibrator 779 is used to generate a pulse of 12 ms to clock in the code. All the digits to be dialed out are clocked in and stored in a memory. The dial pulse output is connected to the polarity logic circuit 721 (FIG. 43), indicated generally by the reference numeral 780 in FIG. 44a, to generate ground and battery pulsing. If a reverse voltage is received from the far end and more digits are yet to be sent, the dialler 778 is placed in a re-dial mode in which pulsing of the next digit is halted. When the normal voltage is restored, the dialler is brought out of the re-dial mode and pulsing can start again. The dialing rate is set at 10 pulses per second, with 66.6 percent break and 33.3 percent make, the interdigital pause being 800 ms in duration. In the case of an D.T.M.F. type to tie trunk, the dialler is removed.

Finally, the polarity logic 780 determines what polarity is to be placed on the line, and in accordance with such determination generates signals $\overline{GTBR}$, $\overline{GRBT}$. A low level on $\overline{GTBR}$ operates the polarity switch 719 (FIG. 43) to place ground on the tip lead and battery on the ring lead. A low level on $\overline{GRBT}$ places reverse polarity on the line. Since there are only two states, the signal $\overline{GRBT}$ is obtained by inverting the signal $\overline{GTBR}$. The latter signal is set low by a high level from either the DP output of the dialler 778 or the output of a D-type flip-flop 781. In the idle condition, the flip-flop 781 is set to make the singal $\overline{GTBR}$ low. For an incoming call a high level on DD pulls the reset input of the flip-flop 781 high, and resetting of this flip-flop sends $\overline{GTBR}$ high to present a reverse voltage to the far end. When the signal DD goes low, the reset input is held low but the set input is pulled high forcing the signal $\overline{GTBR}$ low to provide a normal voltage to the far end. Setting the outgoing seize latch also resets the flip-flop 781 to present a reverse voltage as answering supervision. For outgoing calls, both set and reset inputs to the flip-flop 781 are held low; the flip-flop is then triggered by the clock input from gate 782 to maintain a line current except during pulsing out or after the call has been established.

The Page Trunk

The system has provision for accommodating a page trunk, which will replace the thirtieth (and last) trunk when equipped. Up to three different areas can be paged selectively or simultaneously from any telephone in the system or from the attendant's position. The attendant has a further option of paging on all three areas simultaneously merely by pressing the PAG button on the console, and in this mode of operation, the attendant has priority and can override any paging call already in progress. Five two-digit numbers are associated with the paging circuit, three of these being for selective paging on the three different areas, one for all area paging, and one for call pick-up by the paged party. Audio output is provided selectively on three balanced pair cables, for the three areas, and in the simplest system the user need add only one speaker and area amplifier for each area. Three paging are control leads are also provided, which are grounded selectively depending on the area selected for paging. This provides added flexibility, allowing the user to provide external relay switching for area page control purposes, possibly providing music on the paging system when it is not required for paging calls or announcements. It would also be possible to use a single area amplifier and three different speakers, using the page area control leads to switch the area speakers.

Figure 46A:
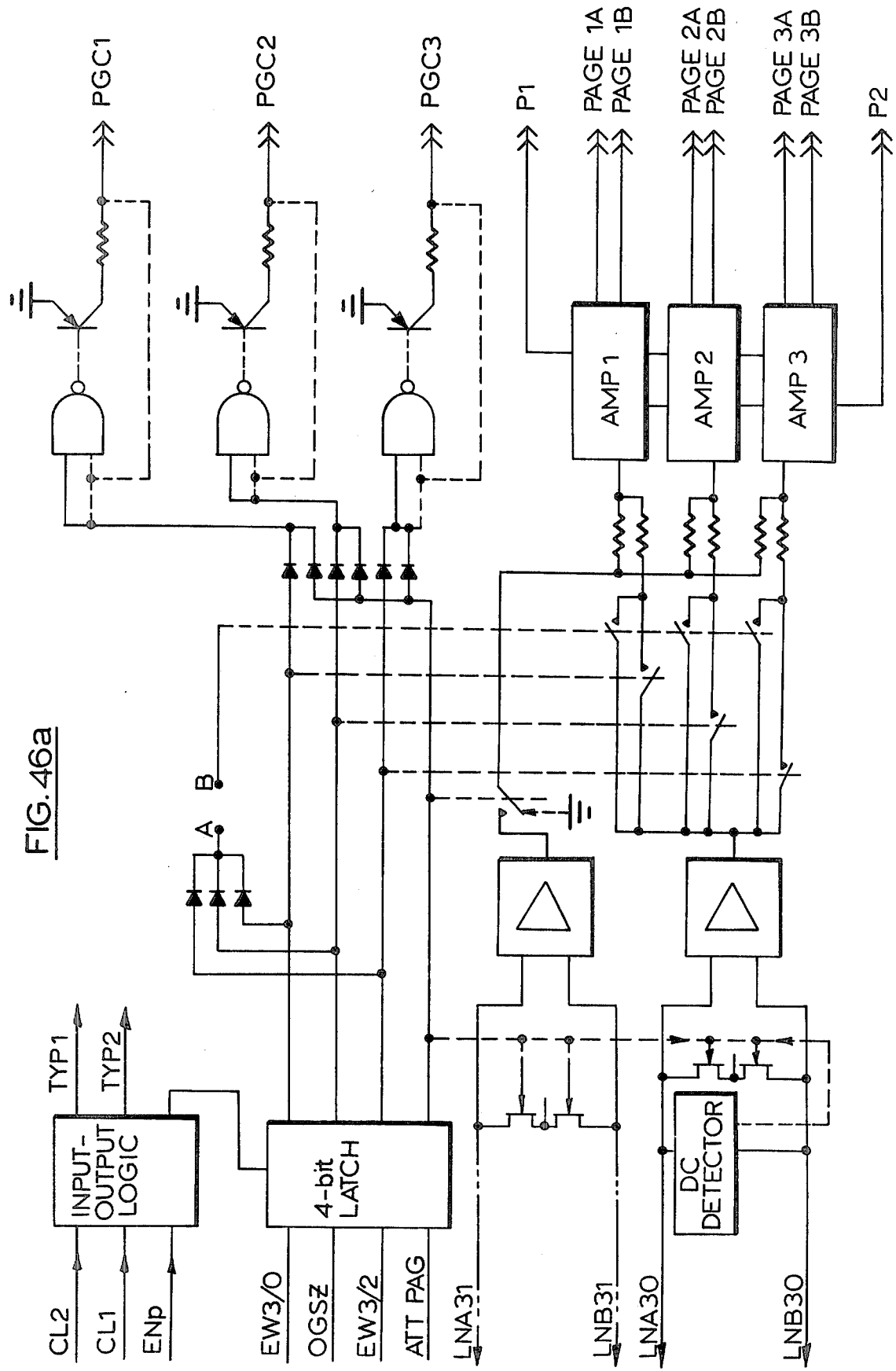

FIG. 46a is a simplified blocked diagram of the paging system, which includes three area amplifiers 791, 792 793, FIG. 46b showing a typical area amplifier circuit.

Referring to FIG. 46a, an input/output logic circuit 794 informs the central processing unit that the page trunk system is equipped by bits $\overline{TYP1}$ and $\overline{TYP3}$, and provides a clock pulse to a 4-bit latch 795 which receives and latches the area information from the central processing unit as bits EW3/0 (area 1), OGSZ (area 2), EW3/2 (area 3). The bit ATT PAG is also received and held by the 4-bit latach 795. The attendant speech pair LNA31, LNB31 as well as the speech pair of the thirtieth trunk LNA30 and LNB30, are terminated on the page trunk. When a crosspoint connected to the latter speech pair is operated, a d.c. detector 796 detects the resultant current flow and opens a shorting FET switch 797. Speech signals on the line pair LNA30, LNB30 are now applied to the pre-amplifier 798 and thence to a bank of CMOS switches 799, controlled by the output of the 4-bit latch 795. By closure of the appropriate CMOS switches, the output of the pre-amplifier is selectively applied to the inputs of the three area amplifiers 791, 792, 793.

When the PAG button on the attendant's console is pressed, to indicate an all area paging call from the attendant's position, a shorting FET switch is opened, and the shorting switch 797 is closed, if already opened. Thus a second pre-amplifier 801 is activated and the pre-amplifier 798 is disabled. The speech signals on the attendant's line pair LNA31, LNB31 are amplified by the second pre-amplifier and applied to the input of all three speaker amplifiers by the changeover CMOS switch 802 controlled by the ATT PAG output of the 4-bit latch.

The outputs of the 4-bit latch 795 are also applied to three diode OR gates 803, whose outputs are used to drive 3 NAND Schmitt triggers 804, 805, 806 and through them three PNP transistors 807, 808, 809. The emitters of the PNP transistors are grounded and the collectors are connected to the page area control outputs PGC1, PGC2, PGC3, through protective diodes and resistors (not shown). Depending on the instruction received from the central processing unit, any one or all of the three transistors will be switched on, thus applying ground on the corresponding PGC1, PGC2, PGC3, leads, silmultaneously with the audio output provided on the page output line pairs. Circuit protection against short-circuits on the PGC1, PGC2, and PGC3 leads is provided so that if the current drawn on any of these leads is greater than 200 mA, approximately, the circuit switches itself off. Normal operation resumes once the fault has been corrected.

The output of the 4-bit latch 795 is also connected to a three input diode OR gate 810, the output of which is marked as A. The control leads of three of the CMOS switches 799 are commoned and brought to a point labelled B. By strapping points A and B, the user may, at his option, have paging output on all three page output line pairs, irrespective of the area indicated by the central processor. However, the area information is still available on the page area control leads which may be used, with external switching circuits, for proper area paging, or for providing music when idle.

FIG. 46b is a simplified diagram of one of the three identical area amplifiers 791, 792, 793. This circuit provides a balanced audio input to the area speaker amplifier, provides 600 ohm line matching, a high logitudinal impedance and good longitudinal refjection. It further provides protection to the page trunk for abnormal voltages on the page area output line pair. The circuit configuration is that of a standard differential amplifier, with the added feature of a transistor circuit used as the longitudinal load for the differential amplifier, providing a low resistance for direct current, but a high impedance for common mode alternating current signals.

Miscellaneous Circuits

FIG. 47 illustrates the REMOTE ALARM circuit of FIG. 8. This circuit is responsive to power failure, terminals 851, 852, and 853 being connected via the auxiliary connector block (FIG. 8) to external circuits. Thus terminal 851 may provide a connection to a current source, terminals 852 and 853 providing connections to a bell and a current indicator, respectively. A transistor 854 is connected across a −48 volt supply in series with a relay 855 having a changeover contact 855a. The transistor 854 is normally conducting, the relay 855 being energized but in the event of power failure an alarm signal ALS derived from the Alarm and Interface circuit (FIG. 8) is applied to the base of the transistor, causing the transistor to switch off and so release the relay. The relay will also release with the −48 volt supply fails.

The block which is labelled AUX. SUPPLY in FIG. 8 actually comprises a number of miscellaneous auxiliary supply and control circuits. FIG. 48 illustrates a protective circuit used in conjunction with a −48 volt direct current supply which may be required by the telephone company. The terminal 860 is connected to an internal −48 volt supply of the system and the terminal 861 is made available to the telephone company. The purpose of the circuit is to limit the current which can be drawn from the system in the case of overloading as by an external short circuit. Under normal conditions, when the load placed on terminal 861 is acceptably low, the transistor 862 is ON. If the current drawn exceeds a predetermined value such that the voltage applied to the base of a second transistor 863 exceeds 0.6 volt, the latter transistor is switched ON; in consequence, the voltage applied to the base of transistor 862 falls, according to the voltage drop across the collector load resistance 864, and so the transistor 862 is switched OFF.

FIG. 49 illustrates a drive circuit for the attendant's clock. A transistor 870 is simply a squarer connected across a 12 volt supply, which receives and squares a 60 c.p.s. singal TCL and supplied the clock drive output 60 i.p.s. which is used at the attendant console.

FIG. 50 represents a simple voltage regulating circuit comprising a voltage regulating network 871 having input terminals 872, 873 connected across a −28 volt supply, and output terminals 874, 875 from which a −24 volt supply is derived.

FIG. 51 illustrates a protection circuit which is used for the various trunk interfaces. The protection lines P1 and P2 are connected by diodes, which are normally reverse biased, to points on the interfaces where destructive voltage transients are likely to occur. In the protection circuit, the lines P1 and P2 are connected to ground via metal oxide varistors 878 with a d.c. threshold at 175 volts. When high voltage transients are impressed on the trunk interfaces, the varistors conduct through the protection diodes on the interfaces and limit the voltage across the semi-conductor components to a safe value of 175 volts. The system ringing voltage, or the positive and negative voltages in the system, are used to bias the varistors 878 through the diode system 877, thus keeping the protection diodes on the interfaces reverse biased during normal conditions.

Figure 52:
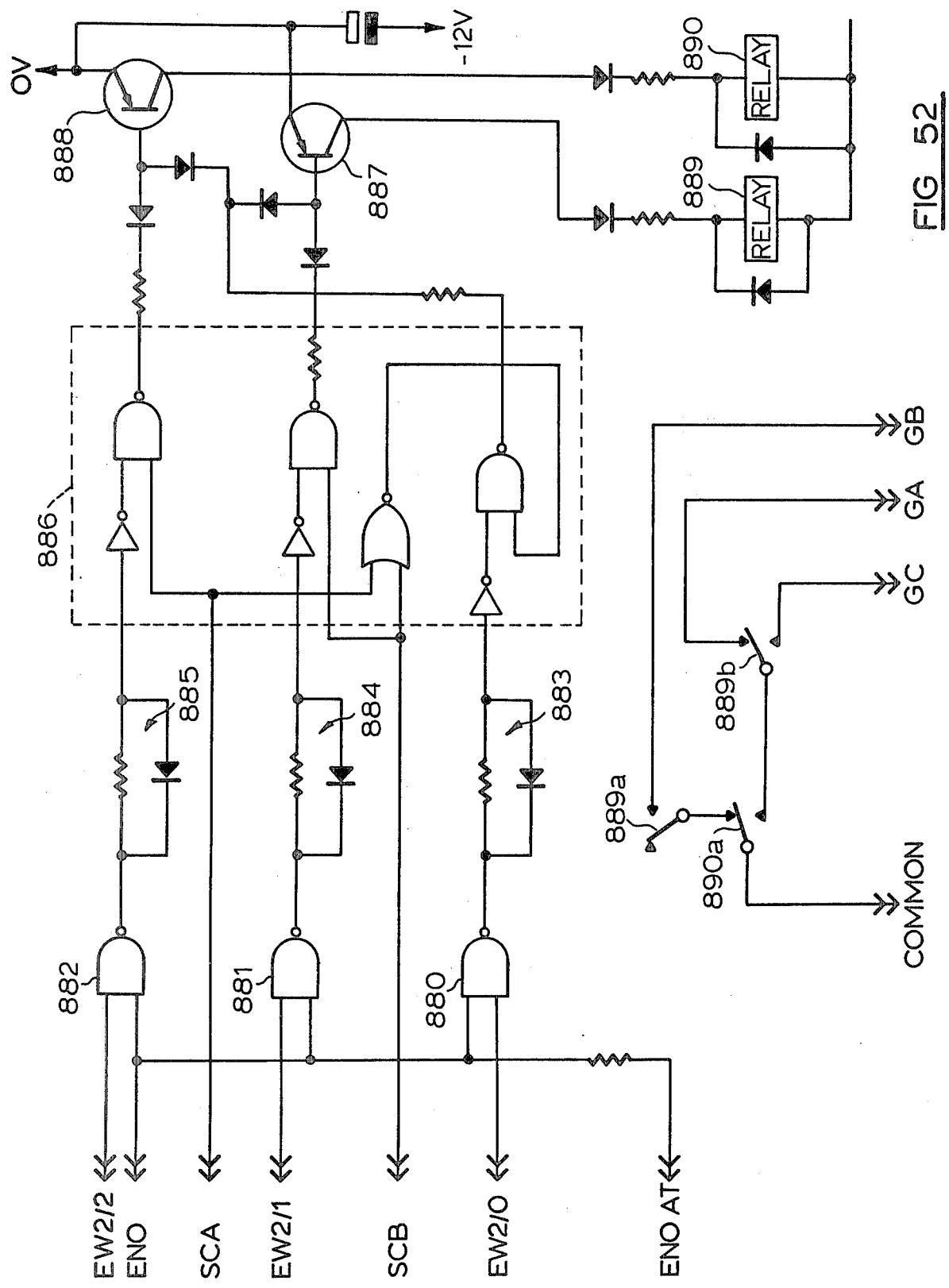

FIG. 52 illustrates the circuit for controlling group call signalling from a common audible supply. The common audible control contacts for three distinct sets of trunks, GA, GB and GC, are connected via the common audibles and their supply to a point labelled COMMON, through a switching network which ensures that the common audibles of different groups will not be operated simultaneously. The arrival of a group call is indicated by a signal EW2/0, EW2/1 or EW2/2 derived from the central processor via the equipment data multiplexer, these signals being applied to gates 880, 881 and 882, respectively, where they are gated with a signal ENO derived from the control circuit of FIG. 58, this signal serving to enable the circuit only during the appropriate time slot ENO of the scanning cycle. The gated outputs are applied through delay networks 883, 884 and 885 to a system of gates 886, where they are combined with sounder cadence signals SCA and SCB derived from the timing generator, a pair of transistors 887, 888 being selectively energized in accordance with the output of the gating system 886. The sounder cadence signals SCA and SCB are each represented by pulses of two seconds duration produced sequentially with a repetition rate of six seconds.

The transistors 887 and 888 act as drivers for relays 889 and 890, which actuate respective relay contacts 889a, 889b and 890a of the switching network by which the common audibles GA, GB and GC are selected. Thus, an incoming group call signal EW2/2 causes the transistor 888 to conduct, and the relay 890 to be energized. In this case, relay contact 890a changes over, and the resultant output is GA. Similarly, an incoming group call signal EW2/1 results in the transistor 887 being turned on and the relay 889 being energized. Thus, the relay contacts 889a and 889b change over, and the common audible signal GB is produced. An incoming group call signal EW2/0 causes both transistors 887 and 888 to conduct and both relays 889 and 890 to become energized, with the result that all three relay contacts change over and the common audible signal GC is produced.

The Groupset Supply

Figure 53:
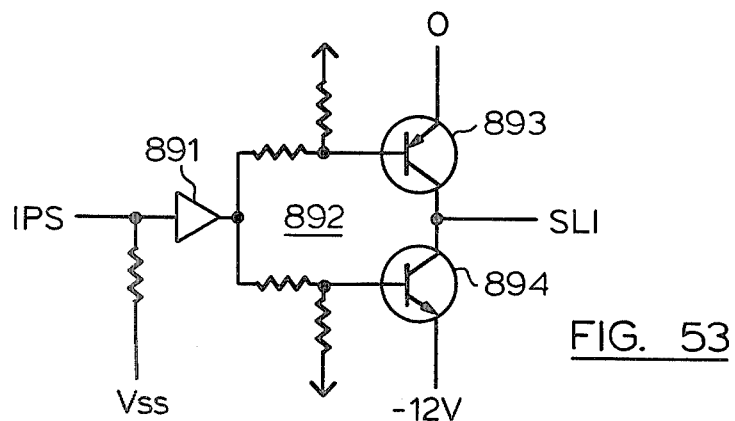

As previously indicated, the groupsets require additional power for lighting the additional lamps, FIG. 16 showing a third pair connected to a terminal block for connection to the pair SL1 and SL2. This signal is provided by the groupset supply circuit shown in FIG. 53 which is common to all groupsets. As illustrated in FIG. 53, a timing signal IPS derived from the timing generator is applied through an inverter 891 and resistance network 892 to the bases of a pair of series-connected transistors 893 and 894, providing a groupset supply signal SL1.

Figure 54:
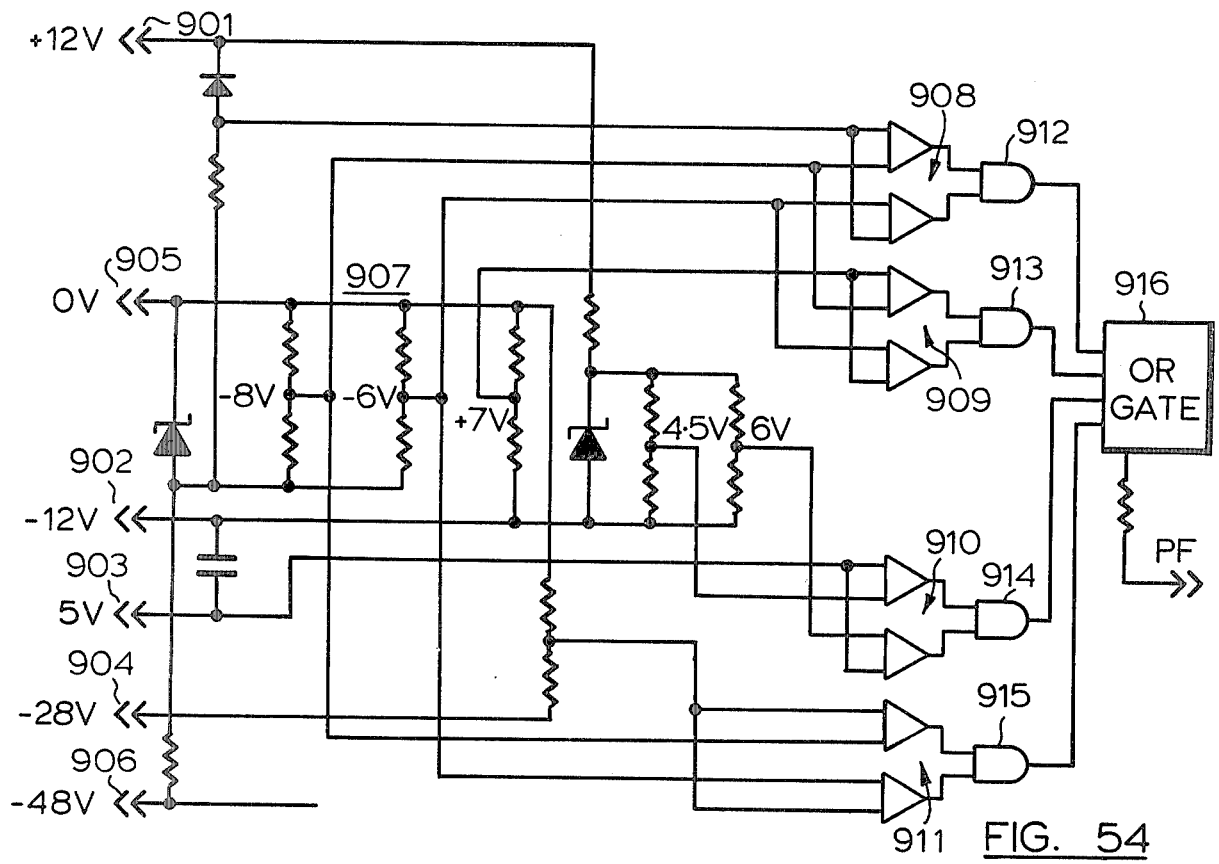

FIG. 54 illustrates a circuit which is used to detect variations in the voltages of certain supplies, namely, the +12 volt, −12 volt, +5 volt, and −28 volt supplies, by more than assigned amounts. The circuit provides terminals 901, 902, 903 and 904 which are connected respectively to these supplies. Terminals 905 and 906 are connected to 0 volts and −48 volts, respectively. From these supply voltages are derived a number of reference voltages −8 volts, −6 volts, +7 volts and +6 volts by means of a network of resistances and zener diodes, this network being indicated generally by the numeral 907. The circuit includes four pairs of operational amplifiers, the pairs of amplifiers being denoted by the reference numerals 908, 909, 910 and 911. The reference voltages and the voltages to be monitored are applied to the input terminals of the operational amplifiers, each of these amplifiers being arranged to produce an output when the voltage being monitored departs from its assigned value by more than a predetermined amount, the output being applied to the respective one of four OR gates 912, 913, 914 and 915. The gated outputs are applied to an OR gate 916, which in response to a "fail" condition produces an output signal PF.

Figure 55:
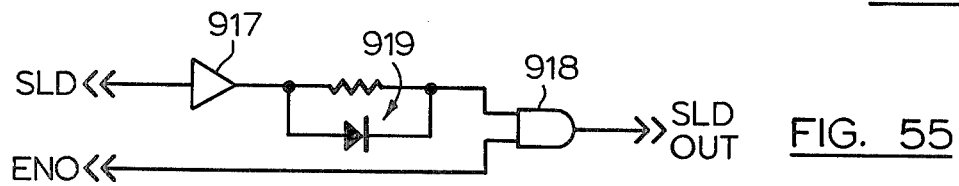

FIG. 55 illustrates a circuit for producing a signal SLDOUT in response to a short circuit in a subset line. The short circuit condition is indicated by a circuit SLD which is derived from the voltage comparator of a line data multiplexer as described with reference to FIG. 17. This signal is amplified by an amplifier 917 and fed through a delay network 919 to a gate 918, where it is gated with the signal EN0 which defines the appropriate time slot of the scanning cycle. The output signal, SLDOUT is transmitted to the central processor, which is thereby informed of the short circuit line condition.

FIG. 56 illustrates a circuit from deriving from the normal 0 volt, −24 volt, and −48 volt, supplies to regulated voltages of −18 volt and −30 volt, respectively, which are derived from terminals 921 and 922. The circuit includes two solid state voltage regulating chips 923, 924, and is otherwise conventional.

The system provides for the injection of music onto a speech line where a caller is placed on hold, and FIG. 57 illustrates quite schematically a balanced amplifier 925 for deriving from the input MUSIC IN a balanced output MUSIC+ and MUSIC−.

FIG. 58 shows a special control circuit which is, in effect, an extension of the timing generator. The circuit comprises simply a gate system 930 and a pair of identical decoders 931, 932, which in response to the 7-bit address ENB0 ... ENB6 from the timing generator produce signals EN0 ... EN31 defining thirty-two time slots of a scanning cycle. The decoders 931, 932 are enabled and inhibited, respectively, in sequence by the gate system, which determines from bits ENB4, ENB5 and ENB6 which of the decoders 931 and 932 should be enabled. Signals STR and $\overline{TKCLK}$ from the crosspoint preselector, and DD from the timing generator, determine the appropriate timing of the decoded outputs. The signals EN0 ... EN31 define thirty-two time slots of a scanning cycle. The signal EN0 defining the special time slot and the signals EN1 to EN31 providing the decoded addresses for thirty-one interfaces. An inverted signal ENA31 is transmitted to the attendant interface and provides the address for the attendant's console.

FIG. 59 illustrates a circuit for informing the central processor of special abnormal conditions and for providing signals in response to command signals from the central processor. The circuit comprises a latch 933, a pair of gates 934, 935, and a pair of drivers 936, 937. The signals which activate this signal are: "urgent alarm" signal ULIN from the central processor, a "non-urgent alarm" signal NULIN from the central processor, and a signal SAL from the central processor to indicate an alarm condition to the attendant console. Information stored in the latch 933 is clocked in by the read data signal RD from the timing generator, during the special time slot defined by signal EN0, providing on demand respective output signals ALU, ALNU, and ALS to the attendant's console. The signal SK is produced when a service key is applied to the central equipment cabinet, this signal being gated with the time slot signal EN0 and producing an output signal SVO which informs the central processor that the service key has been inserted. The urgent alarm signal ALU is also produced in response to the power failure signal PF derived in response to a power failure condition by the circuit illustrated in FIG. 54.

The Power Fail Transfer

The function of the POWER FAIL TRANSFER circuit (FIG. 8) is to connect a "special telephone" to the central office in the event of power failure. The present system provides this facility for a maximum of eight trunks, two circuit boards being provided, each handling four trunks.

Figure 60:
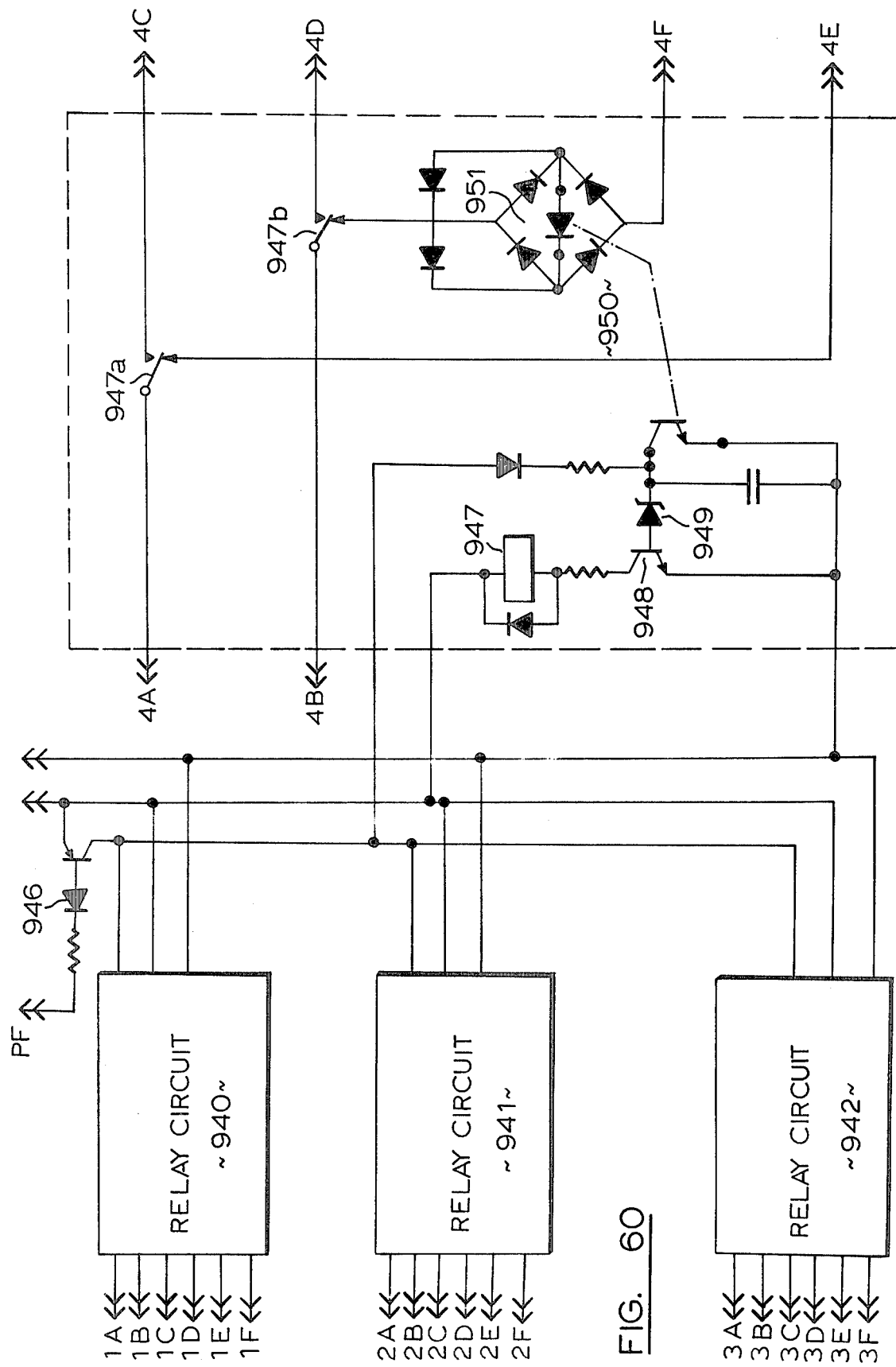
FIG. 60 illustrates a power-fail transfer circuit.

FIG. 60 is a circuit diagram of one of the circuit boards. This comprises four relay circuits 940, 941, 942, and 943, only the last of these relay circuits being illustrated in detail. The four relay circuits are connected to common supply lines 944, 945 and to a common switch 946 which is responsive to the power fail signal PF derived from the alarm and interface board (see FIG. 8) in the event of power failure. The pairs of lines 1A, 1B, etc. are connected to the central office; the pairs of lines 1C, 1D, etc. are connected to the respective trunks being served, and the pairs of lines 1E, 1F, etc. are connected to the respective special telephone stations. In the event of a power failure, when the special telephone is being used and the power is being restored while the special telephone is sending pulses, a 700 ms delay circuit will enable the call to be completed. The circuit returns to normal only after the handset is replaced. In the event of a power failure resulting in a signal PF, the signal is applied to the base of transistor 948, switching off this transistor and de-energizing the relay 947; the relay contacts 947a and 947b therefore drop, connecting the central office to the special telephone station. When power is restored, the circuit reverts to its normal condition provided that the line is not being used. When the special telephone is in use, current in the diode bridge 949 activates the opto-coupler 950 preventing the associated transistors from being switched on until the call has been completed. The reason for the bridge configuration of the diodes 951 is to allow for reversals of polarity in the lines 1A, 1B, etc. originating at the central office.

Line Data Multiplexer Operation

Figure 61:
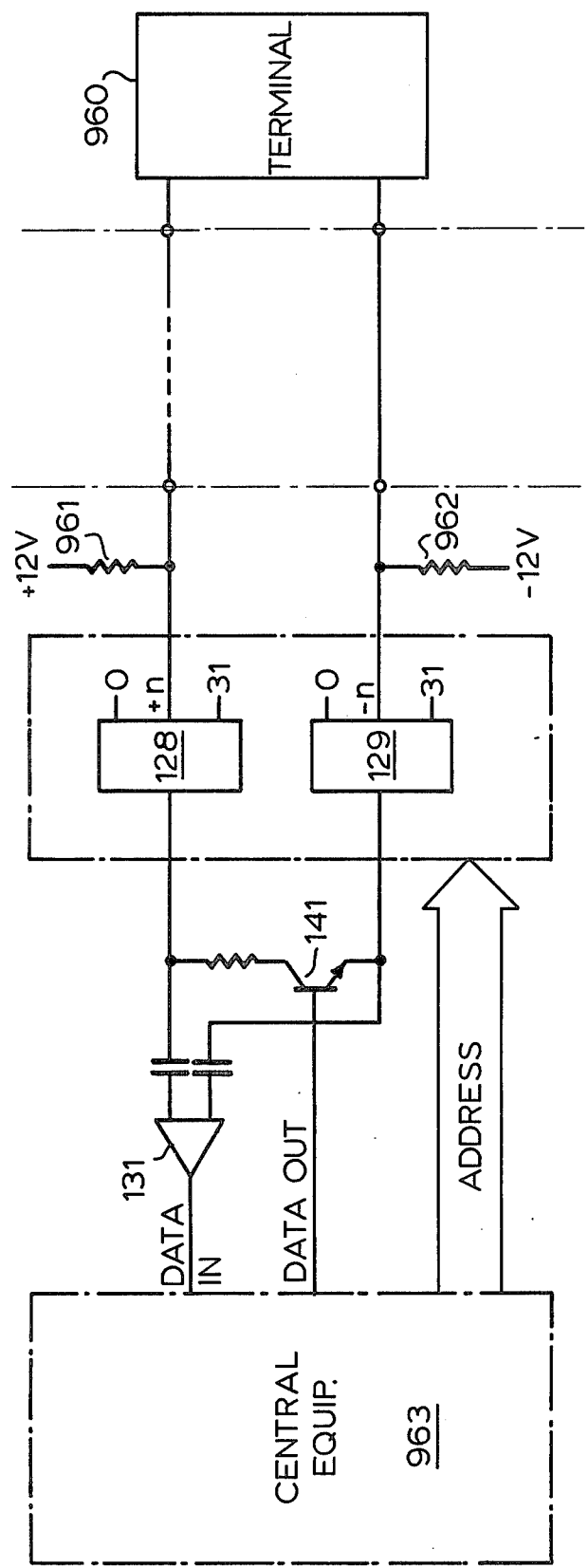
FIG. 61 illustrates the relationship of a line data multiplexer to the central equipment and the terminals.

The function of the line data multiplexers will now be described with reference to FIG. 61, which is a schematic diagram illustrating the relationship of one of the line data multiplexers to the central equipment and the terminals which it serves. As previously mentioned, each line data multiplexer deals with thirty-two lines serving subsets, groupsets and callmasters. Referring to FIG. 61, the line data multiplexer circuit includes a pair of multiplexers 128, 129, to which are connected the thirty-two balanced data lines. These lines are referenced 0 ... 31 in the diagram, but only the line represented by the data pair +n, −n associated with the terminal 960 is shown in full.

The line data multiplexer is scanned in accordance with address information from the timing generator, the thirty-two line pairs being addressed in turn with a cycle time of 50 ms, each line being selected for a period of 1560 μs in each cycle. Only during the third quarter (390 μs) of this period can the line data multiplexer exchange information relating to the selected line with the central equipment 963; during the remainder of the period the central processor is dealing with lines connected to the other line data multiplexers and miscellaneous trunks. In the first half of the relevant 1560 μs period, data from the terminal is transmitted over the balanced line and, following amplification by the differential amplifier 131, is stored in a latch, this being the latch 136 shown in FIG. 17. At the commencement of the third quarter, which is the 390 μs scan interval of the particular terminal, the stored information is supplied in parallel form to the CPU. In this same scan interval data from the CPU is stored into the latch 137 (FIG. 17) and after being converted to serial form is transmitted over the balanced line to the terminal. This data is made up of six bits, five to operate the four subset lamps and sounder, and the sixth bit being used only in groupsets to light the four additional lamps. The data pulses, DATA OUT, are applied to the base of the switching transistor 141, which is response to each pulse draws additional current from the line, thus increasing the potential drop across line terminating resistors 961, 962 and so transmitting the serial data as voltage modulation on the line.

CONCLUSION

The electronic telephone system described above, by way of example with reference to the drawings, therefore includes a plurality of extension line units, at least some of which are associated with telephone instruments, the extension line units being connected to a central equipment by respective cables each including a first conductor pair providing a speech transmission path and at least one second conductor pair providing a separate transmission path for system signalling and supplying power to the extension units. The second conductor pairs are balanced and are terminated at the line units by matching impedances. The first and second conductor pairs are connected respectively to a crosspoint matrix and to a common control unit at the central equipment. The system also includes a plurality of trunk interface units, each providing a speech transmission path connected to the crosspoint matrix and a separate signalling path connected to the common control unit. The common control unit includes a central processor, a memory, a timing generator, and means controlled by the timing generator for controlling the transmission of data over the system signalling paths. Thus, the extension line units are associated in groups and the common control unit a line data multiplexer for each group which is controlled by the timing generator for addressing the extension line units of the group in cyclic sequence in a time-division multiplex mode. A second multiplexer controlled by the timing generator addresses the trunk interface units in cyclic sequence at a cycle frequency equal to that of the groups, the addressed line units and the interface units being placed sequentially in communication with the central processor for exchanging information therewith.

The telephone instruments are of the D.T.M.F. type, each having a twelve-button keypad, and some of the instruments, referred to as groupsets, have an additional set of buttons associated with indicator lamps. A special set of indicator lamps is associated with the keypad, there being four such lamps in the present example which are associated with particular keys thereof. These indicator lamps are positioned on the control panel of the instrument adjacent the particular keys with which they are respectively associated. The line circuit of the instrument includes means responsive to key operation for transmitting data to the common control unit, and means responsive to data received from the common control unit for selectively controlling these lamps in accordance with line signalling conditions. The lamps when operating indicate the status of connections to respective connected parties, each lamp being operable in different modes according to the status of the respective connection. Thus, a call in progress is indicated by a steady light, a call to be answered is indicated by a slow flashing light, and a call on hold is indicated by a fast winking light. Each of the particular keys of the keypad is operable to modify the status of the connection indicated by the respective associated indicator lamp.

To make a call, one lifts the telephone handset listens for the dial tone, and keys the required number, the procedure being quite conventional. An incoming call is signalled by a slow flashing light, this being at lamp L1 of FIG. 1 if no other calls are being made. The call is answered by lifting the handset, the light becoming steady to indicate a call in progress. A second incoming call while the first is in progress is signalled by a slow flashing light at lamp L3 of FIG. 1. This call is answered by depressing the associated digit key No. 4; the first call is thereby parked, the associated lamp being caused to wink fast. The user can transfer from either connected party to the other, and back again, simply by pressing the associated digit keys, Nos. 1 and 4, as required.

When the user is talking on one call he may make an enquiry call simply by keying the required number. This automatically places the first connected party on hold. To reconnect the call to the first party the user simply presses the digit key adjacent the winking light. Calls in progress are cleared by replacing the handset; however, calls on hold are not so cleared, but becoming incoming calls in turn.

Connected parties can be interconnected for add-on conference calls by pressing the function key * (FIG. 1), the respective lamps then becoming steady. The parties can be separated simply by pressing the appropriate digit key corresponding to the party with whom the user wishes to speak, the other party being placed on hold. By replacing the handset the user clears from the add-on conference the two connected parties remaining interconnected for two-way conversation. The instrument organization also allows diversion of incoming calls to another extension. For this purpose the user simply keys his own number followed by the number of the other extension, presses the function key *, and replaces handset. To clear this Follow Me Mode, the user simply keys his own number twice, presses the function key *, and replaces the handset. In order to pick-up an incoming call to another extension the user may press the function key # and key the number of the other extension.

We claim:

1. An electronic telephone system having a plurality of terminal units which are connected radially to a central equipment by respective cables each including at least one conductor pair providing a transmission path for system signalling, said conductor pairs being connected to a common control unit at the central equipment, the common control unit including:

a timing generator for generating address signals and timing signals, multiplexing means controlled by the timing generator in accordance with the generation of said address signals for placing the units sequentially in communication with the common control unit for exchanging information therewith, said terminal units being scanned in cyclic sequence, each unit being allotted a unique time slot within the scanning cycle, and means responsive to timing signals from the timing generator for controlling the transmission of digital data over said system signalling paths, said means dividing each of said allotted time slots into distinct periods in which data is transmitted unidirectionally from the terminal unit to the common control unit and in which data is transmitted from the common control unit to the terminal unit, respectively, said conductor pairs being connected to transmit both system signals and d.c. power for consumption at the terminal units, and each said conductor pair being a balanced pair terminated by a matching impedance at the respective terminal unit.

2. An electronic telephone system according to claim 1, wherein at least some of the cables include additional conductors for transmitting d.c. power to the terminal units.

3. An electronic telephone system according to claim 1, in which the common conrol unit generates and sends to each terminal unit during the allotted period of each allotted time slot a predetermined number of data pulses, the terminal units being responsive to the data pulses by sending to the control unit a maximum of said predetermined number of binary coded information pulses in accordance with the signalling conditions of the respective terminal units, successive ones of said coded information pulses being pulse width modulated and having one or other of two values of pulse width.

4. An electronic telephone system according to claim 1 wherein the terminal units are associated in groups and the timing generator generates a plurality of sets of address signals which are time-shifted in relation to one another,
said multiplexing means comprising a first multiplexing complex including a respective line data multiplexer for each group controlled by the timing generator in accordance with the generation of a respective set of address signals for addressing the terminal units of the group in cyclic sequence, and a second multiplexing complex including means responsive to said address signals for selectively placing the addressed units in sequence in communication with the common control unit for exchanging information therewith.

5. An electronic telephone system having a plurality of extension line units which are connected radially to a central equipment by respective cables each including first conductor pair providing a speech transmission path and a second conductor pair providing a separate transmission path for system signalling, said first and second conductor pairs being connected respectively to a crosspoint matrix and to a common control unit at the central equipment, the common control unit including:
a timing generator for generating address signals and timing signals
multiplexing means controlled by the timing generator in accordance with the generation of said address signals for placing the extension line units sequentially in communication with the common control unit for exchanging information therewith, the extension line units being scanned in cyclic sequence, each unit being allotted a unique time slot within the scanning cycle, and
means responsive to timing signals from the timing generator for controlling the transmission of digital data over said system signalling paths, said means dividing each of said allotted time slots into distinct periods in which data is transmitted unidirectionally, from the extension line unit to the central control unit and in which data is transmitted unidirectionally from the central control unit to the extension line unit, respectively,
said second conductor pairs being connected to transmit both system signals and d.c. power for consumption at the terminal units and
each of said second conductor pairs being a balanced pair terminated by a matching impedance at the respective extension line unit.

6. An electronic telephone system according to claim 5, said extension line units being associated with respective telephone instruments, wherein each telephone instrument has a control panel including a keypad and a set of indicator lamps, operatively associated with respective particular keys thereof, and wherein each extension line unit includes means responsive to key operation for transmitting data to the common control unit in accordance with such operation, and means responsive to data received from the common control unit for selectively controlling the lamps in accordance with line signalling conditions, said lamps when operating indicating the status of connections to respective connected parties, each lamp being operable in different modes according to the status of the respective connection, each of said particular keys being operable to modify the status of the connection indicated by the associated indicator lamp.

7. An electronic telephone system according to claim 6, wherein the keypad provides a rectangular array of keys, including digit keys and at least one function key, said indicators being positioned on the control panel adjacent the keys with which they are respectively associated.

8. An electronic telephone system according to claim 7, wherein the indicator lamps are operatively associated in one or more pair with respective pairs of said keys, the keys of each pair being common to a single row of said array.

9. An electronic telephone system according to claim 8, wherein the function key is operable to establish three-way communication with two parties whose connection status is indicated by respective lamps of an associated pair.

10. In an electronic telephone system according to claim 5, the system further including a plurality of trunk interface units each providing a speech transmission path connected to the cross-point matrix and a separate transmission path for system signalling connected to the common control unit, the extension line units being associated in groups, said multiplexing means including for each group a line data multiplexer controlled by the timing generator in accordance with the generation of said address signals for addressing the extension line units of the group in cyclic sequence, a second multiplexer controlled by the timing generator in accordance with the generation of said address signals for addressing the trunk interface units in cyclic sequence at a cycle frequency equal to that of said groups, and means for sequentially placing the addressed line and interface units in communication with the common control unit for exchanging information therewith.

11. In an electronic telephone system as claimed in claim 5, each extension line unit having a keypad operable by the calling party to initiate an outgoing call and switching means responsive to such key operation to initiate the transmission of data to the control unit, means for simulating D.T.M.F. operation comprising:
a common set of pure tone generators for generating continuous high and low tones,
tone insertion means comprising a plurality of tone insertion elements corresponding in number to a plurality of links serving the crosspoint matrix,
each tone insertion element comprising a latch connected to receive and store tone control information in response to clock pulses and link address information, a pair of multiplexers connected to receive said high and low tones, respectively, the multiplexers combining the high and low tones in pairs in accordance with said tone control information, and output circuit means connected to the multiplexers for inserting the combined tones onto selected lines via the addressed links.

12. An electronic telephone system according to claim 11, wherein each extension line unit includes an attenuating circuit controlled by an off normal contact actuated by keypad operation at the line unit for attenuating simulated D.T.M.F. tones inserted into the speech path of the unit, the attenuator circuit including a time delay element to delay resetting of the attenuator for a short time following each release of said off normal contact.

13. An electronic telephone system according to claim 11, including means for generating supervisory tones comprising a further set of pure tone generators for generating continuous pure tones, mixing means for combining said pure tones in pairs to produce tone pair combinations, a switch having a plurality of inputs connected to receive said tone pair combinations, a plurality of controls connected to receive control signals from the common control unit, and a plurality of outputs for delivering said tone pair combinations modulated by the control signals, and output circuit means connected to the switch for inserting the modulated tone pair combinations onto selected lines via the addressed links.

14. In an electronic telephone system according to claim 5, means for generating supervisory tones to be inserted onto selected lines via the crosspoint matrix, said means comprising a plurality of pure tone generators for generating continuous pure tones, mixing means for combining said pure tones in pairs to produce tone pair combinations, a switch having a plurality of inputs connected to receive said tone pair combinations, a plurality of controls connected to receive control signals from the common control unit, and a plurality of outputs for delivering said tone pair combinations modulated by the control signals.

15. An electronic telephone system having a plurality of extension line units which are connected radially to a central equipment by respective cables each providing separate paths for speech transmission and system signalling, each of said system signalling paths including a balanced pair adapted for bidirectional transmission of pulse signals, each extension line unit including:

a matching impedance terminating the balance pair, a differential amplifier having input terminals connected across the matching impedance, the amplifier having an output circuit for deriving data pulses in accordance with pulse signals received from the central equipment.

a serial-to-parallel converter connected in said amplifier output circuit to control the receipt of data pulses therefrom, a latching circuit for storing the output of the serial-to-parallel converter, indicators responsive to the latched output of the serial-to-parallel converter for indicating a called condition, switching means for initiating data to be transmitted to the central equipment in accordance with the signalling condition of the extension line unit, pulse generating means responsive to said switching means for generating data pulses to be transmitted to the central equipment, and an electronic switching device connected across the balanced pair, said electronic switching device being responsive to the generated pulses for applying voltage pulses across the conductor pair.

16. An electronic telephone system according to claim 15, said switching means being constituted by keypad and cradle switch contacts of an associated telephone instrument, said indicators including a sounder responsive to incoming data signifying a called condition and indicator lamps selectively operable in accordance with called and calling conditions.

17. An electronic telephone system according to claim 16, said electronic switching device constituting a first constant current source, said sounder and indicator lamps being connected in series and energized from a common circuit including a second constant current source, and said differential amplifier being energized from a third constant current source, the line unit including means for setting said second and third constant current sources at a predetermined reference level.

18. An electronic telephone system according to claim 16, wherein the associated telephone instrument of at least one of the extension line units has a further set of indicator lamps for indicating the status of other extension line units, each such lamp being associated with a respective other line unit or group of line units, and a corresponding set of push button switches associated with the lamps, the extension line unit including means responsive to signalling conditions of said other line extension units for selectively operating the respective lamps, and switch contacts operable by said push button switches for selectively controlling the state of the line units.

19. An electronic telephone system according to claim 15, wherein said electronic switching device constitutes a constant current source.

20. An electronic telephone system according to claim 19, wherein said sounder and indicator lamps are connected in series and energized from a common circuit including a constant current source.

21. An electronic telephone system according to claim 15, wherein the differential amplifier is energized from a constant current source set at a predetermined reference level.

22. An electronic telephone system according to claim 15, each extension line unit being associated with a telephone instrument having keypad and cradle contacts constituting said switching means, said indicators including a plurality of light emitting diodes and a sounder connected in series with a common constant current source across the balanced conductor pair, the extension line unit further including means for selectively controlling the light emitting diodes and sounder comprising a push-pull amplifier connected to the sounder for driving same, the push-pull amplifier being controlled by the decoder circuit in accordance with incoming data signifying a called condition, and a solid-state selective switching device having a plurality of switching elements connected in parallel with respective ones of the light emitting diodes, said switching elements being selectively and severally operable in accordance with designated bits of the latched outputs of the serial-to-parallel converter signifying designated line unit signalling conditions.

23. An electronic telephone system according to claim 22, including a volume control circuit connected in shunt with the sounder, the volume control circuit including shunt impedance elements and a manually operable switch for selectively connecting the impedance elements in and out of the circuit.

24. In an electronic telephone system including a solidstate crosspoint matrix operable by a central control for selectively interconnecting calling and called parties in accordance with system signalling conditions, the system serving at least one trunk having tip and ring leads constituting a trunk pair, the system further including a trunk interface connected to the cross-point matrix by a conductor pair providing a speech transmission path and to the central control by conductors used for system signalling, the trunk interface comprising:

a first resistance hybrid network providing a first pair of network terminals connected to said tip and ring leads, and second and third pairs of network terminals, the network providing a matching impedance terminating the trunk pair, a second resistance hybrid network having a first pair of network terminals connected to the conductors of said conductor pair, and second and third pairs of network terminals, the second resistance hybrid network providing a matching impedance terminating said conductor pair, the second pair of network terminals of each resistance hybrid network being connected to the third pair of network terminals of the other network by respective circuits each providing a unidirectional path for speech transmission, said circuits including control means responsive to trunk signalling connected to the central control, said control means including respective switching means responsive to incoming and outgoing call signals for rendering the circuits operable and inoperable in accordance with calling conditions.

25. An arrangement according to claim 24 including a protection circuit for absorbing high voltage transients on the trunk pair, said protection circuit comprising a pair of varistors connected from ground to respective leads of the trunk pair via reverse-biassed diodes and respective resistance elements of the first resistance hybrid network, the varistors each having a predetermined d.c. threshold.

26. An arrangement according to claim 24, wherein a respective one of said circuits includes a differential output amplifier having output terminals connected via reverse-biassed diodes to the third pair of terminals of the first resistance hybrid network, means for sensing longitudinal voltages on the trunk pair, and means for controlling the differential output amplifier in accordance with a feedback signal from said sensing means whereby to maintain a constant line current on the trunk pair independently of line length.

27. An arrangement according to claim 24, including a loop impedance detector comprising a bridge circuit connected across the tip and ring leads of the trunk pair, the bridge circuit being insensitive to longitudinal voltages on the trunk pair, and switching means responsive to changes in the condition of the bridge circuit for deriving signals indicative of loop closure and opening.

28. In an electonic telephone system having a plurality of extension line units and an attendant's unit connected to a common control for exchanging data therewith, said units being scanned sequentially by the common control in a time-division-multiplex mode, each unit being allotted a unique time slot within the scanning cycle, the attendant's unit comprising:

a console having a plurality of keys operable for making line connections and effecting line control functions, the console having an associated circuit including switching means actuated by the keys for initiating the transmission of coded data to the central control in accordance with such key operation, said associated circuit including:

a free running clock oscillator clock pulses, gating means for gating said clock pulses with timing pulses defining the time slot allotted to the attendant's unit, a counter having input circuit means connected to receive the output of said gating means, and output circuit means connected to a decoder for decoding the output of the counter, the decoded output providing binary address signals for the keys, said switching means being sequentially scanned in accordance with the generation of said binary address signals, latching means for latching the output data of an actuated one of said switching means first detected by such scanning, the output data being stored by the latching means until release of the associated key, and means for releasing said stored data to the central control.

* * * * *